United States Patent
Mitsui et al.

(10) Patent No.: US 10,085,189 B2
(45) Date of Patent: Sep. 25, 2018

(54) METHOD OF CONTROLLING HANDOVER PROCEDURE AND BASE STATION

(71) Applicant: KYOCERA CORPORATION, Kyoto (JP)

(72) Inventors: Katsuhiro Mitsui, Ritto (JP); Masato Fujishiro, Yokohama (JP); Yushi Nagasaka, Ritto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/727,345

(22) Filed: Oct. 6, 2017

(65) Prior Publication Data
US 2018/0035339 A1  Feb. 1, 2018

Related U.S. Application Data

(63) Continuation of application No. PCT/JP2016/061615, filed on Apr. 8, 2016.

(60) Provisional application No. 62/145,755, filed on Apr. 10, 2015, provisional application No. 62/222,877, filed on Sep. 24, 2015, provisional application No. 62/251,890, filed on Nov. 6, 2015, provisional application No. 62/251,907, filed on Nov. 6, 2015.

(51) Int. Cl.
*H04W 36/00* (2009.01)
*H04W 36/08* (2009.01)
*H04W 72/04* (2009.01)
*H04W 36/18* (2009.01)
*H04W 88/12* (2009.01)

(52) U.S. Cl.
CPC .......... *H04W 36/08* (2013.01); *H04W 36/18* (2013.01); *H04W 72/04* (2013.01); *H04W 88/12* (2013.01)

(58) Field of Classification Search
CPC .................................... H04W 36/08
USPC .................................. 455/436–448
See application file for complete search history.

(56) References Cited

U.S. PATENT DOCUMENTS

8,229,440 B2 * 7/2012 Yoon ............... H04W 36/08 370/328
9,572,078 B2 * 2/2017 Zhang ............. H04W 36/0033

OTHER PUBLICATIONS

International Search Report issued in PCT/JP2016/061615; dated Jul. 5, 2016.
Huawei; "Discussion on Inter-MeNB Handover Optimization"; 3GPP TSG RAN WG3 Meeting #87; R3-150066; Feb. 9-13, 2015; pp. 1-5; Athens, Greece.
3rd Generation Partnership Project; Technical Specification Group Radio Access Network; Evolved Universal Terrestrial Radio Access Network (E-UTRAN); Extension of Dual Connectivity in EUTRAN; 3GPP TR 36.875 V1.0.0; Mar. 2015; pp. 1-18; Release 13; 3GPP Organizational Partners.

* cited by examiner

*Primary Examiner* — Joel Ajayi
(74) *Attorney, Agent, or Firm* — Studebaker & Brackett PC

(57) ABSTRACT

A method of controlling a handover procedure of a user terminal from a source master base station to a target master base station, the user terminal being connected to the source master base station and a secondary base station in accordance with a dual connectivity scheme, includes: transmitting, by the source master base station, a handover request to the target master base station; and receiving, by the source master base station, information related to necessity to change the secondary base station from the target master base station.

3 Claims, 24 Drawing Sheets

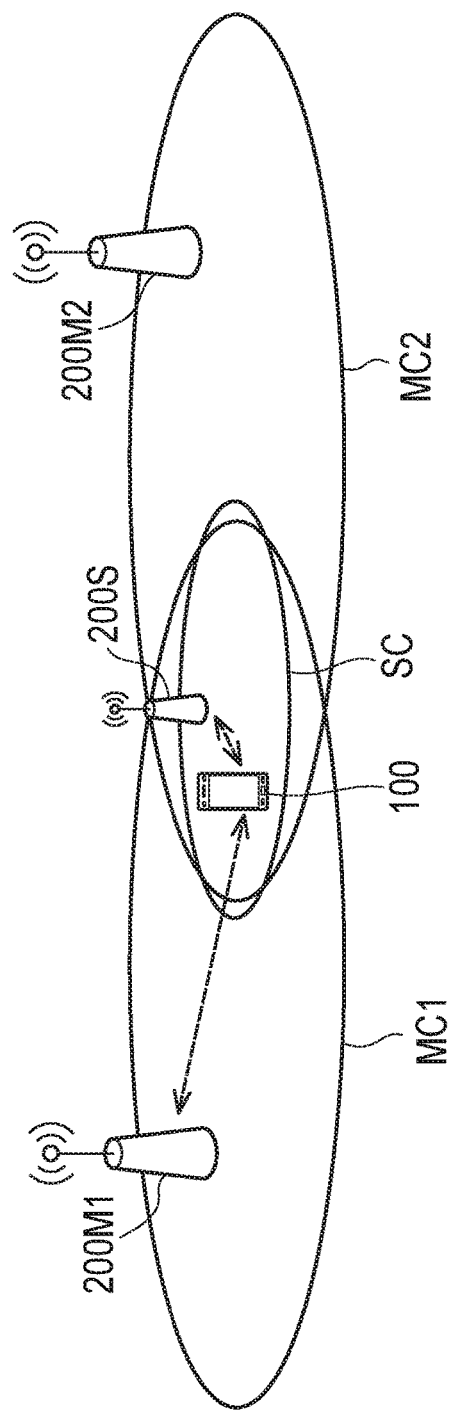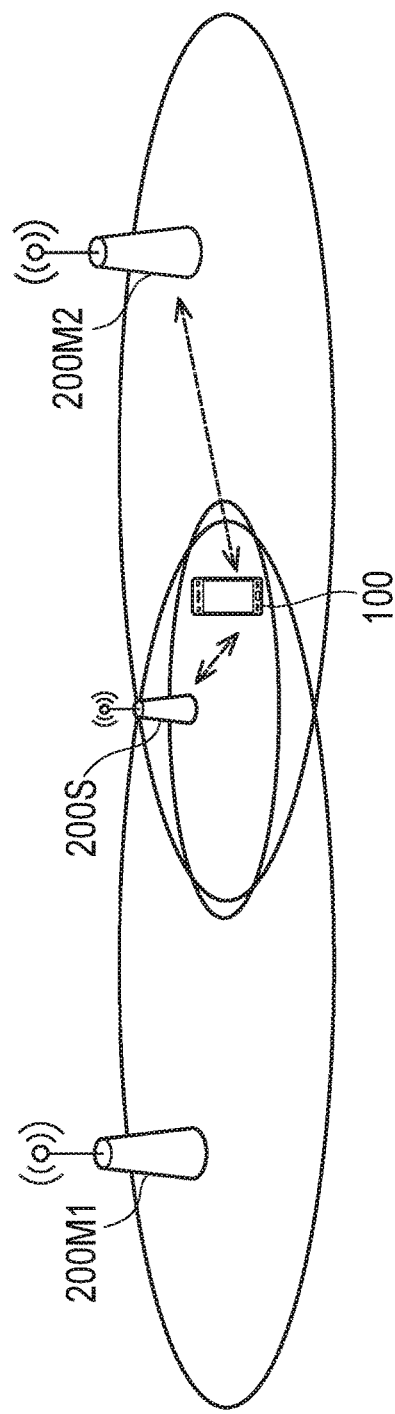

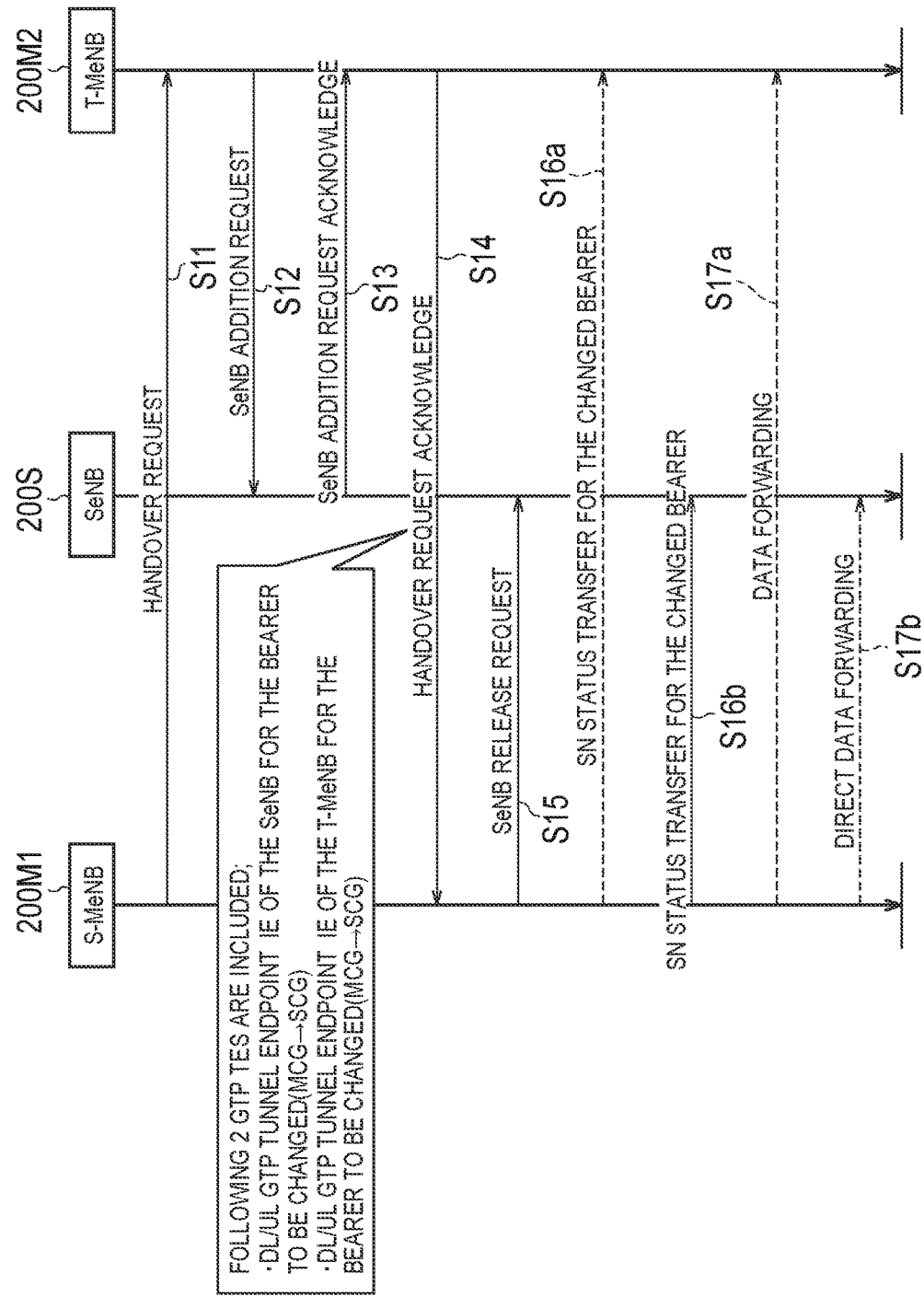

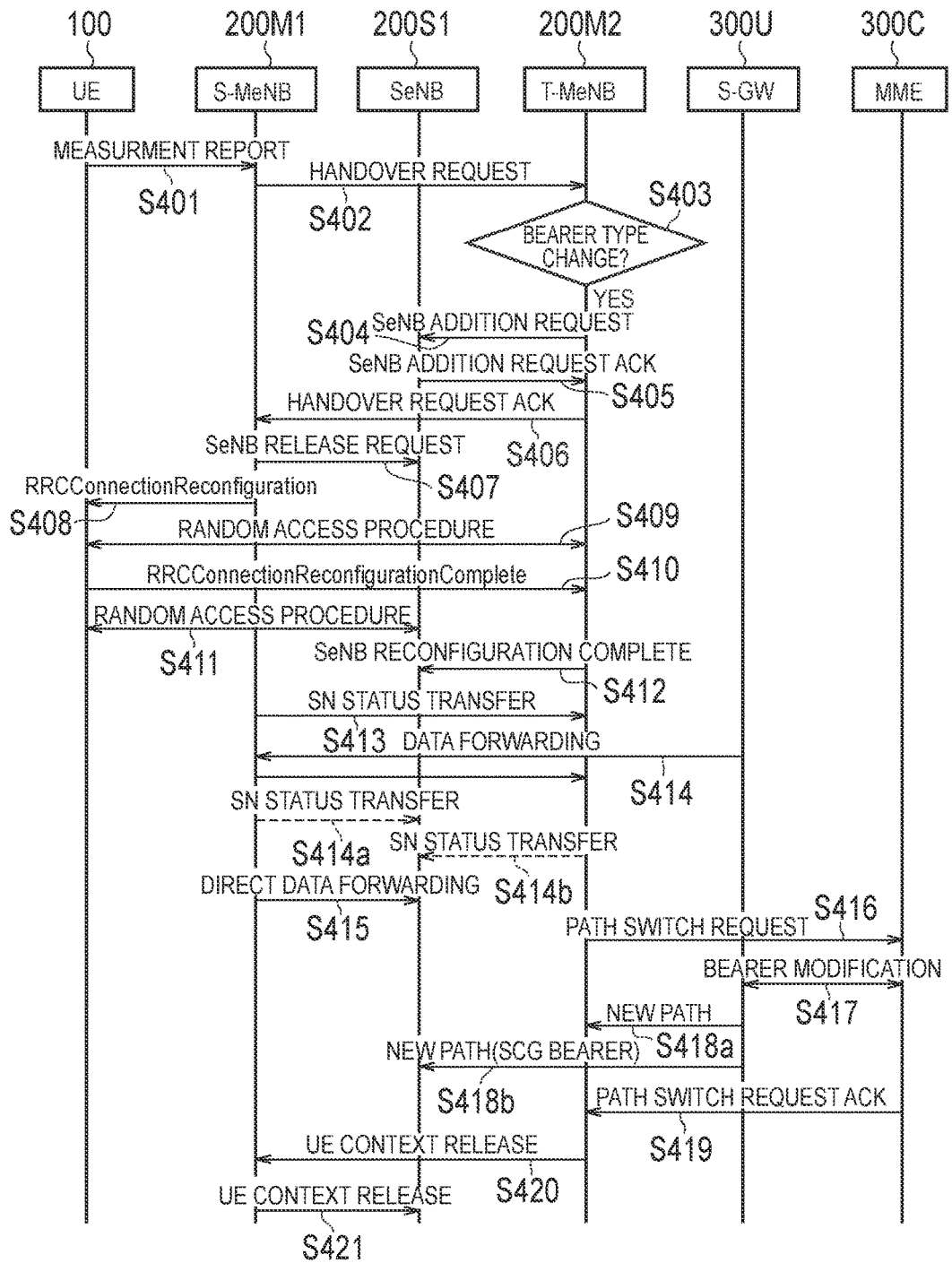

METHOD OF CONTROLLING HANDOVER PROCEDURE AND BASE STATION

RELATED APPLICATION

This application is a continuation application of international application PCT/JP2016/061615, filed Apr. 8, 2016, which claims the benefit of U.S. provisional application No. 62/145,755 filed Apr. 10, 2015, U.S. provisional application No. 62/222,877 filed Sep. 24, 2015, U.S. provisional application No. 62/251,890 filed Nov. 6, 2015, and U.S. provisional application No. 62/251,907 filed Nov. 6, 2015, the entire contents of which are incorporated herein by reference.

TECHNICAL FIELD

The present disclosure relates to a method of controlling a handover procedure and a base station.

BACKGROUND ART

In 3rd Generation Partnership Project (3GPP) which is a mobile communication system standardization project, a technique of efficiently utilizing a specific base station (for example, a small cell base station) having a narrower coverage than a general base station (for example, a macro cell base station) is under review.

In 3GPP, a dual connectivity scheme (dual connectivity) is scheduled to be introduced in Release 12 or later (see Non Patent Literature 1). In the dual connectivity scheme, a user terminal simultaneously establishes a connection with a plurality of base stations (a general base station and a specific base station). Since radio resources are allocated from each of the base stations to the user terminal, the throughput is expected to be improved. The dual connectivity scheme is also referred to as inter-base station carrier aggregation (inter-eNB CA).

In the dual connectivity scheme, only one base station (hereinafter referred to as a "master base station") among a plurality of base stations establishing a connection with the user terminal establishes an RRC connection with the user terminal. On the other hand, other base stations (hereinafter referred to as "secondary base stations") among a plurality of base stations provide additional radio resources to the user terminal without establishing the RRC connection with the user terminal.

SUMMARY

A method according to an embodiment is a method of controlling a handover procedure of a user terminal from a source master base station to a target master base station, the user terminal being connected to the source master base station and a secondary base station in accordance with a dual connectivity scheme. The method includes: transmitting, by the source master base station, a handover request to the target master base station; and receiving, by the source master base station, information related to necessity to change the secondary base station from the target master base station.

A method according to an embodiment is a method of controlling a handover procedure of a user terminal from a source master base station to a target master base station, the user terminal being connected to the source master base station and a secondary base station in accordance with a dual connectivity scheme. The method includes: determining, by the target master base station, whether or not it is necessary to change the secondary base station on the basis of predetermined information when receiving a handover request from the source master base station; transmitting, by the target master base station, information related to necessity to change the secondary base station to the source master base station based on the determination.

A method according to an embodiment is a method of controlling a handover procedure of a user terminal from a source master base station to a target master base station, the user terminal being connected to the source master base station and a source secondary base station in accordance with a dual connectivity scheme. The method includes: selecting, by the target master base station, a target secondary base station to be newly connected to the user terminal if a handover request is received from the source master base station, the target secondary base station being different from the source secondary base station; and transmitting, by the target master base station, a secondary base station addition request to the selected target secondary base station.

A target base station according to an embodiment is the target base station in a case in which a handover of a user terminal is performed from a source base station to the target base station in a mobile communication system supporting a dual connectivity scheme. The target base station includes a controller configured to transmit a message to the source base station, the message including a first tunneling identifier used for direct forwarding of directly transferring data of a bearer of the user terminal from the source base station to a secondary base station, a second tunneling identifier used for indirect forwarding of indirectly transferring the data to the secondary base station via the target base station, and a bearer identifier identifying the bearer. In the message, the first tunneling identifier and the second tunneling identifier are associated with the same bearer identifier.

A source base station according to an embodiment is the source base station in a case in which a handover of a user terminal is performed from the source base station to a target base station in a mobile communication system supporting a dual connectivity scheme. The source base station includes: a controller configured to receive a message from the target base station, the message including a first tunneling identifier used for direct forwarding of directly transferring data of a bearer of the user terminal from the source base station to a secondary base station, a second tunneling identifier used for indirect forwarding of indirectly transferring the data to the secondary base station via the target base station, and a bearer identifier identifying the bearer. In the message, the first tunneling identifier and the second tunneling identifier are associated with the same bearer identifier.

A target base station according to an embodiment is the target base station in a case in which a handover of a user terminal is performed from a source base station to the target base station in a mobile communication system supporting a dual connectivity scheme. The target base station includes a controller configured to transmit an information element to the source base station, the information element indicating that the source base station is able to decide one forwarding scheme out of direct forwarding of directly transferring data of a bearer of the user terminal from the source base station to a secondary base station and indirect forwarding of indirectly transferring the data to the secondary base station via the target base station.

A source base station according to an embodiment is the source base station in a case in which a handover of a user terminal is performed from the source base station to a target base station in a mobile communication system supporting a dual connectivity scheme. The source base station includes a controller configured to receive an information element from the target base station, the information element indicating that the source base station is able to decide one forwarding scheme out of direct forwarding of directly transferring data of a bearer of the user terminal from the source base station to a secondary base station and indirect forwarding of indirectly transferring the data to the secondary base station via the target base station. The controller is configured to decide one forwarding scheme out of the direct forwarding and the indirect forwarding in response to reception of the information element.

A source base station according to an embodiment is the source base station in a case in which a handover of a user terminal is performed from the source base station to a target base station in a mobile communication system supporting a dual connectivity scheme. The source base station includes controller configured to transmit notification information to the target base station, the notification information indicating that it is possible to perform direct forwarding of directly transferring data of a bearer of the user terminal from the source base station to a secondary base station.

A target base station according to an embodiment is the target base station in a case in which a handover of a user terminal is performed from a source base station to the target base station in a mobile communication system supporting a dual connectivity scheme. The target base station includes a controller configured to receive notification information from the source base station, the notification information indicating that it is possible to perform direct forwarding of directly transferring data of a bearer of the user terminal from the source base station to a secondary base station. The controller is configured to decide one forwarding scheme out of the direct forwarding and indirect forwarding in response to reception of the notification information, the indirect forwarding indirectly transferring the data to the secondary base station via the target base station.

A target base station according to an embodiment is the target base station in a case in which a handover of a user terminal is performed from a source base station to the target base station in a mobile communication system supporting a dual connectivity scheme. The target base station includes: a controller configured to transmit a message including a tunneling identifier to the source base station after setting the tunneling identifier used for the indirect forwarding of indirectly transferring data of a bearer of the user terminal from the source base station to a secondary base station via the target base station. When the controller transmits the message to the source base station, the controller is configured to activate a timer that specifies a maximum standby time before the indirect forwarding is started.

A source base station according to an embodiment is the source base station in a case in which a handover of a user terminal is performed from the source base station to a target base station in a mobile communication system supporting a dual connectivity scheme. The source base station includes a controller configured to decide one forwarding scheme out of direct forwarding of directly transferring data of a bearer of the user terminal from the source base station to a secondary base station and indirect forwarding of indirectly transferring the data to the secondary base station via the target base station. The controller is configured to transmit notification information related to the direct forwarding to the target base station in a case in which the direct forwarding is decided.

A target base station according to an embodiment is the target base station in a case in which a handover of a user terminal is performed from a source base station to the target base station in a mobile communication system supporting a dual connectivity scheme. The target base station includes a controller configured to transmit a message including a tunneling identifier to the source base station after setting the tunneling identifier used for the indirect forwarding of indirectly transferring data of a bearer of the user terminal from the source base station to a secondary base station via the target base station. The controller is configured to receive notification information related to the direct forwarding from the source base station in a case in which the source base station decides direct forwarding of directly transferring the data from the source base station to the secondary base station.

BRIEF DESCRIPTION OF DRAWINGS

FIG. 6A illustrates a data path configuration, and FIG. 6B illustrates a protocol stack configuration.

FIG. 7A illustrates a data path configuration, and FIG. 7B illustrates a protocol stack configuration.

FIGS. 18A and 18B are diagrams illustrating an anticipated scenario according to the second to sixth embodiments.

FIG. 20 is a diagram illustrating a schematic sequence according to the second embodiment.

FIG. 21 is a diagram illustrating an example of a detailed sequence according to the second embodiment.

DESCRIPTION OF EMBODIMENTS

First Embodiment

A first embodiment in which the present disclosure is applied to an LTE system will be described below.
(System Configuration)
FIG. 1 is a configuration diagram of an LTE system according to the first embodiment.

Figure 1:
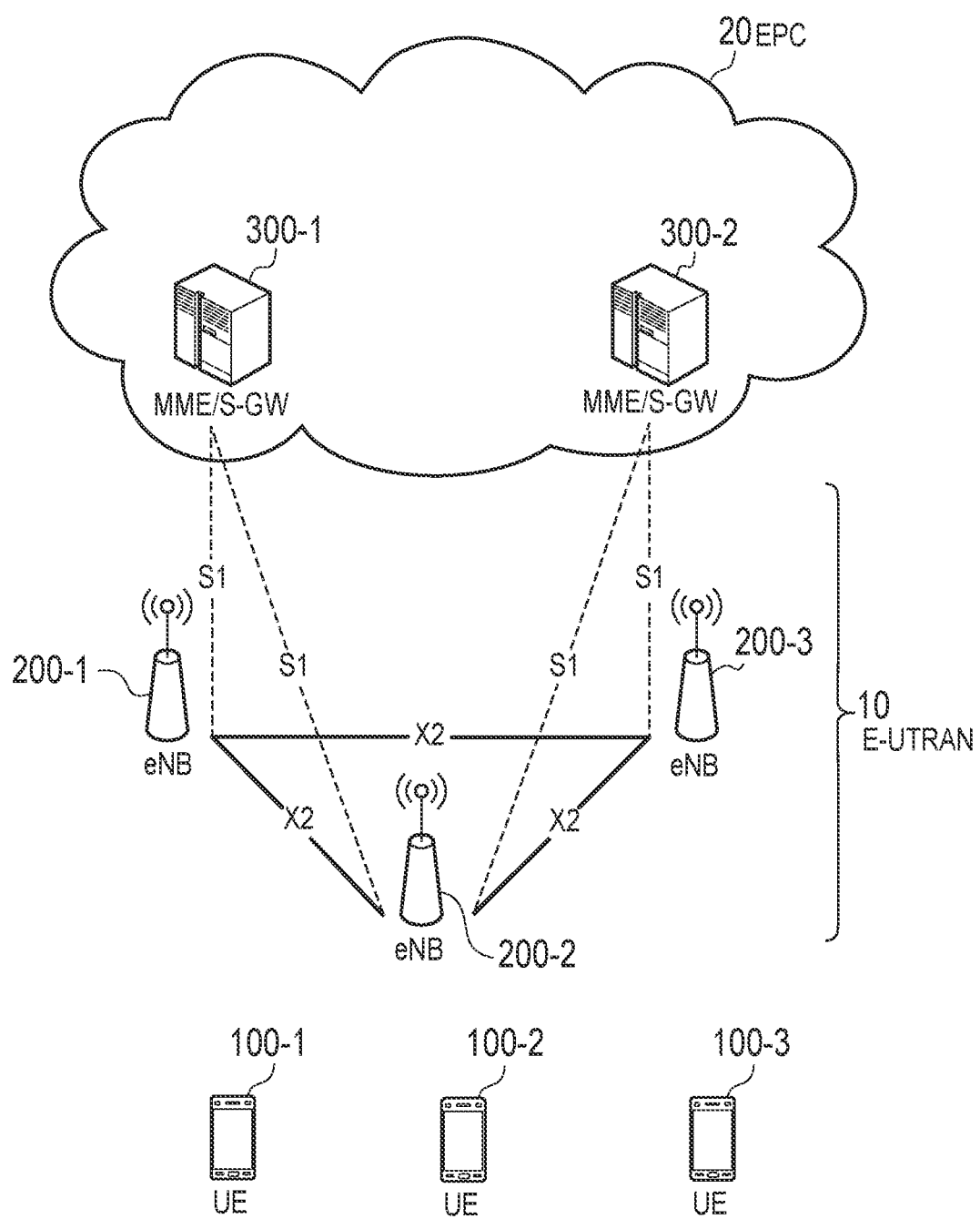
FIG. 1 is an LTE system according to an embodiment.

The LTE system according to the first embodiment includes a user equipment (UE) 100, an evolved-UMTS terrestrial radio access network (E-UTRAN) 10, and an evolved packet core (EPC) 20 as illustrated in FIG. 1.

The UE 100 corresponds to user terminal. The UE 100 is a mobile communication apparatus and performs radio communication with a cell (a serving cell). A configuration of the UE 100 will be described later.

The E-UTRAN 10 corresponds to a radio access network. The E-UTRAN 10 includes an eNB 200 (evolved Node-B). The eNB 200 corresponds to a base station. The eNBs 200 are connected to each other via an X2 interface. A configuration of the eNB 200 will be described later.

The eNB 200 manages one or more cells and performs radio communication with the UE 100 that has established a connection with a cell thereof. The eNB 200 has a radio resource management (RRM) function, a user data routing function, a measurement control function for mobility control/scheduling, and the like. In addition to a term indicating a minimum unit of a radio communication area, "cell" is also used as a term indicating a function performing radio communication with the UE 100.

The EPC 20 corresponds to a core network. The EPC 20 includes a mobility management entity (MME)/serving-gateway (S-GW) 300. The MME performs various kinds of mobility control or the like on the UE 100. The S-GW performs user data transfer control. The MME/S-GW 300 is connected to the eNB 200 via an S1 interface.

Figure 2:
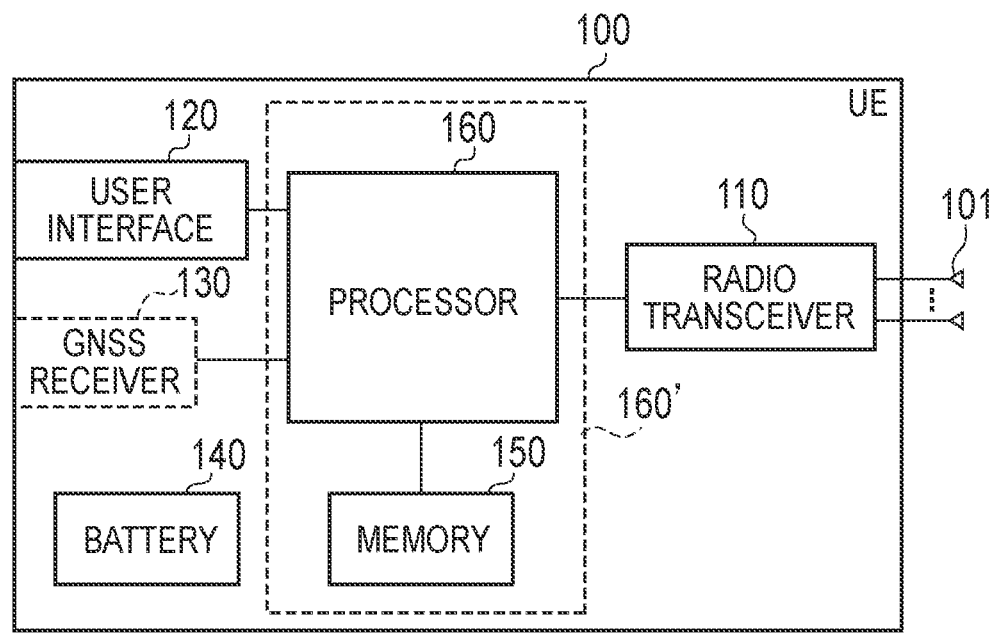
FIG. 2 is a block diagram of a UE according to an embodiment.

FIG. 2 is a block diagram of the UE 100. The UE 100 includes a plurality of antennas 101, a radio transceiver 110, a user interface 120, a global navigation satellite system (GNSS) receiver 130, a battery 140, a memory 150, and a processor 160 as illustrated in FIG. 2. The memory 150 and the processor 160 constitute a controller. The UE 100 may not include the GNSS receiver 130. Further, the memory 150 may be integrated with the processor 160, and this set (that is, a chipset) may be used as a processor 160'.

The antenna 101 and the radio transceiver 110 are used for transmission and reception of radio signals. The radio transceiver 110 converts a baseband signal (a transmission signal) output from the processor 160 into a radio signal and transmits the radio signal from the antenna 101. In addition, the radio transceiver 110 converts a radio signal received by the antenna 101 into a baseband signal (a reception signal) and outputs the baseband signal to the processor 160.

The user interface 120 is an interface with a user who owns the UE 100, and includes, for example, a display, a microphone, a speaker, various buttons, or the like. The user interface 120 receives an operation from the user and outputs a signal indicating content of the operation to the processor 160. The GNSS receiver 130 receives a GNSS signal and outputs the received signal to the processor 160 in order to obtain position information indicating a geographical position of the UE 100. The battery 140 stores electric power to be supplied to the blocks of the UE 100.

The memory 150 stores a program executed by the processor 160 and information used for a process performed by the processor 160. The processor 160 includes a baseband processor that performs modulation/demodulation, encoding/decoding, and the like of the baseband signal and a central processing unit (CPU) that performs various kinds of processes by executing the program stored in the memory 150. The processor 160 may further include a codec that encodes and decodes audio and video signals. The processor 160 executes various kinds of processes to be described later and various kinds of communication protocols.

Figure 3:
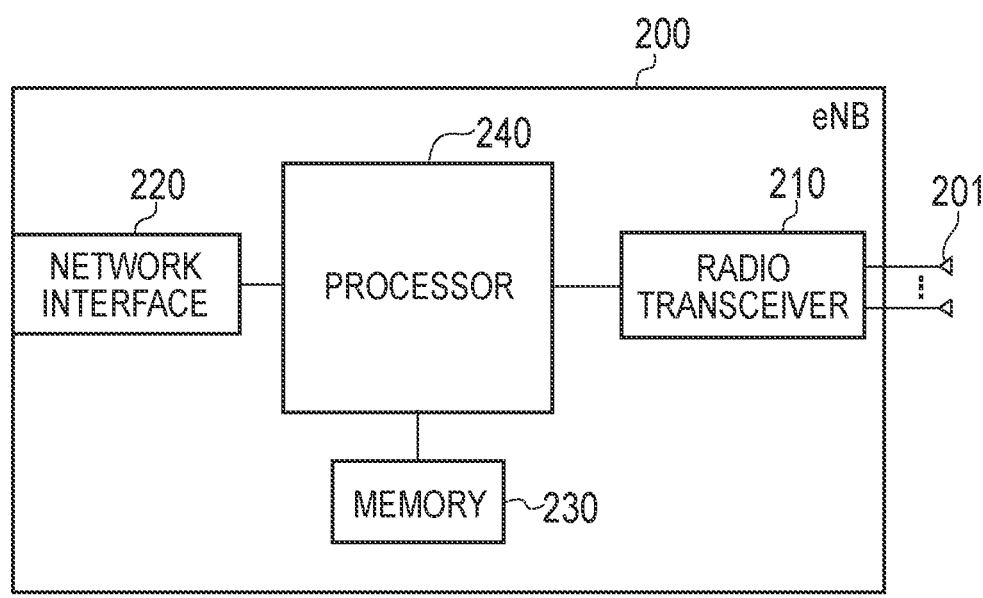
FIG. 3 is a block diagram of an eNB according to an embodiment.

FIG. 3 is a block diagram of the eNB 200. The eNB 200 includes a plurality of antennas 201, a radio transceiver 210, a network interface 220, a memory 230, and a processor 240 as illustrated in FIG. 3. The memory 230 and the processor 240 constitute a controller. Further, the memory 230 may be integrated with the processor 240, and this set (that is, a chipset) may be used as a processor.

The antenna 201 and the radio transceiver 210 are used for transmission and reception of radio signals. The radio transceiver 210 converts a baseband signal (a transmission signal) output from the processor 240 into a radio signal and transmits the radio signal from the antenna 201. Further, the radio transceiver 210 converts a radio signal received by the antenna 201 into a baseband signal (a reception signal) and outputs the baseband signal to the processor 240.

The network interface 220 is connected to a neighbor eNB 200 via the X2 interface and connected to the MME/S-GW 300 via an S1 interface. The network interface 220 is used for communication performed on the X2 interface and communication performed on the S1 interface.

The memory 230 stores a program executed by the processor 240 and information used for a process performed by the processor 240. The processor 240 includes a baseband processor that performs modulation/demodulation, encoding/decoding, and the like of the baseband signal and a CPU that performs various kinds of processes by executing the program stored in the memory 230. The processor 240 executes various kinds of processes to be described later and various kinds of communication protocols.

Figure 4:
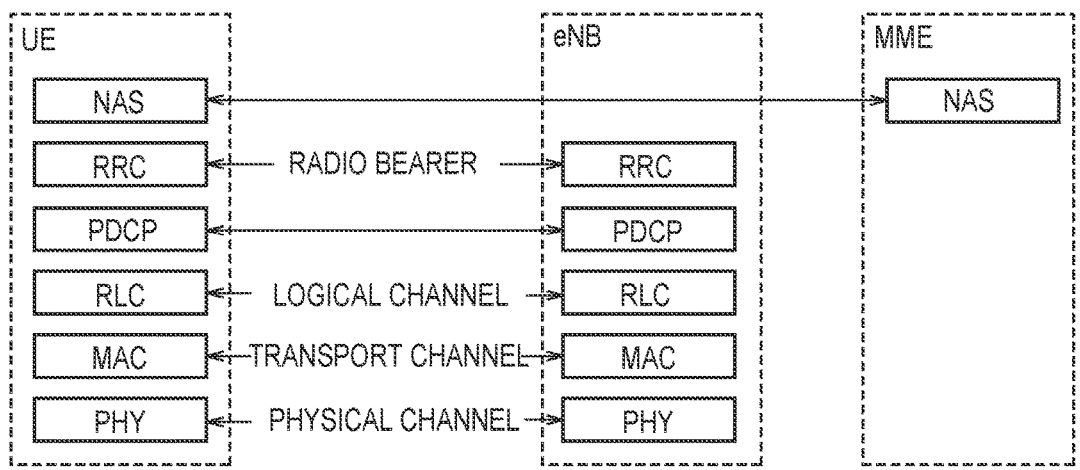
FIG. 4 is a protocol stack diagram of a radio interface according to an embodiment.

FIG. 4 is a protocol stack diagram of a radio interface in the LTE system. As illustrated in FIG. 4, the radio interface protocol is divided into first to third layers of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs encoding/decoding, modulation/demodulation, antenna mapping/demapping, and resource mapping/demapping. User data and a control signal are transmitted between the physical layer of the UE 100 and the physical layer of the eNB 200 via the physical channel.

The MAC layer performs priority control of data, a retransmission process by hybrid ARQ (HARQ), a random access procedure when the RRC connection is established, and the like. User data and a control signal are transmitted between the MAC layer of the UE 100 and the MAC layer of the eNB 200 via the transport channel. The MAC layer of the eNB 200 includes a scheduler that decides uplink and downlink transport formats (a transport block size and a modulation and coding scheme (MCS)) and an allocated resource block for the UE 100.

The RLC layer transmits data to the RLC layer on a reception side using the functions of the MAC layer and the physical layer. User data and a control signal are transmitted between the RLC layer of the UE 100 and the RLC layer of the eNB 200 via a logical channel.

The PDCP layer performs header compression/decompression and encryption/decryption.

The RRC layer is defined only on a control plane for dealing with a control signal. A control signal (an RRC message) for various kinds of settings is transmitted between the RRC layer of the UE 100 and the RRC layer of the eNB 200. The RRC layer controls logical channels, transport channels, and physical channels in accordance with establishment, re-establishment, and release of a radio bearer. In a case in which there is a connection (RRC connection) between the RRC of the UE 100 and the RRC of the eNB 200, the UE 100 is in an RRC connected state, and otherwise, the UE 100 is in an RRC idle state.

A non-access stratum (NAS) layer located above the RRC layer performs session management, mobility management, and the like.

(Dual Connectivity Scheme)

The LTE system according to the first embodiment supports the dual connectivity scheme. The dual connectivity scheme is scheduled to be introduced in Release 12 or later. In the dual connectivity scheme, the UE 100 simultaneously establishes connections with a plurality of eNBs 200. Since the radio resources are allocated from each of the eNBs 200 to the UE 100, the throughput is expected to be improved. The dual connectivity scheme may also be referred to as an inter-eNB 200 carrier aggregation (inter-eNB CA).

Figure 5:
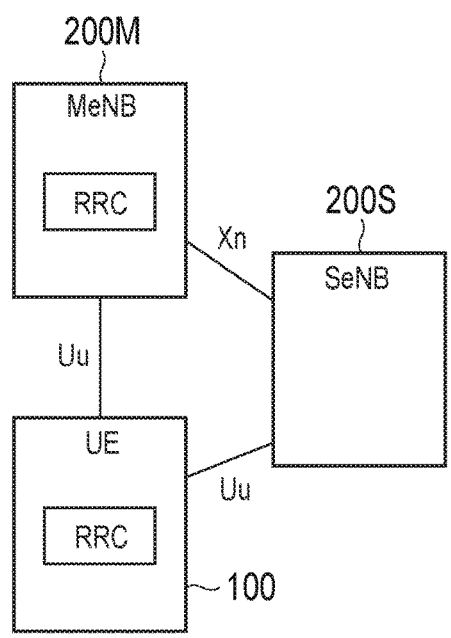
FIG. 5 is a diagram for describing an overview of a dual connectivity scheme.

FIG. 5 is a diagram for describing an overview of the dual connectivity scheme.

In the dual connectivity scheme, only an MeNB (MeNB) 200M among a plurality of eNBs 200 establishing a connection with a UE 100 establishes the RRC connection with the UE 100 as illustrated in FIG. 5. On the other hand, a secondary eNB (SeNB) 200S among a plurality of eNBs 200 does not establish the RRC connection with the UE 100 but provides additional radio resources to the UE 100. In other words, the MeNB 200M establishes not only a user plane connection but also a control plane connection with the UE 100. On the other hand, the SeNB 200S establishes the user plane connection with the UE 100 without establishing the control plane connection with the UE 100. An Xn interface is set between the MeNB 200M and the SeNB 200S. The Xn interface is the X2 interface or a new interface.

In the dual connectivity scheme, the UE 100 can perform the carrier aggregation using N cells managed by the MeNB 200M and M cells managed by the SeNB 200S at the same time. In the dual connectivity scheme, a maximum of the number of serving cells of the UE 100, that is, a maximum number of (N+M) is, for example, 5. Here, a group of N cells managed by the MeNB 200M is referred to as a "master cell group (MCG)." Further, a group of M cells managed by the SeNB 200S is referred to as a "secondary cell group (SCG)." In the SCG, a special cell in which the PUCCH of the UE 100 is provided is set. The special cell performs some functions of a primary cell (PCell) in the carrier aggregation.

FIGS. 6 and 7 are diagrams for describing a method of constituting a user data transfer path (data path) in the dual connectivity scheme. There are mainly two types of user plane architectures (UP architectures) that constitute the user data transfer path (data path) in the dual connectivity scheme.

Figure 6A:
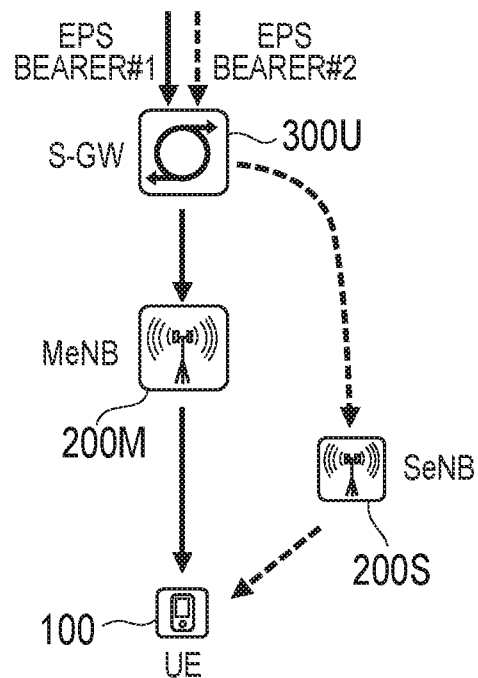
FIGS. 6A and 6B are diagrams illustrating a first UP architecture (an UP architecture "1A").
Figure 6B:
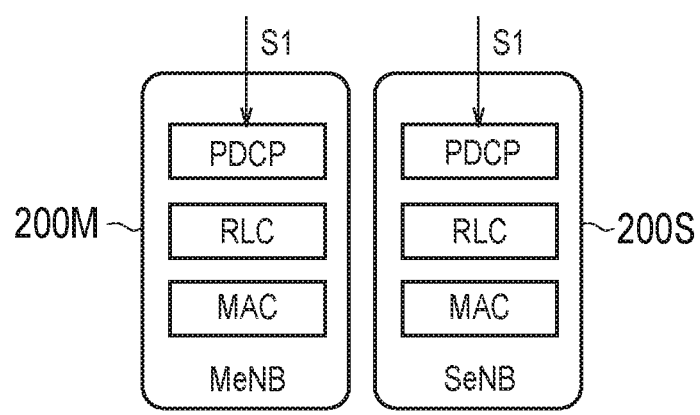

FIGS. 6A and 6B illustrate a first UP architecture (also referred to as an UP architecture "1A"). In the first UP architecture, an S1-U interface between an MeNB 200M and an S-GW 300U and an S1-U interface between an SeNB 200S and the S-GW 300U are used as illustrated in FIG. 6A. An evolved packet system (EPS) bearer #1 between the UE 100 and the P-GW passes through the S1-U interface between the MeNB 200M and the S-GW 300U. An EPS bearer #2 between the UE 100 and the P-GW passes through the S1-U interface between the SeNB 200S and the S-GW 300U. As described above, in the first UP architecture, the data path between the SeNB 200S and the S-GW 300U does not pass through the MeNB 200M. Each of the MeNB 200M and the SeNB 200S performs processes of the PDCP layer, the RLC layer, and the MAC layer as illustrated in FIG. 6B. The EPS bearer #1 illustrated in FIG. 6A is referred to as an "MCG bearer," and the EPS bearer #2 is also referred to as an "SCG bearer." Further, the first UP architecture is also referred to as an "SCG bearer option."

Figure 7A:
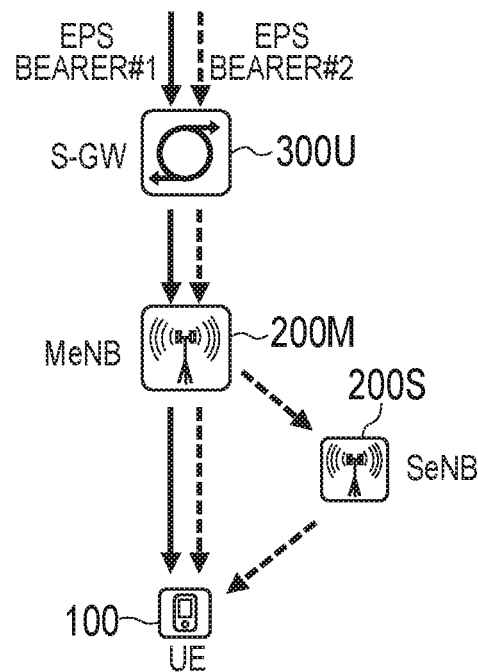
FIGS. 7A and 7B are diagrams illustrating a second UP architecture (an UP architecture "3C").
Figure 7B:
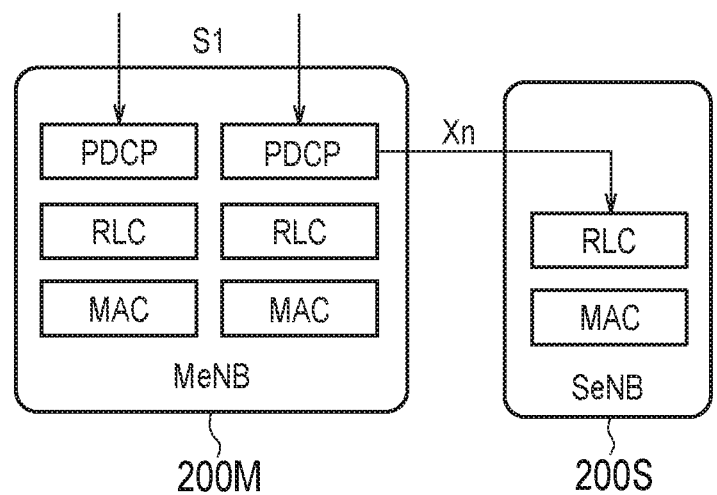

FIGS. 7A and 7B illustrate a second UP architecture (also referred to as an UP architecture "3C"). In the second UP architecture, an EPS bearer #2 between a UE 100 and a P-GW is split in an MeNB 200M, one split bearer ends at the UE 100 via the SeNB 200S, and the other split bearer ends at the UE 100 without going through the SeNB 200S as illustrated in FIG. 7A. As described above, in the second UP architecture, the data path between the SeNB 200S and the S-GW 300U goes through the MeNB 200M. As illustrated in FIG. 7B, for one (split bearer) which is split in the EPS bearer #2, processes of the respective layers are performed through the PDCP of the MeNB 200M and the RLC and the MAC of SeNB 200S. For the split bearer, the MeNB 200M may undertake the processes of up to the RLC (or some functions of the RLC). The EPS bearer #1 illustrated in FIG. 7A is also referred to as an "MCG bearer," and the EPS bearer #2 is also referred to as a "split bearer." The second UP architecture is also referred to as a "split bearer option."

Meanwhile, if an environment such as a signal reception state changes due to movement or the like of the UE 100 simultaneously having a connection with the MeNB 200M1 and the SeNB 200S1 in accordance with the dual connectivity scheme, the handover from the MeNB 200M1 (a source MeNB which is hereinafter referred to as an "S-MeNB 200M1") to another MeNB 200M2 (a target MeNB or a target eNB which is hereinafter referred to as a "T-MeNB 200M2" or a "T-eNB 200M2") is executed. Further, in a case in which the SeNB 200S to which the UE 100 is connected is also changed, the following two scenarios are anticipated.

In a first scenario, a handover of the UE 100 from the S-MeNB 200M1 to the T-MeNB 200M2 without changing the SeNB 200S connected with the UE 100 (while maintaining the connection between the SeNB 200S and the UE 100) (Inter MeNB Handover without SeNB Change) is first executed, and then the SeNB 200S connected with the UE 100 is changed (the SeNB change is executed).

In the first scenario, the handover includes a procedure for maintaining the connection between the SeNB 200S and the UE 100. Further, the maintaining of the connection between the SeNB 200S and the UE 100 includes a case in which the connection between the SeNB 200S and the UE 100 is first released in the handover procedure and then established again as well.

On the other hand, in a second scenario, the connection between the SeNB 200S and UE 100 is not maintained but released, a handover of the UE 100 from the S-MeNB 200M to the T-MeNB 200M (MeNB to eNB change) is executed, and then the T-MeNB 200M adds another SeNB 200S (executes SeNB Addition).

Here, it may be desirable to change the SeNB 200S together with the handover of the MeNB 200M depending on a position environment of the UE 100 and/or a configuration state of the T-MeNB 200M.

In this case, if the handover (Inter MeNB Handover without SeNB Change) is executed in accordance with the first scenario, the SeNB 200S connected with the UE 100 is immediately changed (SeNB change is executed), and thus the procedure for maintaining the connection with the UE 100 may be useless.

In this regard, in the first embodiment, an optimal handover procedure in which the environment of the UE 100 and/or the configuration state of the T-MeNB 200M2 are considered is implemented.

Figure 8:
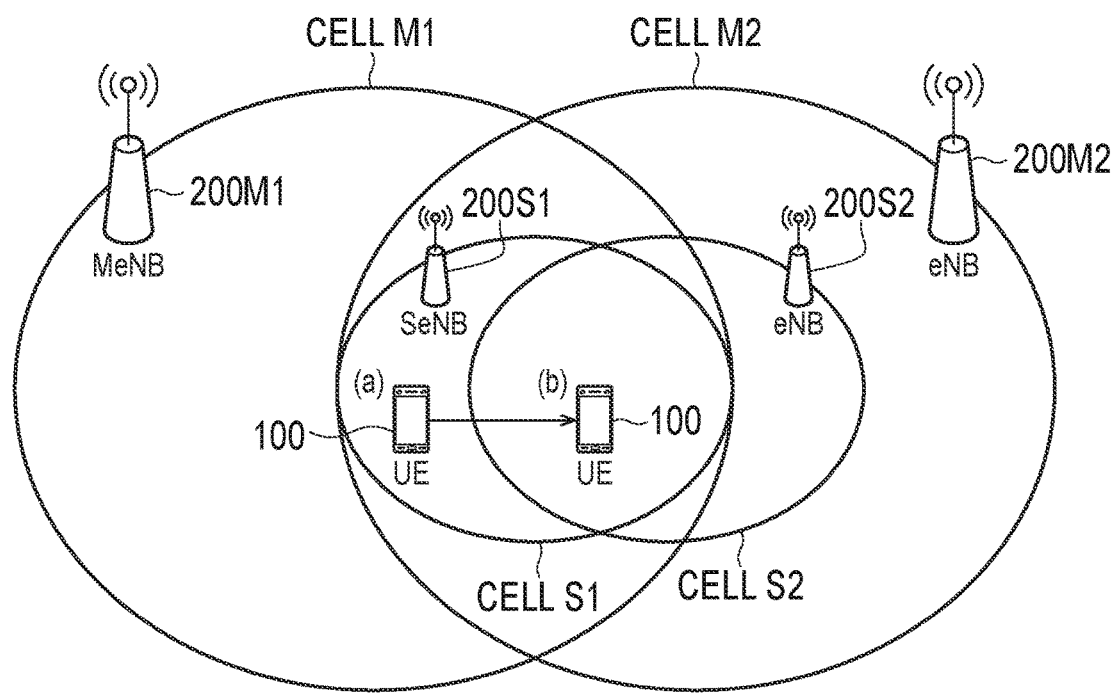
FIG. 8 is a diagram illustrating an operating environment according to a first embodiment.

FIG. 8 is a diagram illustrating an example of an environment of the UE 100 when the handover from the S-MeNB 200M1 to the T-MeNB 200M2 is executed.

In an "a" spot, the UE 100 is located within a range of a cell M1 managed by an S-MeNB 200M1 and a cell S1 managed by an SeNB 200S1 and has a connection with the S-MeNB 200M1 and the SeNB 200S1 in accordance with the dual connectivity scheme.

Then, after the UE 100 moves along an arrow, in a "b" spot, the UE 100 is located within a range of the cell M1 managed by the S-MeNB 200M1 and the cell S1 managed by the SeNB 200S1, and the UE 100 is also located within a range of a cell M2 managed by an eNB 200M2 and a cell S2 managed by an eNB 200S2.

In this case, if a measurement result for a reference signal transmitted from the cell managed by each eNB satisfies a predetermined condition, the UE 100 transmits a measurement report (Measurement Report) to the S-MeNB 200M1, and the S-MeNB 200M1 executes a handover of the UE 100 from the S-MeNB 200M1 to the eNB 200M2 (T-MeNB 200M2). For example, the handover of the UE 100 may be switching of a connection destination of the UE 100 from the S-MeNB 200M1 (or the cell managed by the S-MeNB 200M1) to another T-MeNB 200M2 (or the cell managed by the T-MeNB 200M2).

Further, the S-MeNB 200M1 and the T-MeNB 200M2 may be eNBs that manage the macro cell, the S-SeNB 200S1 and the eNB 200S2 may be eNBs that manage a cell (small cell) having a narrower area than the macro cell, for example, a nano cell or a pico cell. Further, the macro cell and the small cell may be operated at different frequencies.

Handover procedures (first to sixth handover procedures) of executing the handover of the UE 100 from the S-MeNB 200M1 to the T-MeNB 200M2 in the environment illustrated in FIG. 8 will be described below with reference to FIGS. 9 to 14.

Figure 9:
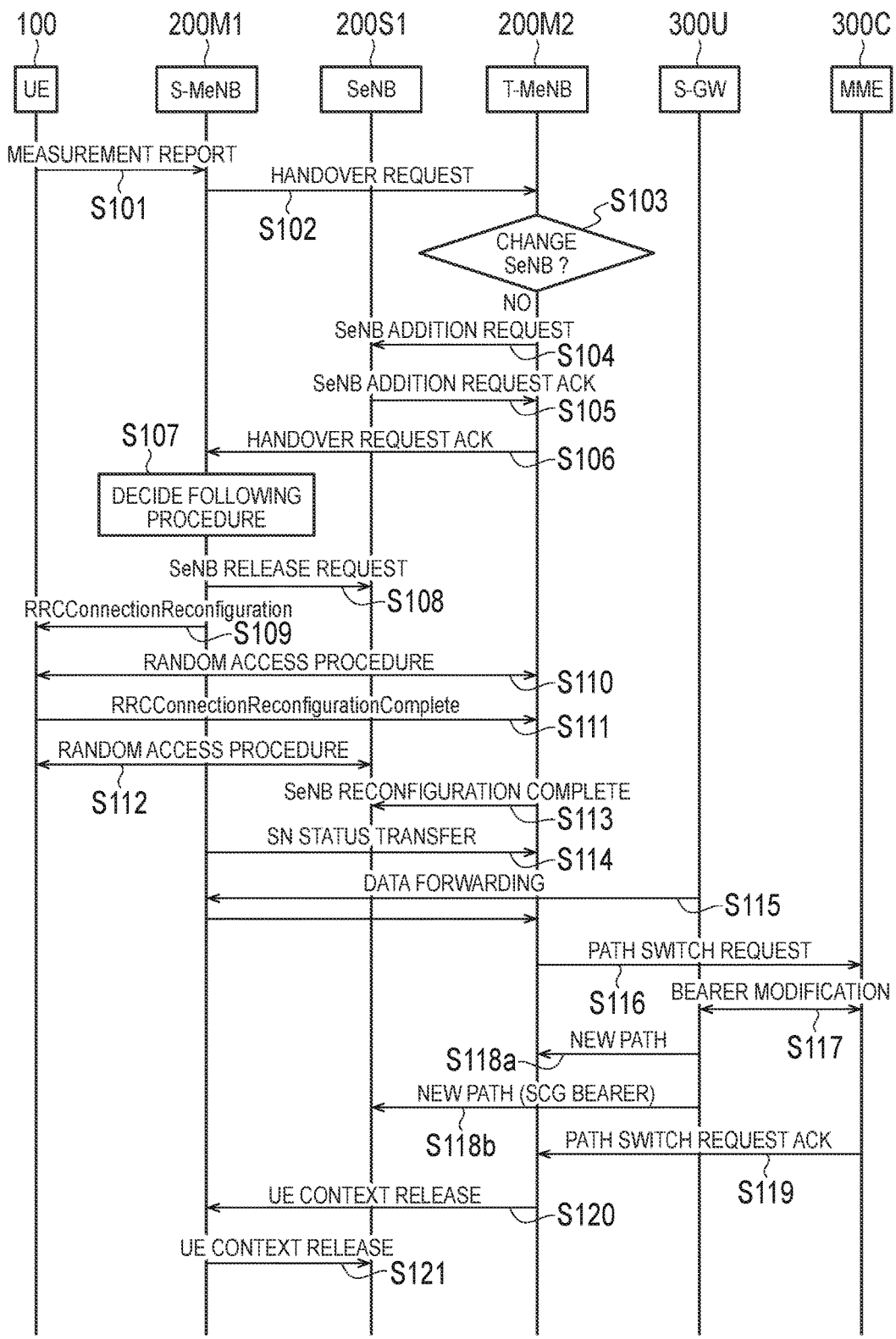
FIG. 9 is a sequence diagram related to a first handover procedure.

First, the first handover procedure will be described below with reference to FIG. 9.

The first handover procedure is a procedure in which the handover of the UE 100 is executed from the S-MeNB 200M1 to the T-MeNB 200M2 without changing the SeNB 200S1 connected with the UE 100 (while maintaining the connection).

For example, the first handover procedure may be a partial modification of the Inter MeNB Handover without SeNB Change procedure.

In step S101, if a measurement result for the signal transmitted from the eNB 200 (the S-MeNB 200M1 and/or the T-MeNB 200M2) satisfies a certain condition, the UE 100 transmits a measurement report including measurement results for signals transmitted from a plurality of eNB 200 (the S-MeNB 200M1, the T-MeNB 200M2, the SeNB 200S1 and/or the eNB 200S2) to the S-MeNB 200M1.

In step S102, upon receiving the measurement report from the UE 100, the S-MeNB 200M1 starts the first handover procedure. The first handover procedure may be started by a trigger other than the reception of the measurement report transmitted from the UE 100. If the first handover procedure is started, the S-MeNB 200M1 transmits a handover request to the T-MeNB 200M2. The handover request may include the measurement result received from the UE 100 in step S101. The S-MeNB 200M1 may include only the measurement results for the signals transmitted from the cells managed by some eNBs among the measurement results for the signals transmitted from the cells managed by a plurality of eNBs which are received from the UE 100 in the handover request and transmit the resulting handover request. The handover request may include an instruction to determine whether or not it is necessary to change the SeNB.

In step S103, the T-MeNB 200M2 determines whether or not it is necessary to change the SeNB 200S1 on the basis of predetermined information. Here, the changing of the SeNB 200S1 may include a case in which the UE 100 releases the connection with the SeNB 200S1 and/or newly establishes a connecting with an SeNB 200 (for example, the SeNB 200S2) different from the SeNB 200S1. The predetermined information may be one of the measurement results obtained by the UE 100 for the signals transmitted from the cells managed by a plurality of eNBs, information related to the SeNB 200 previously set by the T-MeNB 200M2 at the time of the dual connectivity with the UE 100, a radio link failure (S-Radio Link Failure (S-RLF)) in the SeNB 200, information related to the SeNB 200 which is configured in advance by operations, administration, and maintenance (OAM), a load state of the T-MeNB 200M2 (a radio resource consumption state, a processing load state, or the like), connection information between the SeNB 200S1 and the S-GW 300U, X2 connection information between the T-MeNB 200M2 and the SeNB 200S1, and moving speed information of the UE 100 or a combination of a plurality of pieces of information.

Here, in step S103, the T-MeNB 200M2 determines that it is not necessary to change the SeNB 200S1 (NO in step S103). As an example, the T-MeNB 200M2 may determine that it is not necessary to change the SeNB 200S1 in a case in which in the measurement result received from the UE 100, a quality of the signal transmitted from the SeNB 200S1 (an SINR, an RSRP, or the like) is a certain value or more and/or a quality of the signal transmitted from the SeNB 200S1 is higher than qualities of the signals transmitted from other eNBs (for example, the eNB 200S2).

Further, as an example, the T-MeNB 200M2 may determine that it is not necessary to change the SeNB 200S1 in a case in which the SeNB 200S1 has been previously set as the SeNB, the radio link failure of the SeNB 200S1 is a certain value or less, and/or the SeNB 200S1 is set as an SeNB in advance by the OAM.

In step S104, if the T-MeNB 200M2 determines that there is no need to change the SeNB 200S1 (NO in step S103), the T-MeNB 200M2 transmits an SeNB addition request to the SeNB 200S1.

In step S105, the SeNB 200S1 transmits an SeNB addition request response (SeNB Addition Request Acknowledgement) to the T-MeNB 200M2.

In step S106, the T-MeNB 200M2 transmits a handover request response (Handover Request Acknowledegment) to the S-MeNB 200M1. The handover request response includes information related to the necessity to change the SeNB 200S1 (information indicating that it is necessary to change the SeNB 200S1). The information related to the necessity to change the SeNB may include a result of determining whether or not it is necessary to change the SeNB 200S1 through the T-MeNB 200M2 and/or information indicating that the SeNB addition procedure (the transmission of the SeNB Addition Request, or the like) has been executed. This determination result is the determination result in S103 (NO in step S103) and indicates that it is not necessary to change the SeNB 200S1. The information related to the necessity to change the SeNB may include a priority used to select a plurality of eNBs included in the measurement result of the UE 100 as the SeNB.

Further, the handover request response may include configuration information (SeNB Release configuration) used for releasing the SeNB 200S1.

The T-MeNB 200M2 may transmit a SeNB change request instead of transmitting the handover request response or in addition to the transmission of the handover request response. In a case in which the T-MeNB 200M2 transmits the SeNB change request in addition to the transmission of the handover request response, the information related to the necessity to change the SeNB may be included in the SeNB change request rather than the handover request response.

In step S107, the S-MeNB 200M1 decides a subsequent procedure on the basis of the information included in the handover request response received from the T-MeNB 200M2. As an example, in a case in which the handover request response includes the determination result indicating that it is not necessary to change the SeNB 200S1, the S-MeNB 200M1 decides a procedure in which the SeNB 200S1 is not changed (or maintained) as the subsequent procedure (handover procedure). The procedure in which the SeNB 200S1 is not changed (or maintained) is a procedure including steps S108 to S121 to be described below, but it is preferable to include at least step S112 and/or step S113. The deciding of the procedure in which the SeNB 200S1 is not changed (or maintained) as the subsequent procedure may be a decision of continuing the handover procedure started from step S102 in which the SeNB 200S1 is not changed.

In step S108, the S-MeNB 200M1 transmits an SeNB release request to the SeNB 200S1.

In step S109, the S-MeNB 200M1 transmits an RRC connection reconfiguration to UE 100.

In step S110, the UE 100 executes a random access procedure on the T-MeNB 200M2.

In step S111, the UE 100 transmits an RRC connection reconfiguration complete to the T-MeNB 200M2.

In step S112, the UE 100 executes the random access procedure on the SeNB 200S1.

In step S113, the T-MeNB 200M2 transmits an SeNB reconfiguration complete to the SeNB 200S1.

In step S114, the S-MeNB 200M1 notifies the T-MeNB 200M2 of an SN Status Transfer message. The SN Status Transfer message is a notification related to a transfer status of uplink or downlink data from the S-MeNB 200M1 to the T-MeNB 200M2.

In step S115, the S-MeNB 200M1 executes data forwarding of transferring data destined for the UE 100 from the S-GW 300U to the T-MeNB 200M2 via the S-MeNB 200M1.

In step S116, the T-MeNB 200M2 transmits a path switch request to an MME 300C in order to switch the data path between the S-GW 300U and the S-MeNB 200M1 to the T-MeNB 200M2.

In step S117 and step S118, the S-GW 300U performs bearer modification with the MME 300C and sets a new data path with the T-MeNB 200M2 (S118a) and sets an SCG bearer with the SeNB 200S1 (S118b). In step S118b, the SCG bearer may be newly set. Further, instead of newly setting the SCG bearer, the SCG bearer may be maintained if the S-GW 300U is not changed before and after the handover in a state in which the SCN bearer is set by the S-MeNB 200M1.

In step S119, the MME 300C transmits a path switch request response (Path Switch Request Acknowledge) to the T-MeNB 200M2.

In step S120, the T-MeNB 200M2 transmits a UE context release to the S-MeNB 200M1.

In step S121, the S-MeNB 200M1 transmits the UE context release to the SeNB 200S1.

In step S104, the T-MeNB 200M2 may transmit an SeNB modification request to the SeNB 200S1 instead of transmitting the SeNB addition request. In this case, in step S105, the SeNB 200S1 transmits an SeNB modification request response (SeNB Modification Request Acknowledgment) to the T-MeNB 200M2 instead of transmitting the SeNB addition request response. In this case, the S-MeNB 200M1 may not perform step S108 and/or step S121.

According to the first handover procedure, it is possible to execute an appropriate handover procedure in accordance with the necessity to change the SeNB 200S1 in the T-MeNB 200M2. In other words, in a case in which it is determined that it is not necessary to change (necessary to maintain) the SeNB 200S1 in the T-MeNB 200M2, the connection between the UE 100 and the SeNB 200S1 can be maintained without being released even after the handover procedure.

Figure 10:
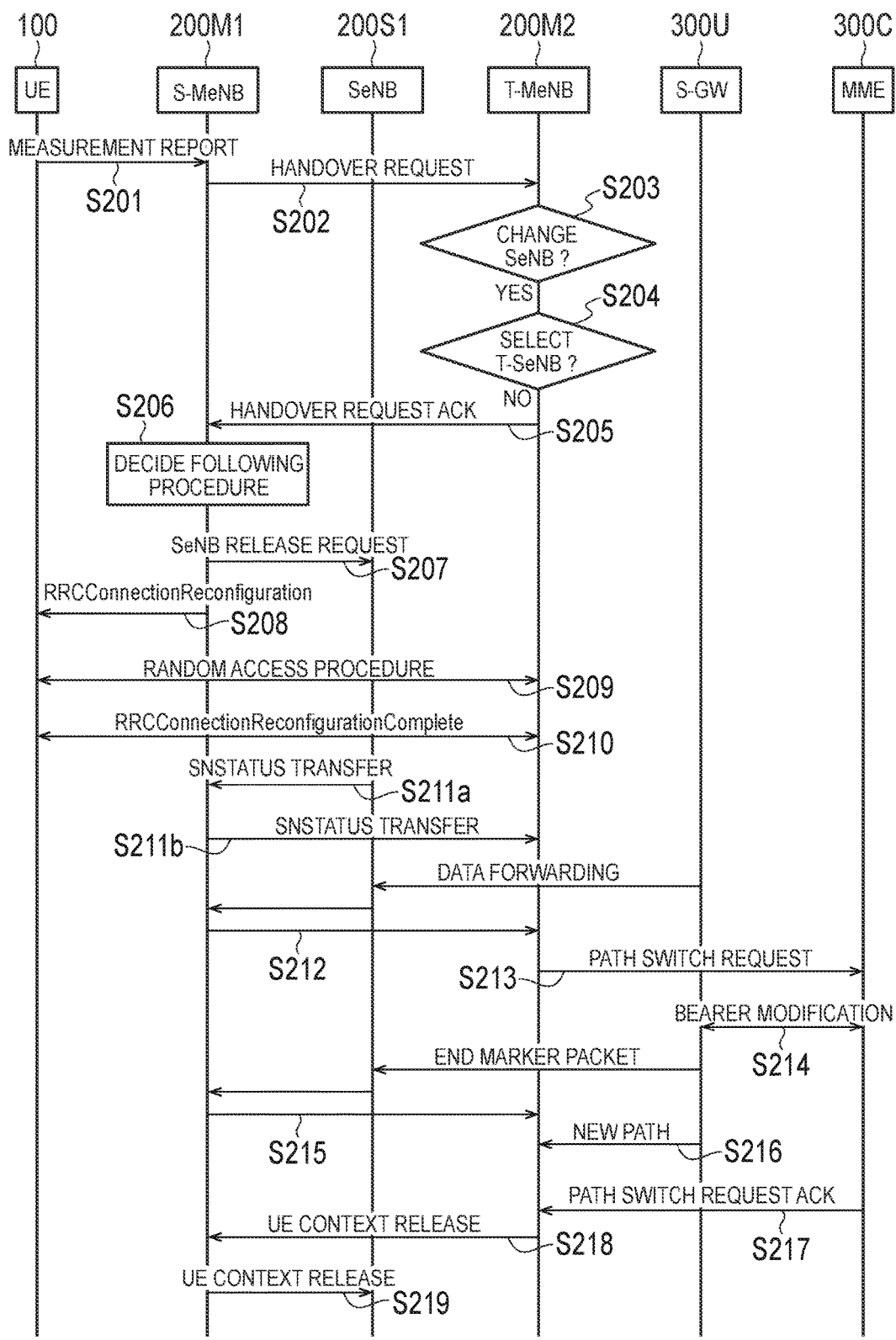
FIG. 10 is a sequence diagram related to a second handover procedure.

Next, the second handover procedure will be described below with reference to FIG. 10.

The second handover procedure is a procedure in which the connection between the UE 100 and the SeNB 200S1 is not maintained but released, and the handover of the UE 100 is performed from the S-MeNB 200M1 to the T-eNB 200M2.

The second handover procedure may be a partial modification of the MeNB to eNB change procedure.

The UE 100, the S-MeNB 200M1, and the T-eNB 200M2 perform steps S201 to S203. Steps S201 to S203 are the same operations as steps S101 to S103 in the first handover procedure.

In step S203, the T-eNB 200M2 determines that it is necessary to change (or not necessary to maintain) the SeNB 200S1 (YES in step S203). As an example, the T-MeNB 200M2 may determine that it is necessary to change the SeNB 200S1 in a case in which in the measurement result received from the UE 100, a quality of the signal transmitted from the cell managed the SeNB 200S1 (the SINR, the RSRP, or the like) is less than a certain value and/or a quality of the signal transmitted from the cell managed by the SeNB 200S1 is lower than qualities of the signals transmitted from cells managed by other eNBs 200 (for example, the eNB 200S2).

Further, as an example, the T-eNB 200M2 may determine that it is necessary to change the SeNB 200S1 in a case in which the SeNB 200S1 is not previously set as the SeNB, the radio link failure of the SeNB 200S1 is a certain value or more, and/or the SeNB 200S1 is not set as an SeNB in advance by the OAM.

In step S204, the T-eNB 200M2 determines whether or not it is possible to select the T-SeNB 200 (for example, the eNB 200S2). Here, the T-eNB 200M2 may determine the eNB that can be selected as the T-SeNB 200 on the basis of the predetermined information. As an example, the eNB that can be selected as the T-eNB 200M2 may be determined in accordance with the presence or absence of an eNB satisfying a predetermined condition among a plurality of eNBs included in the measurement result in the UE 100 received from the S-MeNB 200M1. The eNB satisfying the predetermined condition may be an eNB which has a signal quality (the SINR, the RSRP, or the like) of a certain value or more, has been previously set as an SeNB by the T-eNB 200M2, has a radio link failure less than a certain value, and/or is set as an SeNB in advance by the OAM.

The T-eNB 200M2 may not perform step S204, and in a case in which it is determined in step S203 that it is necessary to change the SeNB 200S1 (YES in step S203), the process may proceed to step S205.

In a case in which step S204 is not performed or in a case in which the T-SeNB is unable to be selected because there is no eNB satisfying the predetermined condition in step S204 (NO in step S204), in step S205, the T-eNB 200M2 transmits the handover request response (Handover Request Acknowledgement) to the S-MeNB 200M1. Here, the handover request response includes information related to the necessity to change the SeNB. The information related to the necessity to change the SeNB may include a result of determining whether or not it is necessary to change the SeNB 200S1 through the T-eNB 200M2 and/or information indicating that the SeNB addition procedure (the transmission of the SeNB Addition Request, or the like) has not been executed. This determination result is the determination result in S203 (NO in step S203) and indicates that it is necessary to change the SeNB 200S1.

Further, if the T-eNB 200M2 determines that it is necessary to change the T-eNB 200S1, the T-eNB 200M2 does not transmit (or prohibits transmission of) the SeNB addition request to the SeNB 200S1.

In step S206, the S-MeNB 200M1 decides a subsequent procedure (handover procedure) on the basis of the information included in the handover request response received from the T-eNB 200M2. As an example, in a case in which a determination result indicating that it is necessary to change the SeNB 200S1 and/or information indicating that the SeNB addition procedure (the transmission of the SeNB addition request or the like) is not performed are included in the handover request response, the S-MeNB 200M1 decides a procedure in which the SeNB 200S1 is not maintained (the connection with the SeNB 200S1 is released) as the subsequent procedure (handover procedure). The procedure in which the SeNB is not maintained is a procedure including steps S206 to 218 to be described below, but it is preferable not to include step S112 and/or step S113 in the first handover procedure (or execution of the operations corresponding to step S112 and/or step S113 is prohibited). In other words, the procedure in which the SeNB 200S1 is not maintained is preferably a procedure in which the UE 100 and/or the T-eNB 200M2 do not establish a connection with the SeNB 200S1.

The S-MeNB 200M1 executes steps S207 to S210 which are the same operations as in steps S108 to S111 in the first handover procedure.

In step S211 and step S212, the S-MeNB 200M1 executes data forwarding of transferring data destined for the UE 100 from the S-GW 300U to the T-eNB 200M2 via the SeNB 200S1 and the S-MeNB 200M1.

In step S213, the T-eNB 200M2 transmits the path switch request to the MME 300C in order to switch the data path between the S-GW 300U and the S-MeNB 200M1 to the T-eNB 200M2.

In step S214, the S-GW 300U executes the bearer modification with the MME 300C.

In step S215, the S-GW 300U transmits an End Marker Packet to the T-MeNB 200M2 via the SeNB 200S1 and the S-MeNB 200M1.

In step S216, the S-GW 300U sets a new data path with the T-eNB 200M2.

In step S217, the MME 300C transmits the path switch request response (Path Switch Request Acknowledge) to the T-eNB 200M2.

In step S218, the T-eNB 200M2 transmits the UE context release to the S-MeNB 200M1.

In step S219, the S-MeNB 200M1 transmits the UE context release to the SeNB 200S1.

According to the second handover procedure, it is possible to execute an appropriate handover procedure in accordance with the necessity to change the SeNB 200S1 in the T-eNB 200M2. In other words, in a case in which it is determined that it is necessary to change (not necessary to maintain) the SeNB 200S1 in the T-MeNB 200M2, execution of the process of maintaining the SeNB 200S1 (for example, the random access procedure for the SeNB or the like) may be omitted.

Further, in a case in which the T-eNB 200M2 newly sets the SeNB 200S (for example, the SeNB 200S2) to be connected with the UE 100 after the second handover procedure is completed, the existing SeNB addition procedure (SeNB addition) (3 GPP TS 36.300 v12.5.0) or the like may be used.

Figure 11:
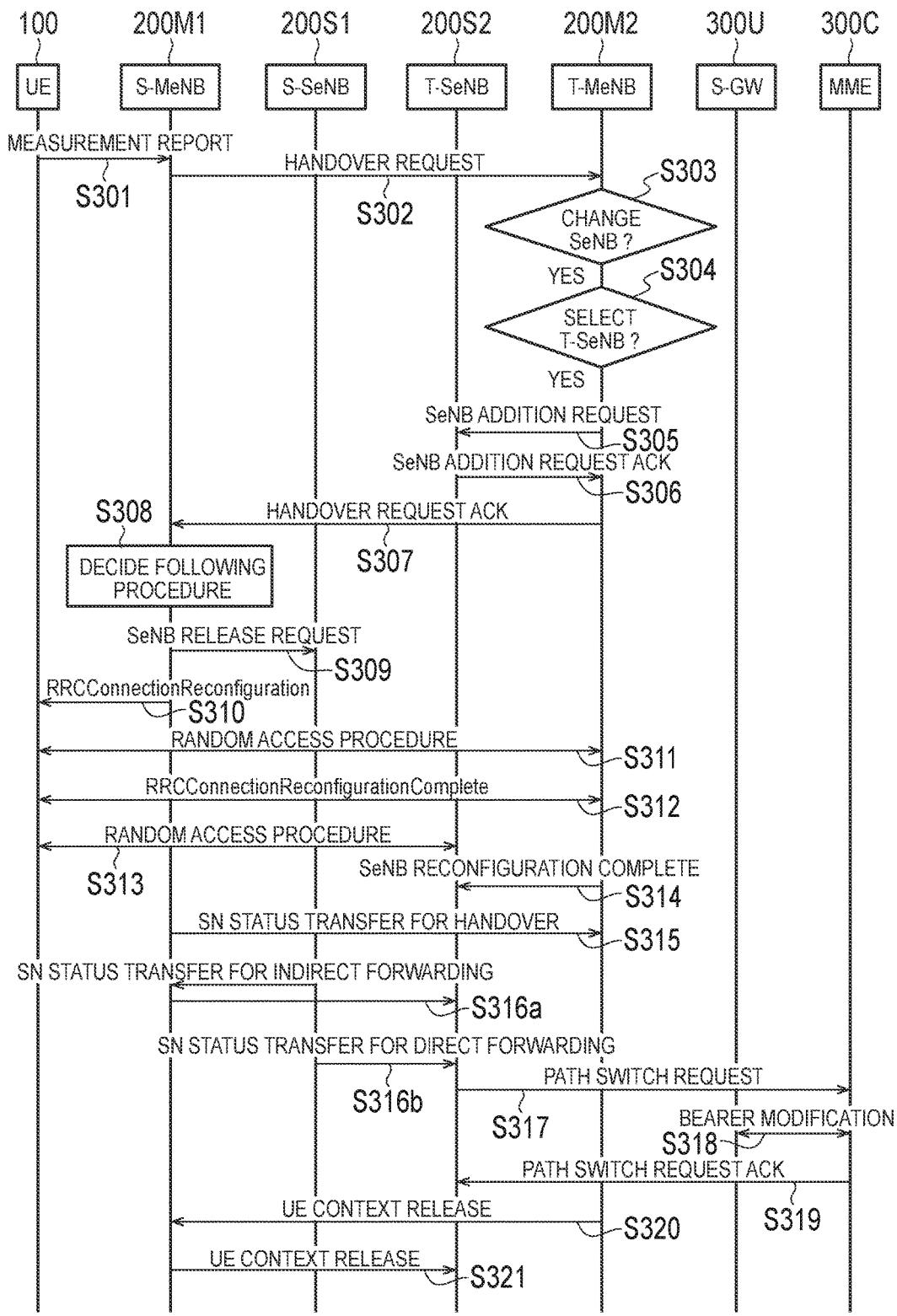
FIG. 11 is a sequence diagram related to a third handover procedure.

Next, the third handover procedure will be described with reference to FIG. 11.

The third handover procedure is a procedure in which the connection of the UE 100 and the SeNB 200S1 (the S-SeNB 200S1) is not maintained but released, and a connection with the T-SeNB 200S2 is established, and the handover of the UE 100 is executed from the S-MeNB 200M1 to the T-MeNB 200M2.

The UE 100 executes step S301. Step S301 is the same operation as step S101 in the first handover procedure and step S201 in the second handover procedure.

In step S302, the S-MeNB 200M1 transmits the handover request to the T-MeNB 200M2. As an example, the S-MeNB 200M1 may include the measurement result received from the UE 100 in step S301 in the handover request to be transmitted to the T-MeNB 200M2, and may include only the measurement results for the reference signals transmitted from the cells managed by some eNBs among the measurement results for the reference signals transmitted from the cells managed by a plurality of eNBs 200 which are received from the UE 100 in the handover request. For example, some eNBs 200 may be eNBs 200 which have established the X2 connection with the S-MeNB 200M1, and in this case, the S-MeNB 200M1 may include identifiers (IDs) of the eNB 200 and the S-SeNB 200S1 which have established the X2 connection in the handover request.

The T-MeNB 200M2 executes steps S303 and S304. Steps S303 and S304 are the same operations as steps S203 and S204 in the second handover procedure. Step S303 may be omitted, and if the handover request is received in step S302, in step S304, the T-MeNB 200M2 may select the T-SeNB 200S2.

In step S304, the T-MeNB 200M2 selects the T-SeNB 200S2 to which the UE 100 is newly connected (YES in step S304). As an example, the T-eNB 200M2 may select an eNB having the best condition among eNBs 200 satisfying the predetermined condition among a plurality of eNBs 200 included in the measurement result in the UE 100 received from the S-MeNB 200M1 as the T-SeNB 200S. The eNB 200 satisfying the predetermined condition may be an eNB which has a signal quality (the SINR, the RSRP, or the like) of a certain value or more, has been previously set as an SeNB by the T-eNB 200M2, has a radio link failure less than a certain value, and/or is set as an SeNB in advance by the OAM. The eNB 200 having the best condition may be an eNB in which a plurality of conditions are most satisfied (an eNB which has a signal quality (the SINR, the RSRP, or the like) of a certain value or more, has been previously set as an SeNB by the T-eNB 200M2, has a radio link failure less than a certain value, and/or is set as an SeNB in advance by the OAM.).

In step S305, the T-MeNB 200M2 transmits the SeNB addition request to the T-SeNB 200S2 selected in step S304. Further, the SeNB addition request may include the identifier (ID) of the S-SeNB 200S1 received from the S-MeNB 200M1 in step S302.

In step S306, the T-SeNB 200S2 transmits the SeNB request response (SeNB Addition Request Acknowledg). The T-SeNB 200S2 determines whether or not the X2 connection with the S-SeNB 200S1 has been established from the identifier of the S-SeNB 200S1 included in the SeNB addition request. Here, if the X2 connection with the S-SeNB 200S1 is established, and the direct data forwarding is able to be performed, the T-SeNB 200S2 includes an X2 tunnel endpoint identifier (TEID) of the T-SeNB 200S2, and transmits the SeNB request response (SeNB Addition Request Acknowledgement) to the T-MeNB 200M2. The X2 TEID may be used to transfer data for X2-U user plane. As an example, the direct data forwarding means direct transfer of data destined for the UE 100 from the S-SeNB 200S1 to the T-SeNB 200S2. On the other hand, if the X2 connection with the S-SeNB 200S1 is not established, and direct data forwarding is unable to be performed, the T-SeNB 200S2 does not include the X2 TEID of the T-SeNB 200S2 and transmits the SeNB request response to the T-MeNB 200M2.

In step S307, the T-MeNB 200M2 transmits the handover request response (Handover Request Acknowledgement) to the S-MeNB 200M1. The handover request response may include information related to the necessity to change the SeNB 200S1. Further, the handover request response may include the configuration information (RRC Configuration information) of the T-SeNB 200S2 for the RRC connection reconfiguration of the UE 100. The configuration information of the T-SeNB 200S2 may be transmitted from the T-SeNB 200S2 in step S306. Further, in a case in which the T-MeNB 200M2 receives the X2 TEID of the T-SeNB 200S2 in step S306, the T-MeNB 200M2 may include the X2 TEID of the T-SeNB 200S2 in the handover request response and transmit the resulting handover request response. Further, the handover request response may include information similar to the information transmitted in step S106.

In step S308, the S-MeNB 200M1 decides a subsequent procedure (handover procedure) on the basis of the information related to the necessity to change the SeNB 200S1 included in the handover request response, the configuration information of the T-SeNB 200S2 for the RRC reconfiguration of the UE 100 (RRC Configuration information) and/or the X2 TEID of the T-SeNB 200S2. As an example, in a case in which the configuration information of the T-SeNB 200S2 for the RRC reconfiguration of the UE 100 (RRC Configuration information) and/or the X2 TEID of the T-SeNB 200S2 are included, the S-MeNB 200M1 may decide a procedure of establishing the connection with the S-T-SeNB 200S2 as the subsequent process.

In step S309, the S-MeNB 200M1 transmits the SeNB release request to the S-SeNB 200S1. In a case in which the X-TEID of the T-SeNB 200S2 is received in step S307, the S-MeNB 200M1 may include the X2 TEID of the T-SeNB 200S2 in the SeNB release request and transmit the resulting SeNB release request.

In step S310, the S-MeNB 200M1 transmits the RRC Connection Reconfiguration including the configuration information of the T-SeNB 200S2 included in the handover request response received from the T-SeNB 200M2 to the UE 100.

The UE 100 performs steps S311 to S312 for the T-MeNB 200M2. Steps S311 to S312 correspond to steps S110 to S111 in the first handover procedure.

In step S313, the UE 100 executes the random access procedure for the T-SeNB 200S2. The UE 100 may execute the random access procedure using the received configuration information of the T-SeNB 200S2 received in step S309. The UE 100 may start the process of step S313 in the middle of step S311.

In step S314, the T-MeNB 200M2 notifies the T-SeNB 200S2 of the SeNB reconfiguration complete.

In step S315, the S-MeNB 200M1 notifies the T-MeNB 200M2 of the SN Status Transfer message for data forwarding occurring during the handover.

In a case in which the X2 TEID of the T-SeNB 200S2 is not included in the source eNB release request received from the S-MeNB 200M1 in step S309, in step 316*a*, the S-SeNB 200S1 transmits the SN Status Transfer message to the T-SeNB 200S2 via the S-MeNB 200M1 for indirect forwarding (indirect data forwarding). Thereafter, the S-SeNB 200S1 performs the indirect forwarding to indirectly transfer the data destined for the UE 100 to the T-SeNB 200S2 via the S-MeNB 200M1.

On the other hand, in a case in which the X2 TEID of the T-SeNB 200S2 is included in the source eNB release request received in step S309, in step 316*b*, the S-SeNB 200S1 transmits the SN Status Transfer message to the T-SeNB 200S2 for direct forwarding (direct data forwarding). Thereafter, the S-SeNB 200S1 performs the direct forwarding to directly transfer the data destined for the UE 100 to the T-SeNB 200S2.

In other words, the S-SeNB 200S1 executes one of step S316*a* and step S316*b*.

Steps S317 to S321 correspond to steps S116 to S121 in the first handover procedure, and a new path is set between the S-GW 300U and the T-SeNB 200S2 instead of setting a new path between the S-GW 300U and the SeNB 200S1 in step S118*b*.

According to the third handover procedure, it is possible to execute an appropriate handover procedure in accordance with the necessity to change the S-SeNB 200S1 in the T-MeNB 200M2. In other words, in the T-MeNB 200M2, in a case in which it is determined that it is necessary to change the S-SeNB 200S1, it is possible to perform the handover from the S-MeNB 200M1 to the T-MeNB 200M2 and perform switching from the S-SeNB 200S1 to the T-SeNB 200S2, it is unnecessary to change the SeNB 200S after the handover of the MeNB 200M, and it is possible to change the SeNB 200S efficiently.

Figure 12:
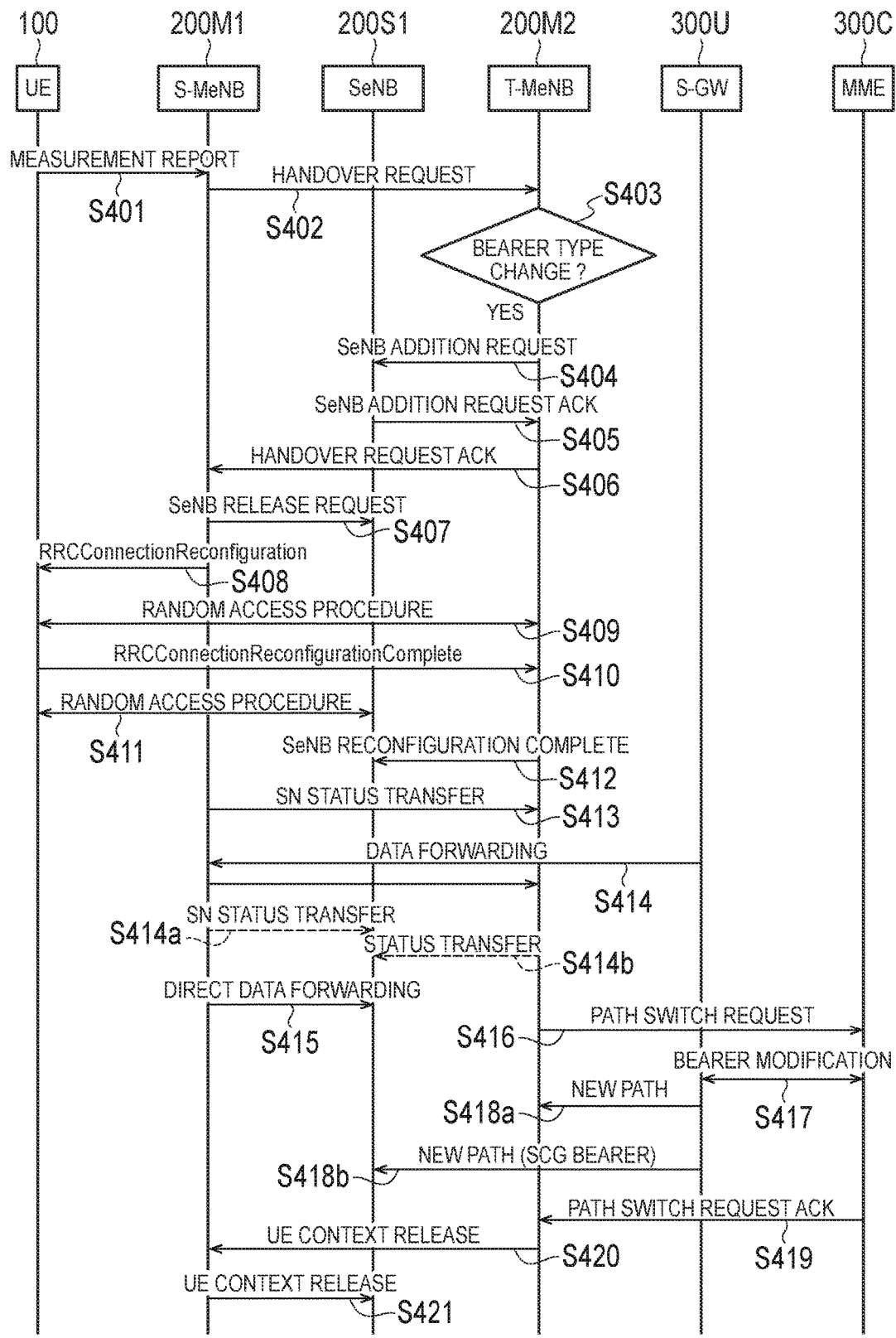
FIG. 12 is a sequence diagram related to a fourth handover procedure.

Next, the fourth handover procedure will be described below with reference to FIG. 12.

The fourth handover procedure is a procedure in which the handover of the UE 100 is performed from the S-MeNB 200M1 to the T-MeNB 200M2 without changing the SeNB 200S1 connected with the UE 100 (in the state in which the connection with the SeNB 200S1 is maintained), and includes a procedure in which the MCG bearer established (or set) by the S-MeNB 200M1 is changed to the SCG bearer used (or managed) by the SeNB 200S1.

The UE 100 executes step S401. Step S401 is the same operation as step S101 in the first handover procedure.

In step S402, the S-MeNB 200M1 transmits the handover request to the T-MeNB 200M2. As an example, the handover request may include information indicating that the bearer type is requested to be changed (for example, information indicating that the change from the MCG bearer to the SCG bearer is requested). As an example, the handover request may include the information of the MCG bearer managed by the S-MeNB 200M1 (for example, the bearer ID) and/or information of the SCG bearer. Alternatively, the handover request may include a UE aggregate maximum bit rate (UE Aggregate Maximum Bitrate) and/or a UE aggregate maximum bit rate in the SeNB 200S1 (SeNB UE Aggregate Maximum Bitrate). The bearer ID may be an E-UTRAN access bearer (E-RAB) ID. Further, information related to a type of bearer (the MCG bearer, the SCG bearer, or the split bearer) may be included in the handover request. Further, the information related to the type of bearer included in the handover request may be associated with the bearer ID of the bearer which is included in the handover request and managed by the S-MeNB 200M1. Accordingly, the T-MeNB 200M2 that has received the handover request is able to specify the type of bearer (the MCG bearer, the SCG bearer, the split bearer, or the like) corresponding to the bearer ID managed by the S-MeNB 200M1.

In step S403, the T-MeNB 200M2 determines whether or not the bearer type is changed. In other words, the T-MeNB 200M2 determines whether or not the MCG bearer established by the S-MeNB 200M1 is changed to the SCG bearer of the SeNB 200S1. As an example, in a case in which information indicating that the bearer type is requested to be changed is included in the handover request, the T-MeNB 200M2 may determine that the bearer type is changed. As an example, the T-MeNB 200M2 may determine that the bearer type is changed on the basis of a radio resource management (RRM) of the T-MeNB 200M2. Specifically, the T-MeNB 200M2 may determine that the bearer type is changed by determining that the data for the UE 100 has to be transmitted from the SeNB 200S1 in the S-MeNB 200M1 on the basis of the resource state and the load state of the SeNB 200S1, the measurement results for the signals transmitted from the T-MeNB 200M2 and/or the SeNB 200S1 in the UE 100, the UE aggregate maximum bit rate (UE Aggregate Maximum Bit Rate), the UE aggregate maximum bit rate (SeNB UE Aggregate Maximum Bit Rate) in the SeNB 200S1, and/or the like.

If the bearer type is determined to be changed in step S403 (YES in S403), the T-MeNB 200M2 stores the identifier (bearer ID) of the MCG bearer to be changed. As an example, the T-MeNB 200M2 may acquire the information of the MCG bearer to be changed through Handover Preparation Information which is one of Inter-node RRC information elements.

In step S404, the T-MeNB 200M2 includes information of the SCG bearer which is requested to be established (or set) in the SeNB addition request, and transmits the resulting SeNB addition request to the SeNB 200S1. As an example, the T-MeNB 200M2 includes the information of the SCG bearer in the SCG Bearer IE in the E-RAB To Be Added Item IE in the SeNB addition request. Here, the information of the SCG bearer is E-RAB ID, E-RAB Level QoS Parameters, DL Forwarding, S1 UL GTP Tunnel Endpoint, and the like. Further, in a case in which a bearer ID different from the bearer ID of the already established SCG bearer is included in the received SeNB addition request, the SeNB 200S1 determines that there is a request of adding the SCG bearer corresponding to the different bearer ID (of changing the MCG bearer corresponding to the bearer ID to the SCG bearer).

In step S405, the SeNB 200S1 transmits the SeNB addition request response (SeNB Addition Request Acknowledgement) including the X2 TEID of the SeNB 200S1 for the data forwarding from the S-MeNB 200M1 to the SeNB 200S1 to the T-MeNB 200M2.

In step S406, the T-MeNB 200M2 includes the X2 TEID of the SeNB 200S1 received from the SeNB 200S1 and the identifier (bearer ID) of the MCG bearer which is stored in step S403 and managed by the S-MeNB 200M1 which changes the bearer type from the MCG bearer to the SCG bearer in the handover request response (Handover Request Acknowledgement), and transmits the resulting handover request response.

Steps S407 to S414 are executed. Steps S407 to S414 correspond to steps S108 to S115 in the first handover procedure.

In step S415, the S-MeNB 200M1 performs direct (data) forwarding (direct transfer) of the data destined for the UE 100 which is buffered (stored) in the MCG bearer indicated by the identifier of the MCG bearer received in step S406 or buffered in a storage region corresponding to the MCG bearer to the SeNB 200S1 for the X2 TEID of the SeNB 200S1. Further, the direct (data) forwarding is transferring uplink data or downlink data destined for UE 100 directly from the S-MeNB 200M1 to the SeNB 200S1 (without going through other eNBs 200).

Steps S416 to S421 are executed. Steps S416 to S421 correspond to steps S116 to 121 in the first handover procedure.

Further, before step S415 and after step S413, the S-MeNB 200M1 may notifies the SeNB 200S1 of the SN Status Transfer message related to the bearer used for the direct forwarding of step S415 (the bearer whose bearer type is changed from the MCG bearer to the SCG bearer) (step S414a).

Further, instead of notifying the SeNB 200S1 of the SN Status Transfer message, in step S413, the S-MeNB 200M1 may transmit SN Status Transfer of the MCG bearer (whose bearer type is not changed) and SN Status Transfer of the bearer whose bearer type is changed from the MCG bearer to the SCG bearer as the SN Status Transfer message to be transmitted to the T-MeNB 200M2. Thereafter, the T-MeNB 200M2 may transfer only the SN Status Transfer of the bearer whose bearer type is changed from the MCG bearer to the SCG bearer among the SN Status Transfers received from the S-MeNB 200M1 to the SeNB 200S1 (step S414b). At this time, the T-MeNB 200M2 may be able to extract only the SN Status Transfer of the bearer whose bearer type is changed from the MCG bearer to the SCG bearer among the SN Status Transfers received from the S-MeNB 200M1 on the basis of the change of the bearer type in step S403.

Further, in a case in which an instruction to perform the direct forwarding from the S-MeNB 200M1 to the SeNB 200S1 is given, the T-MeNB 200M2 may include a direct forwarding indicator (Direct Data Forwarding Indicator) in the handover request response to be transmitted in step S406. Accordingly, the S-MeNB 200M1 is able to determine whether or not the direct forwarding from the S-MeNB 200M1 to the SeNB 200S1 is requested. The direct forwarding indicator may be associated with the bearer ID and/or the X2 TEID of the SeNB 200S1 included in the handover request response. Accordingly, in a case in which a plurality of bearer IDs and/or X2 TEIDs are included in the handover request response, the S-MeNB 200M1 is able to determine the bearer ID and/or the X2 TEID corresponding to the bearer ID and/or the X2 TEID for the direct forwarding.

According to the fourth handover procedure, when the handover from the S-MeNB 200M1 to the T-MeNB 200M2 is performed, it is possible to change the bearer type and perform direct forwarding from the S-MeNB 200M1 to the SeNB 200S1.

Figure 13:
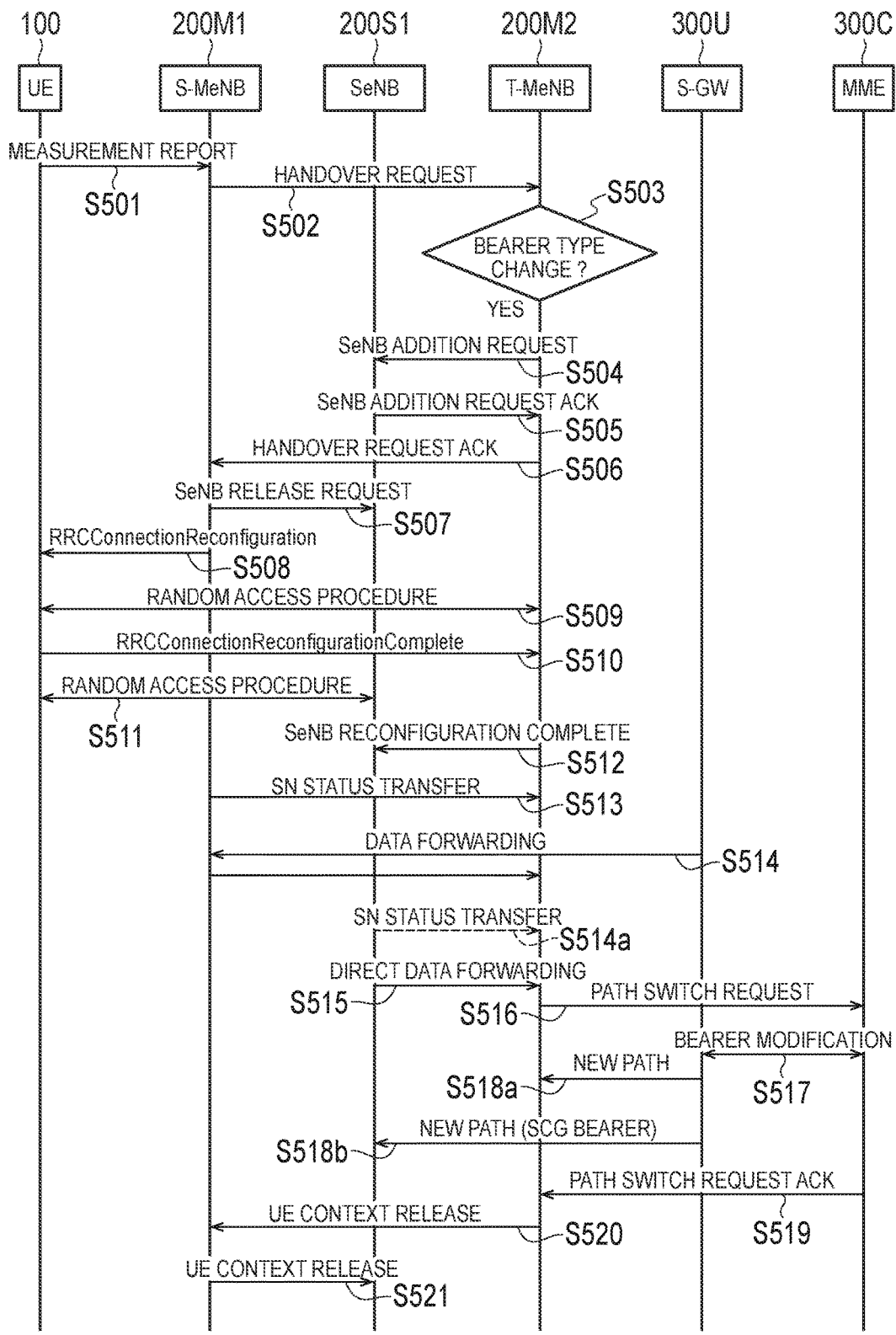
FIG. 13 is a sequence diagram related to a fifth handover procedure.

Next, the fifth handover procedure will be described below with reference to FIG. 13.

The fifth handover procedure is a procedure in which the handover of the UE 100 is performed from the S-MeNB 200M1 to the T-MeNB 200M2 without changing the SeNB 200S1 connected with the UE 100 (in the state in which the connection with the SeNB 200S1 is maintained) and includes a procedure in which the SCG bearer established (set) by the SeNB 200S1 is changed to the MCG bearer used (managed) by the T-MeNB 200M2.

The UE 100 executes step S501. Step S501 is the same operation as step S101 in the first handover procedure.

In step S502, the S-MeNB 200M1 transmits the handover request to the T-MeNB 200M2. The handover request includes the identifier of the SCG bearer established (set) by the SeNB 200S1. Further, the handover request may include the identifier of the MCG bearer established (set) by the S-MeNB 200M1. As an example, the handover request may include information indicating that the bearer type is requested to be changed (for example, information indicating that the change from the SCG bearer to the MCG bearer is requested).

In step S503, the T-MeNB 200M2 determines whether or not the bearer type is changed. In other words, the T-MeNB 200M2 determines whether or not the SCG bearer established (set) by the SeNB 200S1 is changed to the MCG bearer used in the T-MeNB 200M2.

If the bearer type is determined to be changed on the basis of whether or not the information indicating that the bearer type is requested to be changed is included in the RRM or the handover request in step S503 (YES in S503), the T-MeNB 200M2 stores the identifier of the SCG bearer to be changed and the identifier of the MCG bearer to be newly set by the T-MeNB 200M2.

In step S504, the T-MeNB 200M2 transmits the SeNB addition request. Here, the T-MeNB 200M2 may include the setting of the SCG bearer set by the SeNB 2001 in the SCG bearer IE of the E-RAB To Be Added Item IE in the SeNB addition request. Further, the T-MeNB 200M2 may include the X2 TEID of the T-MeNB 200M2 in the SeNB addition request. The X2 TEID of the T-MeNB 200M2 is used for the direct forwarding from the SeNB 200S1 to the T-MeNB 200M2. Further, the direct (data) forwarding is transferring uplink data or downlink data destined for UE 100 directly from the SeNB 200S1 to the T-MeNB 200M2 (without going through other eNBs 200).

Upon receiving the SeNB addition request, the SeNB 200S1 determines that it is requesting to change the SCG bearer established by the SeNB 200S1 to the MCG bearer for use in the T-MeNB 200M2. As an example, the SeNB 200S1 may determine that the bearer is requested to be changed when the setting of the SCG bearer established by the SeNB 200S1 or the X2 TEID of the T-MeNB 200M2 is included in the SeNB addition request. Further, in a case in which the ID of the already established SCG bearer (or the IDs of some SCG bearer among a IDs of a plurality of already established SCG bearers) is not included in the received SeNB addition request, the SeNB 200S1 may determine that it is requested to delete the SCG bearer corresponding to the ID of the bearer (or to change from the SCG bearer corresponding to the ID of the bearer to the MCG bearer).

In step S505, the SeNB 200S1 transmits the SeNB addition request response (SeNB Addition Request Acknowledgement) to the T-MeNB 200M2.

In step S506, the T-MeNB 200M2 transmits the handover request response (Handover Request Acknowledgement) to the S-MeNB 200M1.

Steps S507 to S514 are executed. Steps S507 to S514 correspond to steps S108 to S115 in the first handover procedure.

In step S515, the SeNB 200S1 performs direct forwarding (direct transmission) of the data (uplink data or downlink data) destined for the UE 100 which is buffered (stored) in the SCG bearer established by the SeNB 200S1 or buffered in a storage region corresponding to the SCG bearer for the X2 TEID of the T-MeNB 200M2 received in step S504. The SCG bearer may include information related to the setting in the SeNB addition request.

The T-MeNB 200M2 may include the X2 TEID of the T-MeNB 200M2 in the handover request response transmitted in step S506 instead of including the X2 TEID of the T-MeNB 200M2 in the SeNB addition request to be transmitted to the SeNB 200M1 in step S504. The X2 TEID of the T-MeNB 200M2 includes the X2 TEID used for the direct forwarding (the SeNB 200S1→the T-MeNB 200M2) in step S515 and the X2 TEID for the MCG bearer. In step S507, the S-MeNB 200M1 may include only the X2 TEID used for the direct forwarding among the X2 TEIDs of the T-MeNB 200M2 included in the handover request response in the SeNB release request and transmit the resulting SeNB release request to the SeNB 200S1. Thereafter, in step S513, the S-MeNB 200M1 may transmit the SN Status Transfer message associated with only the MCG bearer (the MCG bearer corresponding to the TEID for the MCG bearer included in the handover request response) to the T-MeNB 200M2. Thereafter, the SeNB 200S1 may transmit the SN Status Transfer message associated with only the bearer whose bearer type is changed (the bearer corresponding to the TEID used for the direct forwarding) to the T-MeNB 200M2 (S514a). Before step S513, the SeNB 200S1 may transmit information related to the bearer whose bearer type is changed from the SCG bearer to the MCG bearer to the S-MeNB 200M1. In this case, in step S513, the S-MeNB 200M1 may include the information related to the bearer to be changed which is received from the SeNB 200 in the SN Status Transfer message to be transmitted to the T-MeNB 200M2.

Further, when an instruction to perform the direct forwarding from the SeNB 200S1 to the T-MeNB 200M2, the T-MeNB 200M2 may include the direct forwarding indicator (Direct Data Forwarding Indicator) in the handover request response transmitted in step S506. Accordingly, the S-MeNB 200M1 is able to determine whether or not the direct forwarding (the SeNB 200S1→the T-MeNB 200M2) is requested. The direct forwarding indicator may be associated with the bearer ID of the bearer (any one bearer among a plurality of bearers) and/or the X2 TEID included in the handover request response. Accordingly, the S-MeNB 200M1 is able to determine the bearer ID and/or X2 TEID corresponding to the bearer ID and/or the X2 TEID for the direct forwarding among a plurality of bearer IDs and/or X2 TEIDs included in the handover request response.

Further, in a case in which the direct forwarding indicator is included in the received handover request response, in step S507, the S-MeNB 200M1 may include the direct forwarding indicator in the SeNB release request to be transmitted to the SeNB 200S1. Accordingly, the SeNB 200S1 is able to determine whether or not the direct forwarding (the SeNB 200S1→the T-MeNB 200M2) is requested. Accordingly, the SeNB 200S1 is able to determine that it is preferable to transmit the SN Status Transfer message to the T-MeNB 200M2 when direct forwarding is requested. Further, the direct forwarding indicator may be associated with the bearer ID and/or the X2 TEID included in the SeNB release request. Accordingly, the SeNB 200S1 is able to determine that the direct forwarding is required for the bearer ID and/or the X2 TEID associated with the direct forwarding indicator.

According to the fifth handover procedure, when the handover is performed from the S-MeNB 200M1 to the T-MeNB 200M2, it is possible to change the bearer type ad perform the direct forwarding from the SeNB 200S1 to the T-MeNB 200M2.

Figure 14:
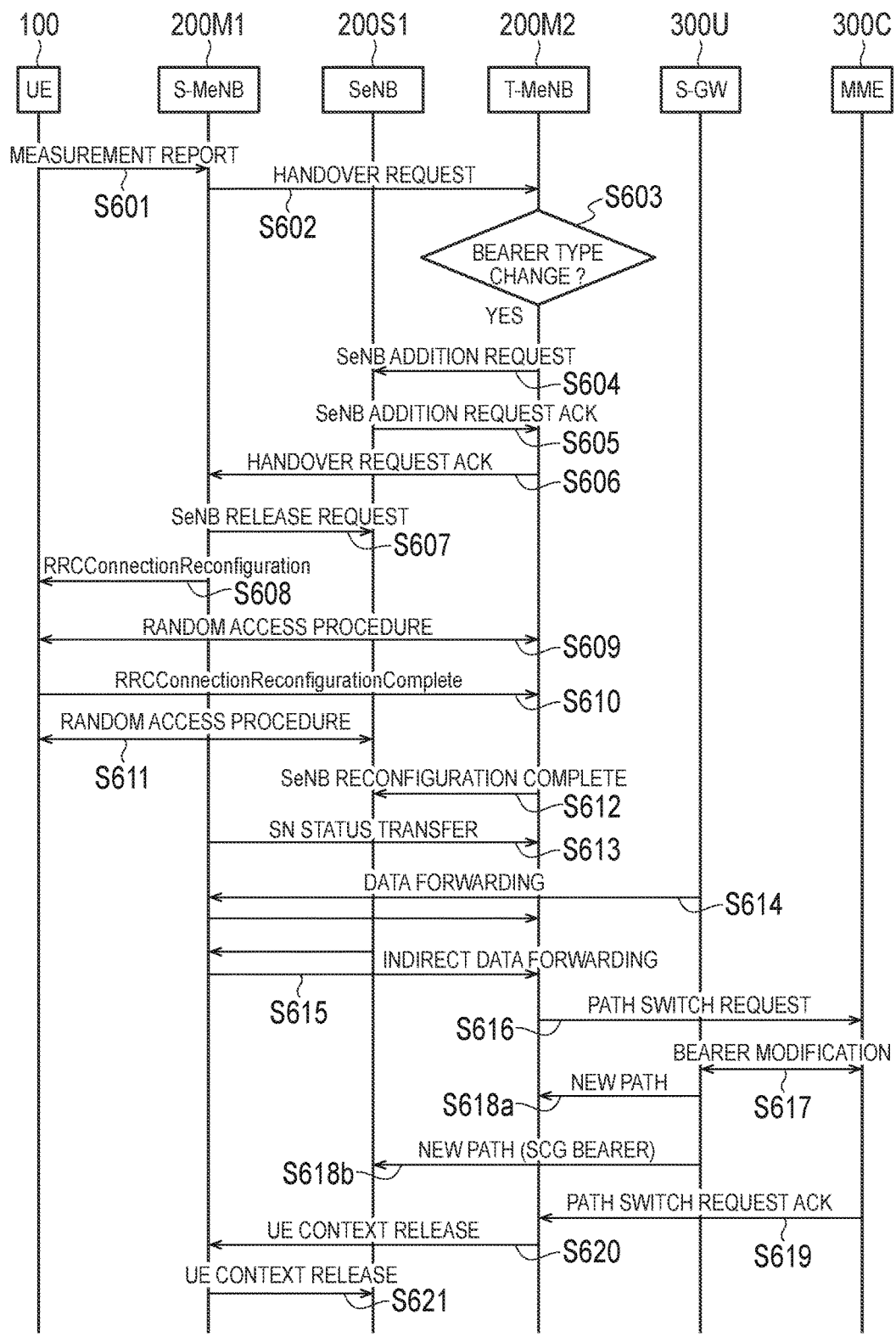
FIG. 14 is a sequence diagram related to a sixth handover procedure.

Next, the sixth handover procedure will be described below with reference to FIG. 14.

The sixth handover procedure is a procedure in which the handover of the UE 100 is performed from the S-MeNB 200M1 to the T-MeNB 200M2 without changing the SeNB 200S1 connected with the UE 100 (in the state in which the connection with the SeNB 200S1 is maintained) and includes a procedure in which the split bearer going through the SeNB 200S1 is changed to the MCG bearer used by the T-MeNB 200M2.

The UE 100 executes step S601. Step S601 is the same operation as step S101 in the first handover procedure.

In step S602, the S-MeNB 200M1 transmits the handover request to the T-MeNB 200M2. As an example, the handover request may include information indicating that the bearer type is requested (for example, information indicating that the change from the split bearer to the MCG bearer is requested). Further, as an example, the handover request may include information related to the split bearer managed by the S-MeNB 200M1.

In step S603, the T-MeNB 200M2 determines whether or not the bearer type is changed. In other words, the T-MeNB 200M2 determines whether or not the split bearer going through the SeNB 200S1 is changed to the MCG bearer used by the T-MeNB 200M2. As an example, in a case in which the information indicating that the bearer type is requested to be changed is included in the handover request, the T-MeNB 200M2 determines that the bearer type is changed.

If the split bearer going through the SeNB 200S1 is determined to be changed to the MCG bearer (YES in step S603), the T-MeNB 200M2 stores the bearer identifier (Bearer ID) of the split bearer.

In step S604, the T-MeNB 200M2 transmits the SeNB addition request to the SeNB 200S1 in step S604. Here, the T-MeNB 200M2 may include a setting of split bearer going through the SeNB 200S1 in the Split bearer IE of E-RAB To Be Added Item IE in the SeNB addition request.

Upon receiving the SeNB addition request from the T-MeNB 200M2, the SeNB 200S1 determines that the split bearer going through the SeNB 200S1 is requested to be changed to the MCG bearer for use in the T-MeNB 200M2. Specifically, the SeNB 200S1 may determine that the bearer type is requested to be changed when the setting of the split bearer setting going through a currently set the SeNB 200S1 is included in the SeNB addition request.

In step S605, the SeNB 200S1 transmits the SeNB addition request response (SeNB Addition Request Acknowledgement) to the T-MeNB 200M2.

Steps S607 to S614 are executed. Steps S607 to S614 correspond to steps S108 to S115 in the first handover procedure.

In step S615, the SeNB 200S1 which has determined that the T-MeNB 200M2 is requesting the change of the bearer type performs the indirect forwarding (transfer) of the data (uplink data or downlink data) destined for the UE 100 which is buffered in the split bearer to the T-MeNB 200M2 via the S-MeNB 200M1. The split bearer may be a split bearer whose setting is included in the SeNB addition request.

Step S616 to S621 are executed. Steps S616 to S621 correspond to steps S116 to 121 in the first handover procedure.

According to the sixth handover procedure, when the handover is performed from the S-MeNB 200M1 to the T-MeNB 200M2, it is possible to change the bearer type and perform the indirect forwarding from the SeNB 200S1 to the T-MeNB 200M2.

In steps S404, S504, and S604, the T-MeNB 200M2 may transmit the SeNB modification request to the SeNB 200S1 instead of transmitting the SeNB addition request. In this case, in steps S405, S505, and S605, the SeNB 200S1 transmits an SeNB modification request response (SeNB Modification Request Acknowledgment) to the T-MeNB 200M2 instead of transmitting the SeNB addition request response. In this case, the S-MeNB 200M1 may not perform steps S407, S507, and S607 and/or steps S421, S521 and S621.

Further, in steps S402, 502 and 602 in the fourth to six handover procedures, the handover request transmitted from the S-MeNB 200M1 may include the information of the MCG bearer and/or the information of the SCG bearer. Here, the information of the MCG bearer and the information of the SCG bearer may include information indicating that a predetermined bearer ID indicates the MCG bearer or the SCG bearer. The information indicating that a predetermined bearer ID indicates the MCG bearer or the SCG bearer may be used when the T-MeNB 200M2 selects the bearer (the MCG bearer and/or the SCG bearer) to be changed.

The fourth to six handover procedures may be, for example, procedures in which the Inter MeNB Handover without SeNB Change is improved.

The first to six handover procedures are not limited to the examples described above, and for example, some steps among steps described above may be excluded.

The first to six handover procedures have been described as different procedures, but for example, some steps in one handover procedure may be used in another handover procedure.

In the first embodiment, the LTE system has been described as an example of the mobile communication system. However, the present disclosure is not limited to the LTE system. The present disclosure may be applied to systems other than the LTE system.

[Overview of Second to Sixth Embodiments]

A target base station according to a second embodiment is a target base station in a case in which a handover of a user terminal is performed from a source base station to the target base station in a mobile communication system supporting a dual connectivity scheme. The target base station includes a controller configured to transmit a message to the source base station, the message including a first tunneling identifier used for direct forwarding of directly transferring data of a bearer of the user terminal from the source base station to a secondary base station, a second tunneling identifier used for indirect forwarding of indirectly transferring the data to the secondary base station via the target base station, and a bearer identifier identifying the bearer. In the message, the first tunneling identifier and the second tunneling identifier are associated with the same bearer identifier.

In the target base station according to the second embodiment, the message may be a handover request response to a handover request transmitted from the source base station.

In the target base station according to the second embodiment, the controller may decide to change a type of the bearer from a first type in which the bearer is established via the source base station to a second type in which the bearer is established via the secondary base station.

The source base station according to the second embodiment is a source base station in a case in which an inter-base station handover of a user terminal connected to the source base station and the target base station in accordance with the dual connectivity scheme is performed. The source base station includes a controller configured to receive a message from the target base station, the message including a first tunneling identifier used for direct forwarding of directly transferring data of a bearer of the user terminal from the source base station to a secondary base station, a second tunneling identifier used for indirect forwarding of indirectly transferring the data to the secondary base station via the target base station, and a bearer identifier identifying the bearer. In the message, the first tunneling identifier and the second tunneling identifier are associated with the same bearer identifier.

In the source base station according to the second embodiment, the controller may decide one forwarding scheme out of direct forwarding and indirect forwarding and performs forwarding control for the bearer using any one of the first tunneling identifier and the second tunneling identifier in accordance with the decided forwarding scheme.

A target base station according to a third embodiment is a target base station in a case in which a handover of a user terminal is performed from a source base station to the target base station in a mobile communication system supporting a dual connectivity scheme. The target base station includes a controller configured to transmit an information element to the source base station, the information element indicating that the source base station is able to decide one forwarding scheme out of direct forwarding of directly transferring data of a bearer of the user terminal from the source base station to a secondary base station and indirect forwarding of indirectly transferring the data to the secondary base station via the target base station.

In the target base station according to the third embodiment, the controller may transmit a message to the source base station, the message including a first tunneling identifier used for the direct forwarding, a first bearer identifier identifying the bearer, a second tunneling identifier used for the indirect forwarding, a second bearer identifier identifying the bearer, and the information element, and in the message, the first tunneling identifier may be associated with the first bearer identifier, and the second tunneling identifier may be associated with the second bearer identifier.

In the target base station according to the third embodiment, the message may be a handover request response to a handover request transmitted from the source base station.

In the target base station according to the third embodiment, the controller may decide to change a type of the bearer from a first type in which the bearer is established via the source base station to a second type in which the bearer is established via the secondary base station.

The source base station according to the third embodiment is a source base station in a case in which a handover of a user terminal is performed from the source base station to a target base station in a mobile communication system supporting a dual connectivity scheme. The source base station includes a controller configured to receive an information element from the target base station, the information element indicating that the source base station is able to decide one forwarding scheme out of direct forwarding of directly transferring data of a bearer of the user terminal from the source base station to a secondary base station and indirect forwarding of indirectly transferring the data to the secondary base station via the target base station. The controller decides one forwarding scheme out of the direct forwarding and the indirect forwarding in response to reception of the information element.

In the source base station according to the third embodiment, the controller may receive a message from the target base station, the message including a first tunneling identifier used for the direct forwarding, a first bearer identifier identifying the bearer, a second tunneling identifier used for the indirect forwarding, a second bearer identifier identifying the bearer, and the information element, and the controller may perform forwarding control for the bearer using one of the first tunneling identifier and the second tunneling identifier in accordance with the decided forwarding scheme.

A source base station according to a fourth embodiment is a source base station in a case in which a handover of a user terminal is performed from the source base station to a target base station in a mobile communication system supporting a dual connectivity scheme. The source base station includes a controller configured to transmit notification information to the target base station, the notification information indicating that it is possible to perform direct forwarding of directly transferring data of a bearer of the user terminal from the source base station to a secondary base station.

In the source base station according to the fourth embodiment, the controller may include the notification information in a handover request to be transmitted from the source base station to the target base station.

In the source base station according to the fourth embodiment, the notification information may information indicating that the source base station proposes the direct forwarding or information indicating that an X2 interface between the source base station and the secondary base station is available.

The target base station according to the fourth embodiment is a target base station in a case in which a handover of a user terminal is performed from a source base station to the target base station in a mobile communication system supporting a dual connectivity scheme. The target base station includes a controller configured to receive notification information from the source base station, the notification information indicating that it is possible to perform direct forwarding of directly transferring data of a bearer of the user terminal from the source base station to a secondary base station. The controller decides one forwarding scheme out of the direct forwarding and indirect forwarding in response to reception of the notification information, the indirect forwarding indirectly transferring the data to the secondary base station via the target base station.

A target base station according to a fifth embodiment is a target base station in a case in which a handover of a user terminal is performed from a source base station to the target base station in a mobile communication system supporting a dual connectivity scheme. The target base station includes a controller configured to transmit a message including a tunneling identifier to the source base station after setting the tunneling identifier used for the indirect forwarding of indirectly transferring data of a bearer of the user terminal from the source base station to a secondary base station via the target base station. When the controller transmits the message to the source base station, the controller may activate a timer that specifies a maximum standby time before the indirect forwarding is started.

In the target base station according to the fifth embodiment, the controller may stop the timer in a case in which the indirect forwarding is started within a period of time of the timer, and the controller may release the tunneling identifier in a case in which the timer expires.

In the target base station according to the fifth embodiment, the message may be a handover request response to a handover request transmitted from the source base station.

A source base station according to a sixth embodiment is a source base station in a case in which a handover of a user terminal is performed from the source base station to a target base station in a mobile communication system supporting a dual connectivity scheme. The source base station includes a controller configured to decide one forwarding scheme out of direct forwarding of directly transferring data of a bearer of the user terminal from the source base station to a secondary base station and indirect forwarding of indirectly transferring the data to the secondary base station via the target base station. The controller transmits notification information related to the direct forwarding to the target base station in a case in which the direct forwarding is decided.

In the source base station according to the sixth embodiment, the controller may transmit an end marker serving as the notification information to the target base station in a case in which the direct forwarding is completed.

A target base station according to the sixth embodiment is a target base station in a case in which a handover of a user terminal is performed from a source base station to the target base station in a mobile communication system supporting a dual connectivity scheme, and the target base station includes a controller configured to transmit a message including a tunneling identifier to the source base station after setting the tunneling identifier used for the indirect forwarding of indirectly transferring data of a bearer of the user terminal from the source base station to a secondary base station via the target base station. The controller receives notification information related to the direct forwarding from the source base station in a case in which the source base station decides direct forwarding of directly transferring the data from the source base station to the secondary base station.

In the target base station according to the sixth embodiment, the controller releases the second tunneling identifier in response to the reception of the notification information.

[Dual Connectivity Scheme]

Figure 15:
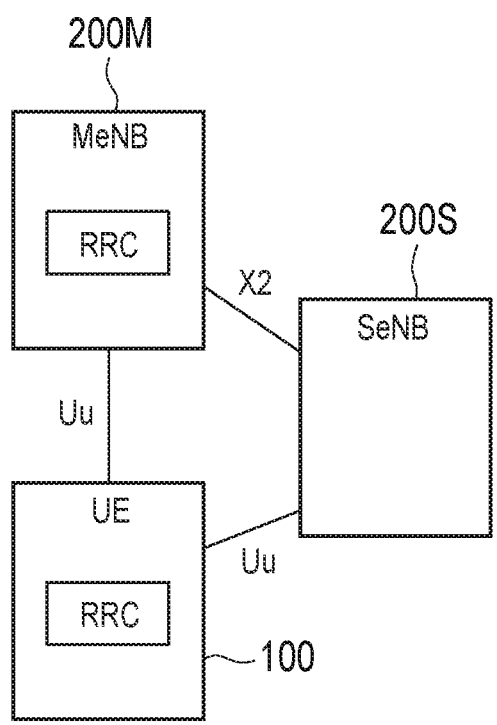
FIG. 15 is a diagram illustrating an overview of a dual connectivity scheme.

The dual connectivity scheme will be described below. The LTE system according to the embodiment supports the dual connectivity scheme. FIG. 15 is a diagram illustrating an overview of the dual connectivity scheme. In the dual connectivity scheme, the UE 100 establishes a connection with an MeNB 200M (a master base station) and a connection with an SeNB 200S (a secondary base station) as illustrated in FIG. 15. Radio resources are allocated to the UE 100 from a scheduler of each eNB 200.

In the dual connectivity scheme, among a plurality of eNBs 200 establishing a connection with the UE 100, only the MeNB 200M establishes the RRC connection with the UE 100. On the other hand, the SeNB 200S does not establish the RRC connection with the UE 100*a* and provides additional radio resources to the UE 100. In other words, the MeNB 200M establishes not only the user plane connection but also the control plane connection with the UE 100. On the other hand, the SeNB 200S establishes the user plane connection with the UE 100 without establishing the control plane connection with the UE 100. The X2 interface is set between the MeNB 200M and the SeNB 200S.

In the dual connectivity scheme, the UE 100 can perform the carrier aggregation using N serving cells managed by the MeNB 200M and M serving cells managed by the SeNB 200S at the same time. In the dual connectivity scheme, a maximum of the number of serving cells of the UE 100, that is, a maximum number of (N+M) is, for example, 5. A group of N serving cells managed by the MeNB 200M is referred to as a "master cell group (MCG)." A group of M serving cells managed by the SeNB 200S is referred to as a "secondary cell group (SCG)." The SCG includes a primary secondary cell (PSCell) in which a PUCCH of the UE 100 is provided.

FIGS. 16 and 17 are diagrams illustrating a bearer configuration example in the dual connectivity scheme. The bearer corresponds to the transfer path (data path) of the user data. An evolved packet system (EPS) bearer is established between the UE 100 and a PDN gateway (P-GW). The EPS bearer is configured with an E-UTRAN radio access bearer (E-RAB) between the UE 100 and the S-GW and an S5/S8 bearer between the S-GW and the P-GW. The E-RAB is configured with a radio bearer between the UE 100 and the eNB 200 and an S1 bearer between the eNB 200 and the S-GW. Hereinafter, the "bearer" mainly means the E-RAB or the EPS bearer.

Figure 16A:
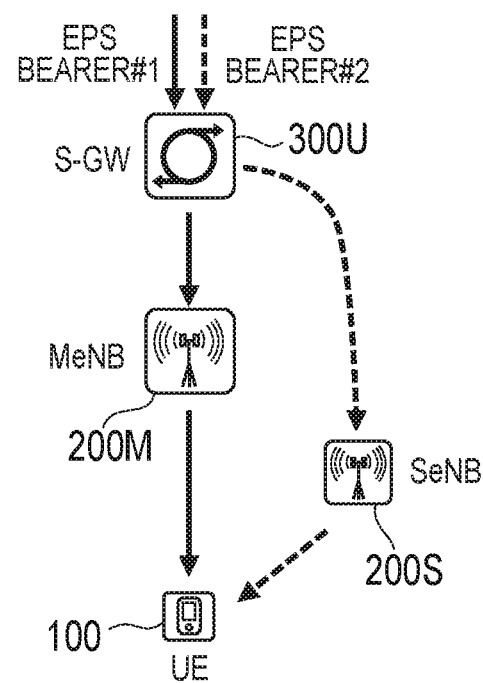
FIGS. 16A and 16B are diagrams illustrating a bearer configuration example 1 in a dual connectivity scheme.
Figure 16B:
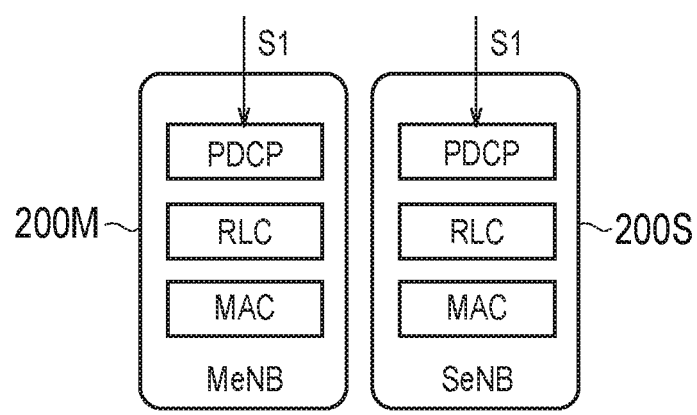

FIGS. 16A and 16B illustrate a bearer configuration example 1 in the dual connectivity scheme. The UE 100 has a bearer (EPS bearer #1) established via the MeNB 200M and a bearer (EPS bearer #2) established via the SeNB 200S as illustrated in FIG. 16A. Here, the UE 100 may have three or more bearers. Further, in FIG. 16A, the downlink bearer is illustrated, but the UE 100 may also have an uplink bearer.

The bearer (EPS bearer #1) established via the MeNB 200M is a bearer in which a corresponding radio protocol exists only in the MeNB 200M. The type of this bearer is referred to as an "MCG bearer." The MCG bearer corresponds to a first type in which the bearer is established via the MeNB 200M. On the other hand, the bearer (EPS bearer #2) established via the SeNB 200S is a bearer in which a corresponding radio protocol exists only in the SeNB 200S. The type of this bearer is referred to as an "SCG bearer." The SCG bearer corresponds to the second type in which the bearer is established via the SeNB 200S.

The MeNB 200M performs processes of the PDCP layer, the RLC layer, and the MAC layer for the MCG bearer (EPS bearer #1) as illustrated in FIG. 16B. The SeNB 200S performs processes of the PDCP layer, the RLC layer, and the MAC layer for the SCG bearer (EPS bearer #2).

Figure 17A:
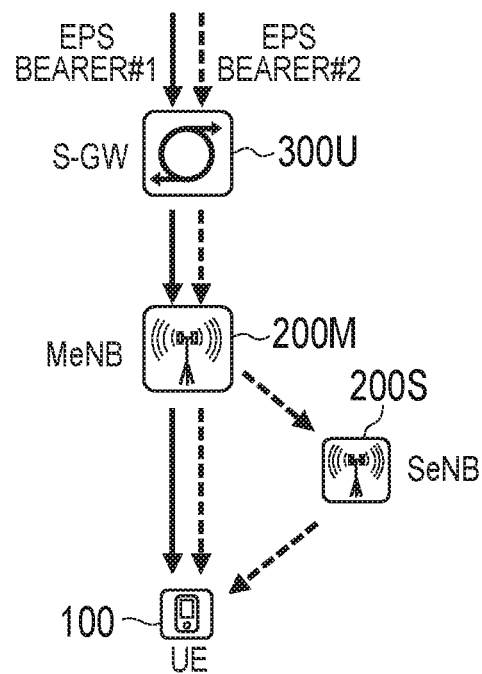
FIGS. 17A and 17B are diagrams illustrating a bearer configuration example 2 in a dual connectivity scheme.
Figure 17B:
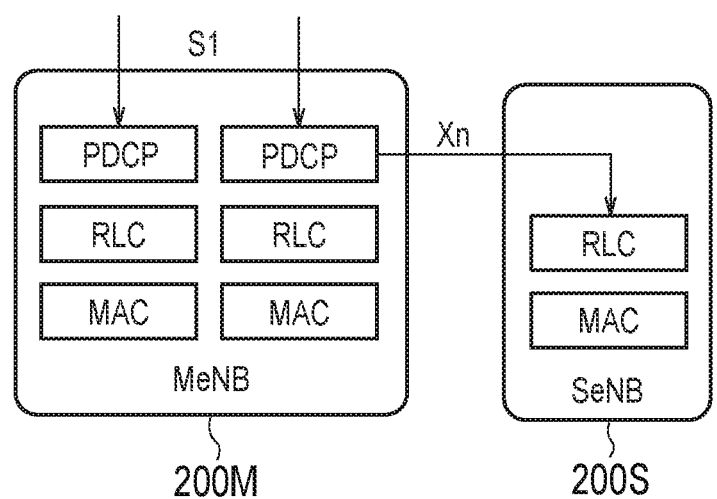

FIGS. 17A and 17B illustrate a bearer configuration example 2 in the dual connectivity scheme. The UE 100 has a bearer (EPS bearer #1) established via the MeNB 200M and a bearer (EPS bearer #2) established via both the MeNB 200M and the SeNB 200S as illustrated in FIG. 17A. Here, the UE 100 may have three or more bearers. Further, in FIG. 17A, the downlink bearer is illustrated, but the UE 100 may also have an uplink bearer.

The bearer (EPS bearer #1) established via the MeNB 200M is an MCG bearer similar to that in FIGS. 16A and 16B. On the other hand, the bearer (EPS bearer #2) established via both the MeNB 200M and the SeNB 200S is a bearer in which a corresponding radio protocol exists in both the MeNB 200M and the SeNB 200S. The type of this bearer is referred to as a "split bearer."

The MeNB 200M performs processes of the PDCP layer, the RLC layer, and the MAC layer for the MCG bearer (EPS bearer #1) as illustrated in FIG. 17B. Further, the MeNB 200M performs processes of the PDCP layer, the RLC layer, and the MAC layer for the split bearer (EPS bearer #2). The PDCP layer of MeNB 200M allocates at least some pieces of data of the split bearer (EPS bearer #2) to the SeNB 200S. The SeNB 200S performs processes of the RLC layer and the MAC layer for the split bearer (EPS bearer #2).

[Anticipated Scenario]

Hereinafter, an anticipated scenario according to the second to sixth embodiments will be described. FIGS. 18A and 18B are diagrams illustrating an anticipated scenario according to the second to sixth embodiments. An UE 100 connected to an MeNB 200M1 and an SeNB 200S in accordance with the dual connectivity scheme performs the handover from the MeNB 200M1 to the MeNB 200M2 without changing the SeNB 200S (while maintaining a connection between the SeNB 200S and the UE 100) as illustrated in FIGS. 18A and 18B.

This handover is referred to as "inter MeNB Hanover without SeNB 200S change." Hereinafter, the eNB 200M1 which is a handover source is referred to as a source MeNB (source master base station) 200M1, and the eNB 200M2 which is a handover destination is referred to as a target MeNB (target master base station) 200M2.

The source MeNB 200M1 manages a macro cell MC1, the target MeNB 200M2 manages a macro cell MC2, and the SeNB 200S manages a small cell SC as illustrated in FIG. 18A. A part of the macro cell MC1 and a part of the macro cell MC2 overlap, and the small cell SC is located in the overlapping region. The UE 100 located in the small cell SC is connected to the source MeNB 200M1 and the SeNB 200S in accordance with the dual connectivity scheme. Specifically, the UE 100 establishes the MCG bearer via the source MeNB 200M1 and establishes the SCG bearer via the SeNB 200S. The UE 100 may establish the split bearer instead of the SCG bearer or may establish the split bearer in addition to the SCG bearer.

Under this circumstance, the UE 100 is assumed to move in a direction of the target MeNB 200M2 as illustrated in FIG. 18B. In this case, since the radio state between the UE 100 and the source MeNB 200M1 deteriorates, it is necessary to perform the handover of the UE 100. The UE 100 performs the inter-MeNB handover from the source MeNB 200M1 to the target MeNB 200M2 without changing the SeNB 200S.

In the embodiment, at least one MCG bearer established via the source MeNB 200M1 is changed to the SCG bearer and handed over to the SeNB 200S in the inter-MeNB handover. Such a bearer type change is decided by the target MeNB 200M2. In a case in which the MCG bearer is changed to the SCG bearer, it is necessary to transfer data of the MCG bearer (that is, data remaining in a buffer of the source MeNB 200M1) from the source MeNB 200M1 to the SeNB 200S. This data transfer is referred to as "forwarding."

Figure 19A:
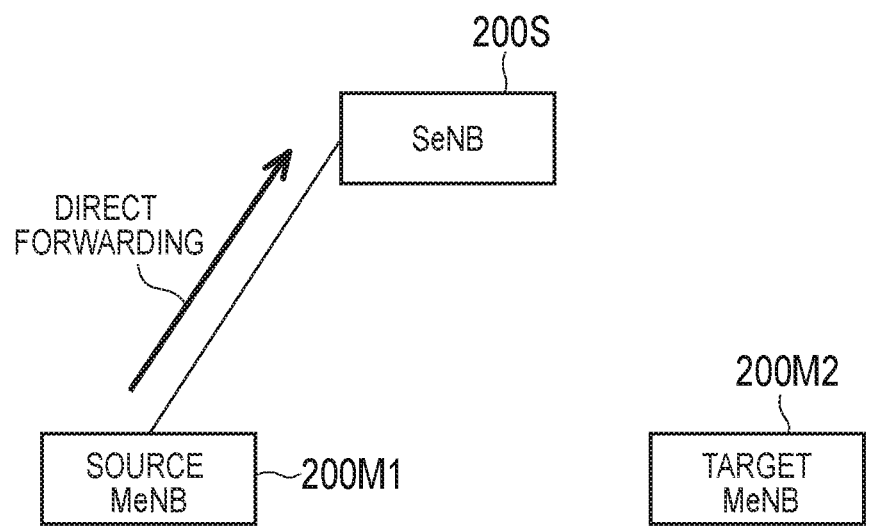
FIGS. 19A and 19B are diagrams illustrating a forwarding scheme according to second to sixth embodiments.
Figure 19B:
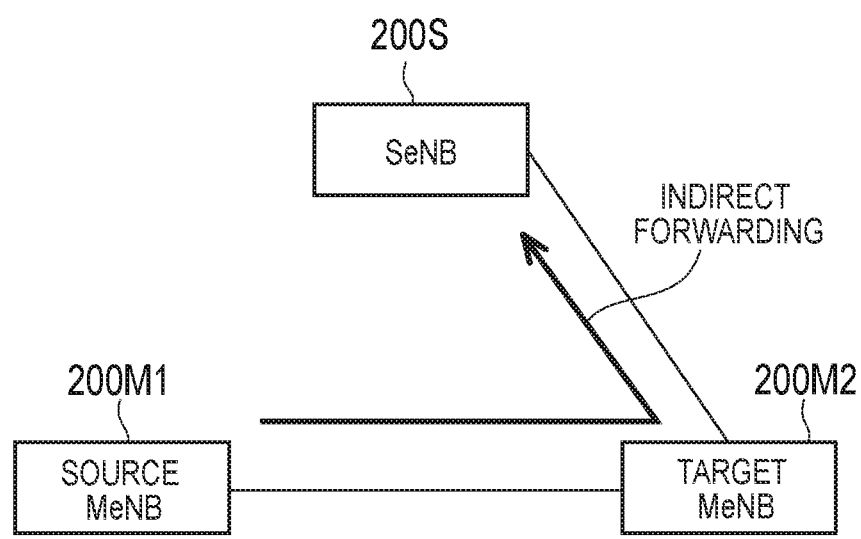

FIGS. 19A and 19B are diagrams illustrating a forwarding scheme according to an embodiment. There are two forwarding schemes, that is, direct forwarding and indirect forwarding.

In the direct forwarding, the source MeNB 200M1 directly transfers the data of the bearer (MCG bearer) of the UE 100 to the SeNB 200S via the X2 interface as illustrated in FIG. 19A. Specifically, a tunneling connection is established on the X2 interface between the source MeNB 200M1 and the SeNB 200S, and data is transferred from the source MeNB 200M1 to the SeNB 200S via the tunneling connection.

The tunneling connection is established for each bearer of a forwarding target. Further, a GPRS tunneling protocol (GTP) is applied to tunneling. In order to perform the direct forwarding, it is necessary for the source MeNB 200M1 to detect a GTP tunneling identifier (tunnel endpoint identifier (TE ID)) set in the SeNB 200S. The GTP TE ID set in the SeNB 200S corresponds to a first tunneling identifier.

In the indirect forwarding, the source MeNB 200M1 indirectly transfers the data of the bearer (MCG bearer) of the UE 100 to the SeNB 200S via the target MeNB 200M2 as illustrated in FIG. 19B. Specifically, a tunneling connection is set on the X2 interface between the source MeNB 200M1 and the target MeNB 200M2, and a tunneling connection is established on the X2 interface between the target MeNB 200M2 and the SeNB 200S.

With these tunneling connections, data is first transferred from the source MeNB 200M1 to the target MeNB 200M2, and then the data is transferred from the target MeNB 200M2 to the SeNB 200S. In order to perform the indirect forwarding, it is necessary for the source MeNB 200M1 to detect the GTP tunneling identifier (TE ID) set in the target MeNB 200M2. The GTP TE ID set in the MeNB 200M2 corresponds to a second tunneling identifier.

Second Embodiment

The second embodiment will be described below.

(1) Operation Sequence According to Second Embodiment

In the second embodiment, the source MeNB 200M1 determines whether the direct forwarding is performed or the indirect forwarding is performed. In a case in which the source MeNB 200M1 determines the forwarding scheme, it is necessary for the target MeNB 200M2 to notify the source MeNB 200M1 of a first tunneling identifier for the direct forwarding and a second tunneling identifier for the indirect forwarding in association with a bearer of a forwarding target.

FIG. 20 is a diagram illustrating an outline sequence according to the second embodiment.

As illustrated in FIG. 20, in step S11, the source MeNB (S-MeNB) 200M1 transmits the handover request (HANDOVER REQUEST) to the target (T-MeNB) MeNB 200M2. The handover request includes information of the bearer of the UE 100.

The target MeNB 200M2 receives the handover request. The target MeNB 200M2 decides to change at least one MCG bearer established via the source MeNB 200M1 to SCG bearer and take it over to the SeNB 200S. In other words, the target MeNB 200M2 decides to change the type of bearer from a first type in which a bearer is established via the source MeNB 200M1 to a second type in which a bearer is established via the SeNB 200S. Hereinafter, a bearer whose type is changed from the MCG bearer to the SCG bearer is referred to as a "type change bearer."

In step S12, the target MeNB 200M2 transmits the SeNB addition request (SENB ADDITION REQUEST) to the SeNB 200S. The SeNB addition request includes a bearer identifier of the type change bearer.

The SeNB 200S receives the SeNB addition request. The SeNB 200S sets the first tunneling identifier (GTP TE ID) for the direct forwarding for the type change bearer.

In step S13, the SeNB 200S transmits the SeNB addition request response (SENB ADDITION REQUEST ACKNOWLEDGE) which is a positive response message to the SeNB addition request to the target MeNB 200M2. The SeNB addition request response includes the bearer identifier of the type change bearer and the first tunneling identifier for the direct forwarding. In the SeNB addition request response, the first tunneling identifier is associated with the bearer identifier of the type change bearer.

The target MeNB 200M2 receives the SeNB addition request response. The target MeNB 200M2 sets the second tunneling identifier (GTP TE ID) for the indirect forwarding for the type change bearer.

In step S14, the target MeNB 200M2 transmits the handover request response (HANDOVER REQUEST ACKNOWLEDGE) which is a positive response message to the handover request to the source MeNB 200M1. The handover request response includes the first tunneling identifier for the direct forwarding, the second tunneling identifier for the indirect forwarding, and the bearer identifier of the type change bearer.

In the handover request response, the first tunneling identifier and the second tunneling identifier are associated with the same bearer identifier. Here, the reason why the first tunneling identifier and the second tunneling identifier are associated with the same bearer identifier is as follows.

In a case in which the bearer identifier A of the type change bearer is associated with the first tunneling identifier, and the bearer identifier B of the type change bearer is associated with the second tunneling identifier, a plurality of bearer identifiers having the same value are included in the handover request response. In other words, in a case in which a field of the bearer identifier associated with the first tunneling identifier is different from a field of the bearer identifier associated with the second tunneling identifier, there are a plurality of bearer identifiers for the same bearer (the type change bearer), and the bearer identifiers are duplicated. This may be regarded as an error (Cause IE: Multiple E-RAB ID instances) in the existing LTE specification, and the handover may fail or the handover may fail only with respect to a specific bearer.

On the other hand, when the first tunneling identifier and the second tunneling identifier are associated with the same bearer identifier in the handover request response, there are no two or more bearer identifiers for the same bearer (the type change bearer), and thus the above-mentioned error can be prevented.

Table 1 shows a configuration example of a handover request response according to the second embodiment.

TABLE 1

| IE/Group Name | Presence | Range | IE type and reference | Semantics description |
| --- | --- | --- | --- | --- |
| Message Type | M | | 9.2.13 | |
| Old eNB UE X2AP ID | M | | eNB UE X2AP ID 9.2.24 | Allocated at the source eNB |
| New eNB UE X2AP ID | M | | eNB UE X2AP ID 9.2.24 | Allocated at the target eNB |
| E-RABs Admitted List | | 1 | | |
| > E-RABs Admitted Item | | 1 ... <maxnoofBearers> | | |
| >>E-RAB ID | M | | 9.2.23 | |
| >>UL GTP Tunnel Endpoint | O | | GTP Tunnel Endpoint 9.2.1 | Identifies the X2 transport bearer used for forwarding of UL PDUs |
| >>DL GTP Tunnel Endpoint | O | | GTP Tunnel Endpoint 9.2.1 | Identifies the X2 transport bearer. used for forwarding of DL PDUs |
| >> UL GTP Tunnel Endpoint for direct forwarding | O | | GTP Tunnel Endpoint 9.2.1 | Identifies the X2 transport bearer. used for forwarding of UL PDUs |
| >> DL GTP Tunnel Endpoint for direct forwarding | O | | GTP Tunnel Endpoint 9.2.1 | Identifies the X2 transport bearer. used for forwarding of DL PDUs |
| E-RABs Not Admitted List | O | | E-RAB List 9.2.28 | A value for E-RAB ID shall only be present once in E-RABs Admitted List IE and in E-RABs Not Admitted List IE. |
| Target eNB To Source eNB Transparent Container | M | | OCTET STRING | Includes the RRC E-UTRA Handover Command message as defined in subclause 10.2.2 in TS 36.331 [9] |

As shown in Table 1, the handover request response includes "E-RABs Admitted List" which is a list of bearers (E-RABs) for which the target MeNB 200M2 prepares resources. "E-RABs Admitted List" includes an item (E-RABs Admitted Item) for each bearer. Each item includes "E-RAB ID," "UL GTP Tunnel Endpoint," "DL GTP Tunnel Endpoint," "UL GTP Tunnel Endpoint for direct forwarding," and "DL GTP Tunnel Endpoint for direct forwarding." Other information elements (IE) are described in the 3GPP technical specification "TS 36.423."

Here, "E-RAB ID" corresponds to the bearer identifier. "UL GTP Tunnel Endpoint" and "DL GTP Tunnel Endpoint" correspond to the second tunneling identifier for the indirect forwarding. "UL GTP Tunnel Endpoint for direct forwarding" and "DL GTP Tunnel Endpoint for direct forwarding" correspond to the first tunneling identifier for the direct forwarding. As described above, the first tunneling identifier and the second tunneling identifier are associated with the same bearer identifier. Specifically, one item (E-RABs Admitted Item) includes one bearer identifier, the first tunneling identifier, and the second tunneling identifier.

The source MeNB 200M1 receives the handover request response.

In step S15, the source MeNB 200M1 transmits the SeNB release request (SENB RELEASE REQUEST) to the SeNB 200S in response to the reception of the handover request response. Further, the source MeNB 200M1 determines one forwarding scheme out of the direct forwarding and the indirect forwarding.

As determination criteria used when the source MeNB 200M1 determines one forwarding scheme out of the direct forwarding and the indirect forwarding, the following information can be used. 1) QoS required by the user (application) and billing information. 2) Preference of an operator. For example, if the MeNB and the SeNB are products of the same vendor, the direct forwarding is selected. Such information is configured in the eNB in advance by the OAM (pre config). 3) Load information of the T-MeNB. Since the load information is exchanged in advance in accordance with the existing specifications through the "Resource Status Reporting procedure," in a case in which the load of the T-MeNB is high, it is possible to eliminate the transfer load by selecting the direct forwarding.

The source MeNB 200M1 performs forwarding control for the type change bearer using either the first tunneling identifier or the second tunneling identifier in accordance with the determined forwarding scheme. Specifically, in a case in which the direct forwarding is determined, the source MeNB 200M1 performs the forwarding control for the type change bearer using the first tunneling identifier (step S16*b* and step S17*b*). On the other hand, in a case in which the indirect forwarding is determined, the source MeNB 200M1 performs the forwarding control for the type change bearer using the second tunneling identifier (step S16*a* and step S17*a*).

(2) Example of Detailed Sequence

FIG. 21 is a diagram illustrating an example of a detailed sequence according to the second embodiment. As described above, the present sequence is a sequence for performing inter-MeNB handover without changing the SeNB 200S1 connected with the UE 100, and the MCG bearer established by the source MeNB 200M1 is changed to the SCG bearer managed by the SeNB 200S1.

As illustrated in FIG. 21, in step S401, if a measurement result for a signal transmitted from the eNB 200 (including the source MeNB 200M1 and/or the target MeNB 200M2) satisfies a certain condition, the UE 100 transmits a measurement report to the source MeNB 200M1. If the measurement report is received from the UE 100, the source MeNB 200M1 starts the handover procedure. The handover procedure may be started by a trigger other than the reception of the measurement report from the UE 100.

In step S402, the source MeNB 200M1 transmits the handover request to the target MeNB 200M2. The handover request may include information indicating that the bearer type is requested to be changed (for example, information indicating that the change from the MCG bearer to the SCG bearer is requested). Further, the handover request may include information (for example, the bearer identifier) of the MCG bearer managed by the source MeNB 200M1 and/or information of the SCG bearer. The handover request may include the UE aggregate maximum bit rate and/or the UE aggregate maximum bit rate (SeNB UE Aggregate Maximum Bitrate) in the SeNB 200S1. The bearer identifier may be an E-RAB ID. Further, the handover request may include information related to the type of bearer (the MCG bearer, the SCG bearer, or the split bearer). The information related to the type of bearer may also be associated with the bearer identifier. Accordingly, the target MeNB 200M2 that has received the handover request is able to specify the type of bearer corresponding to the bearer identifier managed by the source MeNB 200M1 (the MCG bearer, the SCG bearer, the split bearer, or the like).

In step S403, the target MeNB 200M2 determines whether or not the bearer type is changed. In other words, the target MeNB 200M2 determines whether or not the MCG bearer established in the source MeNB 200M1 is changed to the SCG bearer of the SeNB 200S1. The target MeNB 200M2 may determine that the bearer type is changed in a case in which the information indicating that the bearer type is requested to be changed. Alternatively, the target MeNB 200M2 may determine that the bearer type is changed on the basis of the radio resource management (RRM) of the target MeNB 200M2. Specifically, the target MeNB 200M2 may determine that the bearer type is changed by determining that the data for the UE 100 has to be transmitted from the SeNB 200S1 in the source MeNB 200M1 on the basis of the resource state and the load state of the SeNB 200S1, the measurement results for the signals transmitted from the T-MeNB 200M2 and/or the SeNB 200S1 in the UE 100, the UE aggregate maximum bit rate (UE Aggregate Maximum Bit Rate), the UE aggregate maximum bit rate (SeNB UE Aggregate Maximum Bit Rate) in the SeNB 200S1, and/or the like.

If the bearer type is determined to be changed (YES in S403), the target MeNB 200M2 stores the identifier (bearer identifier) of the MCG bearer to be changed. The target MeNB 200M2 may acquire the information of the MCG bearer to be changed through Handover Preparation Information which is one of Inter-node RRC information elements.

In step S404, the target MeNB 200M2 includes information of the SCG bearer which is requested to be established (or set) in the SeNB addition request, and transmits the resulting SeNB addition request to the SeNB 200S1. The target MeNB 200M2 includes the information of the SCG bearer in the SCG Bearer IE in the E-RAB To Be Added Item IE in the SeNB addition request. Here, the information of the SCG bearer is E-RAB ID, E-RAB Level QoS Parameters, DL Forwarding, S1 UL GTP Tunnel Endpoint, and the like. In a case in which a bearer identifier different from the bearer identifier of the already established SCG bearer is included in the received SeNB addition request, the SeNB 200S1 determines that there is a request of adding the SCG bearer corresponding to the different bearer identifier (of changing the MCG bearer corresponding to the bearer identifier to the SCG bearer).

In step S405, the SeNB 200S1 transmits the SeNB addition request response (SeNB Addition Request Acknowledgement) including the GTP TE ID of the SeNB 200S1 for the direct data forwarding from the source MeNB 200M1 to the SeNB 200S1 to the target MeNB 200M2.

In step S406, the target MeNB 200M2 includes the GTP TE ID of the SeNB 200S1 received from the SeNB 200S1 and the identifier (bearer identifier) of the type change bearer stored in step S403 in the handover request response (Handover Request Acknowledgement), and transmits the resulting handover request response.

In step S407, the source MeNB 200M1 transmits the SeNB release request to the SeNB 200S1.

In step S408, the source MeNB 200M1 transmits the RRC connection reconfiguration to the UE 100.

In step S409, the UE 100 performs the random access procedure for the target MeNB 200M2.

In step S410, the UE 100 transmits the RRC connection reconfiguration complete to the target MeNB 200M2.

In step S411, the UE 100 executes the random access procedure to the SeNB 200S1.

In step S412, the target MeNB 200M2 transmits the SeNB reconfiguration complete to the SeNB 200S1.

In step S413, the source MeNB 200M1 notifies the target MeNB 200M2 of the "SN Status Transfer" message. The "SN Status Transfer" message is a notification related to the transfer status of uplink or downlink data in the source MeNB 200M1.

In step S414, the source MeNB 200M1 performs data forwarding of transferring data destined for the UE 100 from the S-GW 300U to the target MeNB 200M2 via the source MeNB 200M1.

In step S415, the source MeNB 200M1 directly transfers the data destined for the UE 100 which is buffered in the type change bearer to the SeNB 200S1 for the "GTP TE ID" of the SeNB 200S1 (direct forwarding).

In step S416, the target MeNB 200M2 transmits the path switch request to the MME 300C in order to switch the data path between the S-GW 300U and the source MeNB 200M1 to the target MeNB 200M2.

In step S417 and step S418, the S-GW 300U performs the bearer modification with the MME 300C, sets the target MeNB 200M2 as a new data path (S418a), and sets the SCG bearer with the SeNB 200S1 (S418b). In step S418b, the SCG bearer may be newly set. Further, if S-GW 300U is not changed before and after the handover in the state in which the SCG bearer is set by the source MeNB 200M1, the SeNB 200S1 may maintain the SCG bearer instead of newly setting the SCG bearer.

In step S419, the MME 300C transmits the path switch request response (Path Switch Request Acknowledge) to the target MeNB 200M2.

In step S420, the target MeNB 200M2 transmits the UE context release to the source MeNB 200M1.

In step S421, the source MeNB 200M1 transmits the UE context release to the SeNB 200S1.

Before step S415 after step S413, the source MeNB 200M1 may notify the SeNB 200S1 of the "SN Status Transfer" message related to the bearer used in the direct forwarding of step S415 (the bearer whose bearer type is changed from the MCG bearer to the SCG bearer) (Step S414a).

Third Embodiment

The third embodiment will be described below. The third embodiment is an embodiment in which the second embodiment is partially modified, and description will proceed with differences from the second embodiment.

An operation sequence according to the third embodiment is similar to that of FIG. 20. However, the third embodiment differs from the second embodiment in that the configuration of the handover request response (the message in step S14 in FIG. 20) is different.

In the handover request response according to the third embodiment, the field of the bearer identifier associated with the first tunneling identifier is different from the field of the bearer identifier associated with the second tunneling identifier. In other words, there are a plurality of bearer identifiers for the same bearer (type change bearer). As described above, in a case in which the bearer identifiers are duplicated, it may be regarded as an error (Cause: Multiple E-RAB ID instances).

In this regard, the target MeNB 200M2 according to the third embodiment includes an information element indicating that the source MeNB 200M1 is able to decide one forwarding scheme out of the direct forwarding and the indirect forwarding in the handover request response. This information element is included in the handover request response. In other words, the target MeNB 200M2 includes an indicator indicating that the duplication of the bearer identifiers is intentionally performed and should not be determined as an error in the handover request response. Accordingly, in a case in which there are a plurality of bearer identifiers having the same value in the handover request response, the source MeNB 200M1 is able to prevent it from being determined as an error.

Table 2 shows a configuration example of the handover request response according to the third embodiment. For convenience of description, some of the existing IEs are omitted.

TABLE 2

| IE/Group Name | Presence | Range | IE type and reference | Semantics description |
| --- | --- | --- | --- | --- |
| Message Type | M | | 9.2.13 | |
| Old eNB UE X2AP ID | M | | eNB UE X2AP ID 9.2.24 | Allocated at the source eNB |
| New eNB UE X2AP ID | M | | eNB UE X2AP ID 9.2.24 | Allocated at the target eNB |
| E-RABs Admitted List | | 1 | | |
| > E-RABs Admitted Item | | 1 . . . <maxnoofBearers> | | |
| >>E-RAB ID | M | | 9.2.23 | |
| >>UL GTP Tunnel Endpoint | O | | GTP Tunnel Endpoint 9.2.1 | Identifies the X2 transport bearer used for forwarding of UL PDUs |

TABLE 2-continued

| IE/Group Name | Presence | Range | IE type and reference | Semantics description |
|---|---|---|---|---|
| >>DL GTP Tunnel Endpoint | O | | GTP Tunnel Endpoint 9.2.1 | Identifies the X2 transport bearer. used for forwarding of DL PDUs |
| E-RABs Not Admitted List | O | | E-RAB List 9.2.28 | A value for E-RAB ID shall only be present once in E-RABs Admitted List IE and in E-RABs Not Admitted List IE. |
| Target eNB To Source eNB Transparent Container | M | | OCTET STRING | Includes the RRC E-UTRA Handover Command message as defined in subclause 10.2.2 in TS 36.331 [9] |
| Direct Data Forwarding E-RABs List | | 0 . . . 1 | | |
| >Direct Data Forwarding E-RABs Item | | 1 . . . <maxnoofBearers> | | |
| >>E-RAB ID | M | | 9.2.23 | |
| >> UL Forwarding GTP Tunnel Endpoint | O | | GTP Tunnel Endpoint 9.2.1 | Identifies the X2 transport bearer used for forwarding of UL PDUs |
| >>DL Forwarding GTP Tunnel Endpoint | O | | GTP Tunnel Endpoint 9.2.1 | Identifies the X2 transport bearer. used for forwarding of DL PDUs |
| Forwarding Selectable | O | | | |

In the handover request response according to the third embodiment, as shown in Table 2, "Direct Data Forwarding E-RABs List" for the direct forwarding is set separately from "E-RABS ADMITTED LIST."

"Direct Data Forwarding E-RABs List" includes "Direct Data Forwarding E-RABs Item." "Direct Data Forwarding E-RABs Item" includes a first tunneling identifier used for the direct forwarding ("UL Forwarding GTP Tunnel Endpoint" and "DL Forwarding GTP Tunnel Endpoint") and a first bearer identifier (E-RAB ID) identifying a bearer. As described above, the first tunneling identifier is associated with the first bearer identifier.

On the other hand, "E-RABS ADMITTED LIST" includes "E-RABs Admitted Item." "E-RABs Added Item" includes a second tunneling identifier ("UL GTP Tunnel Endpoint" ad "DL GTP Tunnel Endpoint") used for the indirect forwarding and a second bearer identifier (E-RAB ID) identifying a bearer. As described above, the second tunneling identifier is associated with the second bearer identifier.

Furthermore, the handover request response according to the third embodiment includes an information element (Forwarding Selectable) indicating that the source MeNB 200M1 is able to decide the forwarding scheme.

The source MeNB 200M1 receives the handover request response including the information element (Forwarding Selectable) indicating that the source MeNB 200M1 is able to decide the forwarding scheme. The source MeNB 200M1 decides one forwarding scheme out of the direct forwarding and the indirect forwarding without determining it an error in response to the reception of the information element (Forwarding Selectable).

The source MeNB 200M1 performs forwarding control for the type change bearer using either the first tunneling identifier or the second tunneling identifier in accordance with the decided forwarding scheme. Specifically, in a case in which the direct forwarding is determined, the source MeNB 200M1 performs the forwarding control for the type change bearer using the first tunneling identifier (see step S16b and step S17b of FIG. 20). On the other hand, in a case in which the indirect forwarding is determined, the source MeNB 200M1 performs the forwarding control for the type change bearer using the second tunneling identifier (see step S16a and step S17a of FIG. 20).

Fourth Embodiment

The fourth embodiment will be described below. An operation sequence according to the fourth embodiment is similar to that of FIG. 20. However, the fourth embodiment differs from the second and third embodiments in the configurations of the handover request (the message in step S11 in FIG. 20) and the handover request response (the message in step S14 in FIG. 20).

The source MeNB 200M1 according to the fourth embodiment transmits notification information indicating that the direct forwarding is able to be performed to the target MeNB 200M2. Specifically, the source MeNB 200M1 includes the notification information in the handover request transmitted from the source MeNB 200M1 to the target MeNB 200M2. The notification information is information indicating that the source MeNB 200M1 proposes the direct forwarding or information indicating that the X2 interface between the source MeNB 200M1 and the SeNB 200S is available. As determination criteria for determining whether or not the source MeNB 200M1 proposes the direct forwarding, the information described in 1) to 3) in the second embodiment may be used.

The target MeNB 200M2 decides one forwarding scheme out of the direct forwarding and the indirect forwarding in response to the reception of the notification information. Then, the target MeNB 200M2 gives a notification (or an indication) of the determined forwarding scheme to the source MeNB 200M1. Specifically, the target MeNB 200M2 includes information indicating the decided forwarding scheme in the handover request response.

As described above, in the fourth embodiment, the target MeNB 200M2 has authority of deciding the forwarding scheme, and the source MeNB 200M1 performs a notification to assist such decision. By performing the decision of the forwarding scheme through the target MeNB 200M2, it is preferable for the target MeNB 200M2 to give a notification indicating only one of the first tunneling identifier for the direct forwarding and the second tunneling identifier for the indirect forwarding to the source MeNB 200M1. Therefore, it is possible to prevent the occurrence of the above-mentioned error.

In a case in which an instruction to perform the direct forwarding is given, the target MeNB 200M2 may include the direct forwarding indicator (Direct Data Forwarding Indicator) in the handover request response transmitted in step S406. Accordingly, the source MeNB 200M1 is able to determine whether or not the direct forwarding from the source MeNB 200M1 to the SeNB 200S1 is requested. The direct forwarding indicator may be associated with the bearer identifier and/or the GTP TE ID of the SeNB 200S1 included in the handover request response. Accordingly, in a case in which a plurality of bearer identifiers and/or GTP TE IDs are included in the handover request response, the source MeNB 200M1 is able to determine the bearer identifier and/or the GTP TE ID corresponding to the bearer identifier and the GTP TE ID for the direct forwarding.

(1) Configuration Example 1 of Handover Request

Table 3 shows a configuration example 1 of the handover request according to the fourth embodiment. For convenience of description, some of the existing IEs are omitted.

is an existing IE. Other IEs are described in the 3GPP technical specification "TS 36.423."

In the configuration example 1 of the handover request according to the fourth embodiment, content (ENUMERATED) of "DL Forwarding" is extended so that information indicating that the source MeNB 200M1 proposes the direct forwarding can be included in "DL Forwarding."

Table 4 shows a configuration example of "DL Forwarding" according to the fourth embodiment.

TABLE 4

| IE/Group Name | Presence | Range | IE type and reference | Semantics description |
|---|---|---|---|---|
| DL Forwarding | M | | ENUMERATED (DL forwarding proposed, direct forwarding proposed . . .) | |

As shown in Table 4, "DL Forwarding" is configured to be able to include information (direct forwarding proposed) indicating that the source MeNB 200M1 proposes the direct forwarding.

The source MeNB 200M1 includes "direct forwarding proposed" in "DL Forwarding" in a case in which source MeNB 200M1 proposes the direct forwarding to the target MeNB 200M2. On the other hand, in a case in which the direct forwarding is not proposed for the target MeNB 200M2, the source MeNB 200M1 includes the existing IE (DL forwarding proposed) in "DL Forwarding." Then, the source MeNB 200M1 transmits the handover request including "DL Forwarding" to the target MeNB 200M2.

TABLE 3

| IE/Group Name | Presence | Range | IE type and reference | Semantics description |
|---|---|---|---|---|
| Message Type | M | | 9.2.13 | |
| Old eNB UE X2AP ID | M | | eNB UE X2AP ID 9.2.24 | Allocated at the source eNB |
| Cause | M | | 9.2.6 | |
| Target Cell ID | M | | ECGI 9.2.14 | |
| GUMMEI | M | | 9.2.16 | |
| UE Context Information | | 1 | | |
| >MME UE S1AP ID | M | | INTEGER (0 . . . $2^{32}$ − 1) | MME UE S1AP ID allocated at the MME |
| >UE Security Capabilities | M | | 9.2.29 | |
| >AS Security Information | M | | 9.2.30 | |
| >UE Aggregate Maximum Bit Rate | M | | 9.2.12 | |
| >Subscriber Profile ID for RAT/Frequency priority | O | | 9.2.25 | |
| >E-RABs To Be Setup List | | 1 | | |
| >>E-RABs To Be Setup Item | | 1 . . . <maxnoofBearers> | | |
| >>>E-RAB ID | M | | 9.2.23 | |
| >>>E-RAB Level QoS Parameters | M | | 9.2.9 | Includes necessary QoS parameters |
| >>>DL Forwarding | O | | 9.2.5 | |
| >>>UL GTP Tunnel Endpoint | M | | GTP Tunnel Endpoint 9.2.1 | SGW endpoint of the S1 transport bearer. For delivery of UL PDUs. |
| >RRC Context | M | | OCTET STRING | Includes the RRC Handover Preparation Information message as defined in subclause 10.2.2 of TS 36.331 [9] |

As shown in Table 3, the handover request includes "DL Forwarding." "DL Forwarding" is provided for each bearer to handover (E-RABs To Be Setup Item). "DL Forwarding"

The target MeNB 200M2 receives the handover request including "DL Forwarding." In a case in which "direct forwarding proposed" is included in "DL Forwarding," the target MeNB 200M2 decides the forwarding scheme of either of the direct forwarding and the indirect forwarding for a corresponding bearer. On the other hand, in a case in which the existing IE (DL forwarding proposed) is included in "DL Forwarding," the target MeNB 200M2 is unable to decide the direct forwarding for the corresponding bearer, and decides the indirect forwarding.

(2) Configuration Example 2 of Handover Request

Table 5 shows a configuration example 2 of a handover request according to the fourth embodiment. For convenience of description, some of the existing IEs are omitted.

TABLE 5

| IE/Group Name | Presence | Range | IE type and reference | Semantics description |
|---|---|---|---|---|
| Message Type | M | | 9.2.13 | |
| Old eNB UE X2AP ID | M | | eNB UE X2AP ID 9.2.24 | Allocated at the source eNB |
| Cause | M | | 9.2.6 | |
| Target Cell ID | M | | ECGI 9.2.14 | |
| GUMMEI | M | | 9.2.16 | |
| UE Context Information | | 1 | | |
| >MME UE S1AP ID | M | | INTEGER $(0 \ldots 2^{32} - 1)$ | MME UE S1AP ID allocated at the MME |
| >UE Security Capabilities | M | | 9.2.29 | |
| >AS Security Information | M | | 9.2.30 | |
| >UE Aggregate Maximum Bit Rate | M | | 9.2.12 | |
| >Subscriber Profile ID for RAT/Frequency priority | O | | 9.2.25 | |
| >E-RABs To Be Setup List | | 1 | | |
| >>E-RABs To Be Setup Item | | 1 . . . <maxnoofBearers> | | |
| >>>E-RAB ID | M | | 9.2.23 | |
| >>>E-RAB Level QoS Parameters | M | | 9.2.9 | Includes necessary QoS parameters |
| >>>DL Forwarding | O | | 9.2.5 | |
| >>>UL GTP Tunnel Endpoint | M | | GTP Tunnel Endpoint 9.2.1 | SGW endpoint of the S1 transport bearer. For delivery of UL PDUs. |
| >RRC Context | M | | OCTET STRING | Includes the RRC Handover Preparation Information message as defined in subclause 10.2.2 of TS 36.331 [9] |
| Direct forwarding indicator | O | | ENUMRATED (available, . . .) | |

As shown in Table 5, in the configuration example 2 of the handover request, the handover request includes "Direct forwarding indicator" indicating that the direct forwarding is proposed as an IE separate from "E-RABs To Be Setup List." In other words, instead of proposing the direct forwarding proposal for each bearer, the direct forwarding is proposed for all the bearers in the "E-RABs To Be Setup List."

(3) Configuration Example 3 of Handover Request

In a configuration example 3 of the handover request, in a case in which the X2 interface between the source MeNB 200M1 and the SeNB 200S is available, the source MeNB 200M1 includes information (X2 available) indicating that the X2 interface between the source MeNB 200M1 and the SeNB 200S is available in the handover request.

In a case in which the X2 interface between the source MeNB 200M1 and the SeNB 200S is unavailable, the source MeNB 200M1 includes information (X2 unavailable) indicating that the X2 interface between the source MeNB 200M1 and the SeNB 200S is unavailable in the handover request.

The target MeNB 200M2 decides the forwarding scheme of either of the direct forwarding and the indirect forwarding in a case in which the information (X2 available) is included in the handover request. On the other hand, the target MeNB 200M2 is unable to decide the direct forwarding and decides the indirect forwarding in a case in which the information (X2 available) is not included in the handover request, or in a case in which the information (X2 unavailable) is included in the handover request.

[Modified Example of Fourth Embodiment]

In the fourth embodiment, the "inter MeNB Hanover without SeNB change" which is a scenario in which the inter-MeNB handover is performed without changing the SeNB 200S1 connected to UE 100 is assumed.

However, the fourth embodiment can be applied to the "inter eNB Hanover with SeNB Addition" which is a scenario in which the UE 100 not applying the dual connectivity scheme starts the dual connectivity scheme with the handover. In this scenario, the dual connectivity scheme is not applied in the source eNB. For this reason, the target eNB is unable to detect whether or not the direct forwarding is usable (that is, whether or not there is the X2 interface between the source eNB and the SeNB). In this regard, the notification information according to the fourth embodiment is transmitted from the source eNB to the target eNB, and thus the target eNB is able to determine whether or not the direct forwarding is usable.

In the scenario of the "inter eNB Hanover with SeNB Addition," the source eNB first sets measurement in the UE 100 and receives the measurement report from the UE 100. A cell for which the measurement is set by the source eNB depends on an implementation.

In a case in which the measurement results of a plurality of cells belonging to different eNBs are included in the measurement report, the source eNB includes this information in the handover request (HO Req) and transmits the resulting handover request to the target eNB (target MeNB). Specifically, the measurement report is included in "RRM Config IE in Handover Preparation Information (RRC container)" in the handover request.

Here, the source eNB is able to determine that the direct forwarding is able to be performed in a case in which there is the X2 interface for all eNBs to which the cells included in the measurement report belong. Alternatively, in a case in which there is the X2 interface only for some eNBs among eNBs to which the cells included in the measurement report belong, the source eNB may determine that the direct forwarding is able to be performed only for some eNBs. In this case, the source eNB may give a notification indicating some eNBs as eNBs in which the direct forwarding is able to be performed to the target eNB through the handover request (HO Req). Alternatively, a notification indicating whether or not the direct forwarding is able to be performed for each of a plurality of eNBs (a plurality of SeNB candidates) corresponding to the measurement report may be given to the target eNB through the handover request (HO Req).

The target eNB (target MeNB) selects an appropriate cell from a plurality of cells in the transferred measurement report and transmits "SeNB Addition" to the corresponding eNB. As a result, the SeNB is decided.

Fifth Embodiment

The fifth embodiment will be described below. In the fifth embodiment, similarly to the second embodiment and the third embodiment, the source MeNB 200M1 decides whether the direct forwarding is performed or the indirect forwarding is performed.

As described above in the second embodiment and the third embodiment, the target MeNB 200M2 sets the second tunneling identifier used for the indirect forwarding, and then transmits the handover request response including the first tunneling identifier and the second tunneling identifier to the source MeNB 200M1 (see step S14 of FIG. 20).

Here, the source MeNB 200M1 which has received the handover request response is assumed to decide the direct forwarding. In this case, the source MeNB 200M1 performs the direct forwarding for the SeNB 200S (see FIG. 19A). Specifically, the source MeNB 200M1 transmits "SN STATUS TRANSFER" to the SeNB 200S (see step S16*b* of FIG. 20), and then performs the direct forwarding (see step S17*b* of FIG. 20). Then, if an end marker indicating that the data transfer to the source MeNB 200M1 has been completed is received from the S-GW, the source MeNB 200M1 transmits the end marker indicating the completion of the direct forwarding to the SeNB 200S.

As described above, in a case in which the source MeNB 200M1 decides the direct forwarding, the target MeNB 200M2 is unable to detect the fact and has to hold the second tunneling identifier used for the indirect forwarding. Therefore, there is a problem that resources of the X2 interface are wasted while the target MeNB 200M2 is holding the second tunneling identifier.

Figure 22:
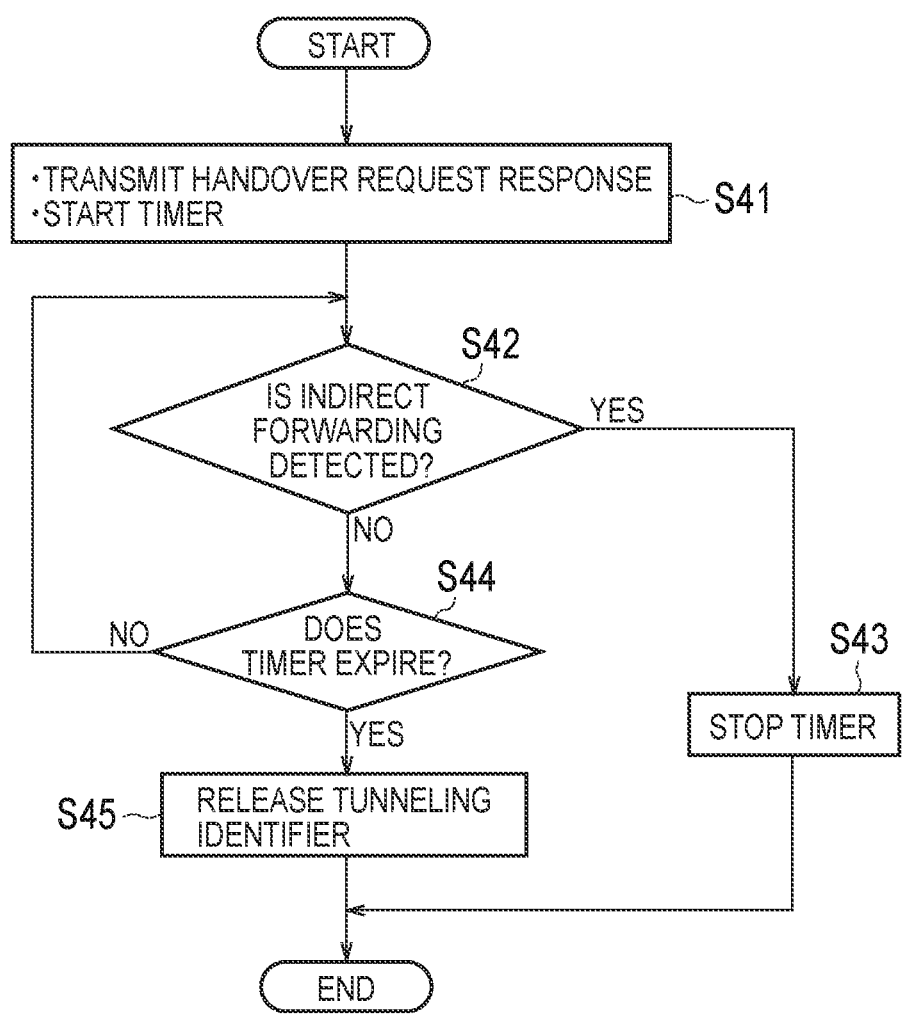
FIG. 22 is a flowchart illustrating an operation of a target MeNB 200 M2 according to the fifth embodiment.

FIG. 22 is a flowchart illustrating an operation of the target MeNB 200M2 according to the fifth embodiment.

As illustrated in FIG. 22, when the handover request response including the first tunneling identifier and the second tunneling identifier is transmitted to the source MeNB 200M1, the target MeNB 200M2 activates a timer that specifies a maximum standby time until the indirect forwarding is started (step S41). Specifically, the timer indicates a period of time in which it is allowed to be on standby for reception of "SN STATUS TRANSFER" or the transfer data corresponding to the bearer identifier of the type change bearer.

In a case in which the indirect forwarding is started within the period of time of the timer (YES in step S42), the target MeNB 200M2 stops the timer (step S43). Specifically, in a case in which the target MeNB 200M2 detects the reception of "SN STATUS TRANSFER" or transfer data corresponding to the bearer identifier of the type change bearer, that is, in a case in which the target MeNB 200M2 detects the reception of a message or data destined for the second tunneling identifier set by the target MeNB 200M2, the target MeNB 200M2 stops the timer.

On the other hand, in a case in which the timer expires, that is, in a case in which the indirect forwarding is not started within the period of time of the timer (YES in step S44), the target MeNB 200M2 releases the second tunneling identifier. Specifically, the target MeNB 200M2 releases the second tunneling identifier (GTP TE ID) corresponding to the bearer identifier of the type change bearer. The target MeNB 200M2 may release the second tunneling identifier and release a transport layer address.

Therefore, even when the source MeNB 200M1 decides the direct forwarding, the target MeNB 200M2 is able to release the second tunneling identifier at an appropriate timing, and thus it is possible to prevent the resources of the X2 interface from being wasted.

Sixth Embodiment

The sixth embodiment will be described below. The sixth embodiment is an embodiment for solving the problems described in the fifth embodiment but differs from the fifth embodiment in a solution method.

The source MeNB 200M1 according to the sixth embodiment decides one forwarding scheme out of the direct forwarding and the indirect forwarding. In a case in which the direct forwarding is decided, the source MeNB 200M1 transmits the notification information related to the direct forwarding to the target MeNB 200M2. In a case in which the direct forwarding is completed, the source MeNB 200M1 may transmit an end marker serving as the notification information to the target MeNB 200M2 in addition to the transmission of the end marker to the SeNB 200S. In this case, the source MeNB 200M1 transmits the end marker serving as the notification information to the target MeNB 200M2 even when there is no transfer data. Alternatively, the notification information may be signaling indicating that the direct forwarding is decided or signaling for requesting the release of the second tunneling identifier.

The target MeNB 200M2 according to the sixth embodiment transmits the handover request response including the first tunneling identifier and the second tunneling identifier to the source MeNB 200M1. In a case in which the source MeNB 200M1 decides the direct forwarding, the target MeNB 200M2 receives the notification information related to the direct forwarding from the source MeNB 200M1. The target MeNB 200M2 releases the second tunneling identifier in response to the reception of the notification information.

Figure 23:
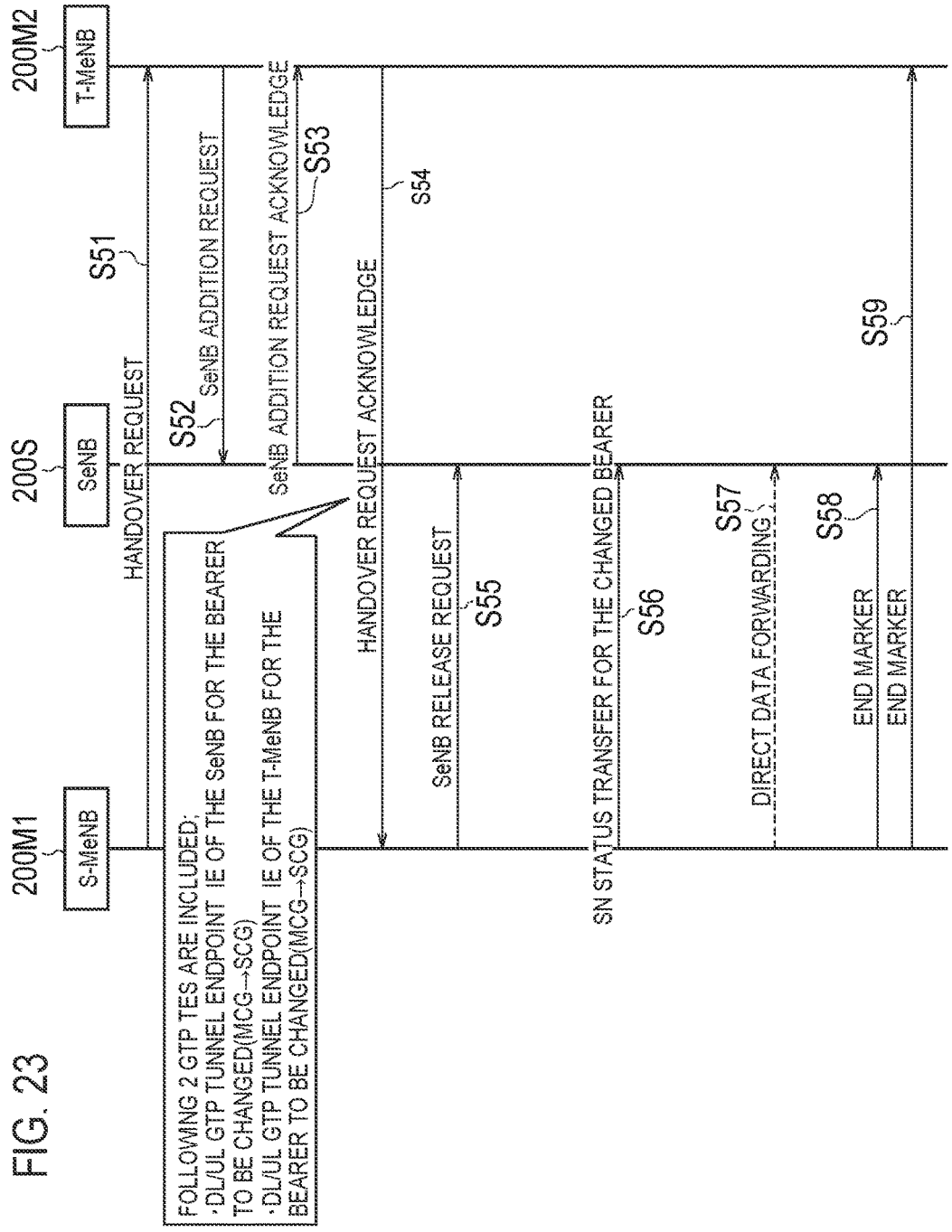
FIG. 23 is a diagram illustrating an example of an operation sequence according to the sixth embodiment.

FIG. 23 is a diagram illustrating an example of an operation sequence according to the sixth embodiment.

As illustrated in FIG. 23, steps S51 to S55 are similar to steps S11 to S15 of FIG. 20.

In step S56, the source MeNB 200M1 transmits "SN STATUS TRANSFER" to the SeNB 200S.

In step S57, the source MeNB 200M1 performs the direct forwarding.

In step S58, if the end marker is received from the S-GW, the source MeNB 200M1 transmits the end marker indicating the completion of the direct forwarding to the SeNB 200S.

In step S59, the source MeNB 200M1 transmits the end marker serving as notification information to the target MeNB 200M2. The target MeNB 200M2 releases the second tunneling identifier in response to the reception of the end marker serving as the notification information. The target MeNB 200M2 may release the second tunneling identifier and release the transport layer address.

Other Embodiments

In the modified example of the fourth embodiment, the scenario of the "inter eNB Hanover with SeNB Addition" has been described. However, the scenario of the "inter eNB Hanover with SeNB Addition" can be applied to other embodiments than the fourth embodiment.

In the above-described embodiments, the target MeNB 200M2 may transmit the SeNB modification request to the SeNB 200S instead of transmitting the SeNB addition request. In this case, the SeNB 200S transmits the SeNB modification request response (SeNB Modification Request Acknowledgment) to the target MeNB 200M2 instead of transmitting the SeNB addition request response. In this case, the source MeNB 200M1 may not perform the transmission of the SeNB release request.

In the above-described embodiments, the eNB 200 resets (clears) or initializes the timer after stopping its own timer. Further, the eNB 200 resets (clears) or initializes the timer after its own timer expires.

In the above-described embodiments, the LTE system has been described as an example of the mobile communication system. However, the present disclosure is not limited to the LTE system. The present disclosure may be applied to systems other than the LTE system.

[Additional Note 1]

Approved sequence of inter MeNB handover still has FFSs;

FFS 1. Reference to the UE Context in the SeNB with the SeNB UE X2AP ID or the C-RNTI To maintain the relation between the SeNB and the UE during inter MeNB handover without SeNB change, the SeNB needs to be informed from the MeNB of the identifier to know the concerned UE context. There are 2 candidates, the SeNB UE X2AP ID and the C-RNTI. Although both IDs can work to identify the UE context, there are following differences.

SeNB UE X2AP ID

This ID is uniquely allocated to an UE in the X2AP of SeNB. So, the SeNB X2AP ID is related to the X2AP session for the concerned UE. It seems straight forward to use the SeNB UE X2AP ID to refer the UE context. In this case, the handover request from the source MeNB should inform the target MeNB of the SeNB UE X2AP ID which is currently configured with dual connectivity.

C-RNTI

C-RNTI is allocated to an UE per cell group by the MACs in both the MeNB and the SeNB to identify the concerned UE in AS layer. Assuming C-RNTI in the SeNB is used for reference of the UE context, the target MeNB may need to inform the SeNB of the ID in the MeNB to SeNB Container IE. In addition, the source MeNB may also need to know the C-RNTI allocated in the SeNB before the handover request. These may cause RAN2 effort.

Therefore, the SeNB UE X2AP ID is more suitable for the reference to the UE context in the SeNB.

Proposal 1: The SeNB UE X2AP ID should be used for the reference to the UE context in the SeNB, and remove FFS 1.

FPS 2: SeNB Modification Request or Another X2AP Message can be Used in Step 3 Instead of SeNB Addition Request FFS 3: If the SeNB is Kept, does the eNB1 can Skip the SeNB Release Procedure in Step 6 and UE Context Release in Step 15

It could be considered to use either the SeNB Modification Preparation or SeNB Addition Preparation.

SeNB Modification Preparation

With SeNB Modification Preparation, the SeNB Release procedure and UE Context Release procedures from the source MeNB are not needed, since the UE context is retained and just modified during the handover. From the perspective of the SeNB, the UE context of concerned UE in the SeNB is reused during the handover and then modified to adopt the new configurations of the target MeNB (e.g. SeNB Security Key). This behavior is aligned with the current specification.

With regard to the SeNB UE X2AP ID included in a SENB MODIFICATION REQUEST message from the target MeNB, it should be same with one which was already allocated by the SeNB before the handover procedure. Therefore, the SeNB should notice the SeNB UE X2AP ID is associated with the source's MeNB UE X2AP ID and identify the concerned UE context to be modified.

SeNB Addition Preparation

Current TR captures the SeNB Addition Preparation for inter MeNB handover without SeNB change. The SeNB may create a new UE context for the concerned UE upon reception of the SENB ADDITON REQUEST, which is initiated by the target MeNB. Since the SeNB has not released the old UE context at this point, it causes duplication of UE contexts for the same UE in the SeNB. So, the UE context release procedure from the source MeNB should be necessary to release the old UE context.

Note that the current SENB ADDITION REQUEST message only includes the MeNB UE X2AP ID. So, SeNB may implicitly understand occurrence of the inter MeNB handover without SeNB change, if the SeNB UE X2AP ID is included in the message.

Observation 1: Both SeNB Addition Preparation and SeNB Modification Preparation can be used for inter MeNB handover without SeNB change and each procedure have pros & cons.

Abnormal Condition

It should be considered that there are 3 abnormal conditions in the procedure of inter MeNB handover without SeNB change. These all conditions can be described as following table 6;

TABLE 6

| Condition | Handover preparation | SeNB Addition/Modification preparation | Who releases SeNB? | Notes |
|---|---|---|---|---|
| 1 | ACK | NACK | Source MeNB | If SeNB Modification is assumed, source MeNB needs to know whether to initiate the release. |
| 2 | NACK | ACK | Target MeNB | If SeNB Modification is assumed, target MeNB needs to return the previous SeNB configuration for source MeNB. |
| 3 | NACK | NACK | No need to release | Source MeNB just continue the dual connectivity for the UE. |

Condition 1: Handover Request Acknowledge with SeNB Addition/Modification Request Reject With the SeNB Modification Preparation, the source MeNB should release the SeNB, since the X2 session for the dual connectivity is still retaining between the source MeNB and the SeNB due to the rejection. Unless the source MeNB comprehends the final RRC message or be informed of the rejection, it has no way to decide whether the SeNB Release should be initiated.

On the other hand, with the SeNB Addition Preparation, the source MeNB initiates the SeNB Release procedure, regardless whether the rejection occurs or not. This case could be considered as same as the "MeNB to eNB change" defined in Rel-12.

Condition 2: Handover Preparation Failure with SeNB Addition/Modification Request Acknowledge With the SeNB Modification Preparation, the target MeNB should re-initiate the SeNB Modification Preparation to return the role of master for the dual connectivity to the source MeNB. In addition, the source MeNB needs to be informed from either the SeNB or the target MeNB whether the role has returned or not. With the SeNB Addition Preparation, the target MeNB should just initiate the SeNB Release, since the X2 session between source MeNB and the SeNB for the dual connectivity retains regardless of this handover rejection.

Condition 3: Handover Preparation Failure with SeNB Addition/Modification Request Reject Regardless of the SeNB Addition/Modification Preparation, there is no need to initiate the SeNB Release Request since the Addition/Modification request has been already rejected. So, there is no issue.

Comparing to both procedures on abnormal condition, the SeNB Modification Preparation may be more complicated than the SeNB Addition Preparation, i.e., whether to initiate SeNB Release Request case-by-case. Therefore, it's slightly preferred that the SeNB Addition Preparation is used for inter MeNB handover procedure.

Proposal 2: The SeNB Addition Preparation procedure is suitable for inter MeNB handover without SeNB change, and remove FFS 2.

Proposal 3: The SeNB Release procedure and the UE context Release procedure are needed, and remove FFS 3.

FFS 4: Data Forwarding Needs to be Further Considered in General; Omission? Direct Data Forwarding?

Data forwarding should be analyzed separately for the options of split bearer and SCG bearer.

Split Bearer Option

With regard to UL, the SeNB should forward the UL PDCP PDU to the source MeNB over X2-U, as far as the UE ciphers the UL PDCP PDU in its PDCP which is configured by the source MeNB. Upon inter MeNB handover, the PDCP SDU deciphered in the source MeNB should be forwarded to the target MeNB. After reconfiguration of the UE, the SeNB starts to forward the PDCP PDU to the target MeNB over X2-U, which is ciphered with the ciphering key which is same as one of the target MeNB. So, the SeNB should forwards UL PDCP PDU to the appropriate MeNB, according to the ciphering key configured in the UE. Therefore, the direct data forwarding from the SeNB to the target MeNB is not applicable in UL.

As same as UL, DL should also take into account the ciphering key of PDCP PDU, i.e., the source/target MeNB should provide PDCP PDU before/after reconfiguration of the UE. So, the source MeNB should forward the PDCP SDU to the target MeNB upon inter MeNB handover. Therefore, the direct data forwarding from the SeNB to the target MeNB is not applicable in DL.

In conclusion, the split bearer cannot apply the direct data forwarding and the omission of data forwarding.

Observation 2: Split bearer can apply neither direct data forwarding nor omission of data forwarding.

SCG Bearer Option

Unlike split bearer case, X2-U is not assumed in SCG bearer option, i.e., there is no ciphering key issue in data forwarding thanks to no PDCP PDU forwarding. Since SCG bearer may retain the GTP tunnel between the SeNB and the S-GW during inter MeNB handover, the DL PDCP SDU can be applicable after inter MeNB handover and the UL PDCP SDU can as well. Therefore, upon inter MeNB handover SCG bearer can omit data forwarding from the SeNB to the source MeNB and also from the target MeNB to the SeNB.

In addition, assuming bearer type change is supported, the direct data forwarding may be possible as far as bearer type information is exchanged between eNBs. In case of MCG bearer to SCG bearer, the source MeNB may perform direct data forwarding of PDCP SDU to the SeNB. In case of SCG bearer to MCG bearer, the SeNB may perform direct data forwarding to the target MeNB.

In conclusion, the SCG bearer can omit data forwarding. In addition, upon bearer type change between MCG bearer and SCG bearer, it's possible to apply the direct data forwarding as far as corresponding bearer information is exchanged between eNBs. The details of information exchange should be left up to WI phase.

Observation 3: SCG bearer can omit data forwarding when no bearer type change occurs.

Proposal 4: SCG bearer may perform direct data forwarding upon bearer type change. Details should be left up to WI phase, and remove FFS 4.

FFS 5: Bearer Type Change

It should be considered whether the bearer type change affects on handling of bearer-associated IEs, which are mapped to E-RABs To Be Setup List and RRC Context in the Handover Request and also E-RABs Admitted List, E-RABs Not Admitted List and Target eNB To Source eNB Transparent Container in the Handover Request Acknowledge. In addition, the Path Switch Request should be also taken into consideration. On the other hand, there should not be any impacts on non-bearer-associated IEs, e.g., UE-AMBR.

RRC Containers in X2-AP

For the RRC reconfiguration with bearer type change during handover, it is necessary to contain such modified bearer configurations in the Target eNB to Source eNB Transparent Container, compared to the RRC Context. To make the final RRC message, the MeNBs can use these IEs without any limitation. According to the current specification. There is no limitation to change the bearer type during a handover. So, no problem can be seen in the RRC containers.

E-RABs-Related Lists in X2-AP

Regardless of bearer type change, the E-RABs To Be Setup List in Handover Request needs to contain the bearer type, i.e., SCG or Split. Even if bearer type change occurs during the Handover Preparation procedure, it may not necessary that the Handover Request Acknowledge needs to inform the source MeNB of each bearer type change, as long as at least one non-GBR E-RAB corresponding to MCG bearer can be admitted in the target MeNB.

Observation 4: In consideration with RRC Containers and E-RAB-related list, there is no issue in Rel-12 Handover Preparation procedure for the bearer type change.

GTP TEID Handling in X2-AP

When bearer type change is assumed, the handling of data forwarding address should be considered for each scenario. It's assumed in this analysis to use the SeNB Addition Preparation during the inter MeNB handover. Note that it is already allowed in Rel-12 that the bearer type change of all bearers from SCG/Split to MCG during handover, i.e., with the MeNB to eNB change procedure.

SCG Bearer to MCG Bearer

To perform a part of bearer type change from SCG to MCG bearer during inter MeNB handover, the target MeNB may not need to add the bearers to be changed in the SeNB Addition Request (i.e. the target MeNB only includes the bearers to be retained within E-RAB To Be Added IE on SENB ADDITION REQUEST), since the SCG bearers to be changed to MCG bearer is autonomously released by the source MeNB. Then the target MeNB should just request the MME to change the GTP-TEIDs of SCG bearers to own endpoints by PATH SWITCH REQUEST.

Split Bearer to MCG Bearer

In case of the bearer type change from Split bearer to MCG bearer, all the GTP-TEIDs for S1-U including Split bearer are terminated in the MeNB. So, the target MeNB could just follows legacy X2 handover procedure, i.e., the Path Switch Request to the MME, without any concern on the direct data forwarding which cannot be supported as discussed in FFS 4.

MCG Bearer to SCG Bearer or Split Bearer

With regard to the bearer type change from MCG bearer to SCG/Split bearer, it could be considered as the same procedure with Handover with SeNB addition which is discussed in this SI.

As optimization of data forwarding (i.e. direct data forwarding), there is a room to optimize the GTP TEID handling. For example, regarding the SCG bearer→MCG bearer case, data forwarding from SeNB to the target MeNB, the SeNB needs to know the GTP TEIDs of the MeNB for the direct data forwarding. So, some optimization may be needed in WI phase, if any (e.g. either SeNB Addition Request or SeNB Release Request includes the direct data forwarding addresses).

Observation 5: From the perspective of GTP TEID handling, the bearer type change without direct data forwarding is feasible in SI phase.

Path Switch Request in S1-AP

When the bearer type change is assumed, Path Switch Request procedure should be considered.

MCG Bearer to SCG Bearer

In case of the bearer type change, PATH SWITCH REQUEST message would contain each Transport Layer address IE of the SeNB and the target MeNB. Such phenomenon is not assumed in normal handover, which mean PATH SWITCH REQUEST message always contains the Transport Layer address IE of only the target MeNB in Rel-12. Since MME may not assume in such a case, MME may need to understand such phenomenon indicates inter MeNB handover with bearer type change by implicitly or explicitly indication in the message. But it should be discussed in WI phase.

SCG Bearer to MCG Bearer

On the other hand, in case of SCG bearer to MCG bearer, PATH SWITCH REQUEST message would contain the Transport Layer address IE of only the target MeNB. It is same as normal handover case. So there is no issue.

Split/MCG to MCG/Split Bearer

In this case, since S1-U bearers are terminated in the MeNB regardless of Split bearer or MCG bearer, the target MeNB just performs Path Switch Request procedure like normal handover.

Observation 6: There is unclear point about the case of MCG bearer→SCG bearer, but it is left up to WI phase, so bearer type change is feasible in SI phase.

Note that the direct bearer type change i.e., from Split/SCG bearer to SCG/Split bearer is not supported in RAN2 specification.

Almost all Rel-12 procedures and information elements could basically work well with the bearer type changes, while there will need some updates for Rel-13 but should be considered in the WI phase. Additionally, the bearer type change is expected to allow the target MeNB some flexibilities in dual connectivity configurations, e.g., based on its own RRM. Therefore, RAN3 should conclude the bearer type change during inter MeNB handover is feasible.

Proposal 5: In consideration with observation 4 to 6, Bearer type change is feasible during inter MeNB handover, and remove the FFS 5.

[Additional Note 2]

(Introduction)

This additional note discusses the direct data forwarding for inter MeNB handover without SeNB change.

(Direct Data Forwarding)

The direct data forwarding is considered during two bearer type changes:

1. SCG to MCG change (i.e. the direct data forwarding from the SeNB to the target MeNB)

2. MCG to SCG change (i.e. the direct data forwarding from the source MeNB to the SeNB)

In the following sub-clauses, the possible specification impacts for the introduction of the direct data forwarding for both bearer type changes are analyzed.

SCG to MCG Change

Figure 24:
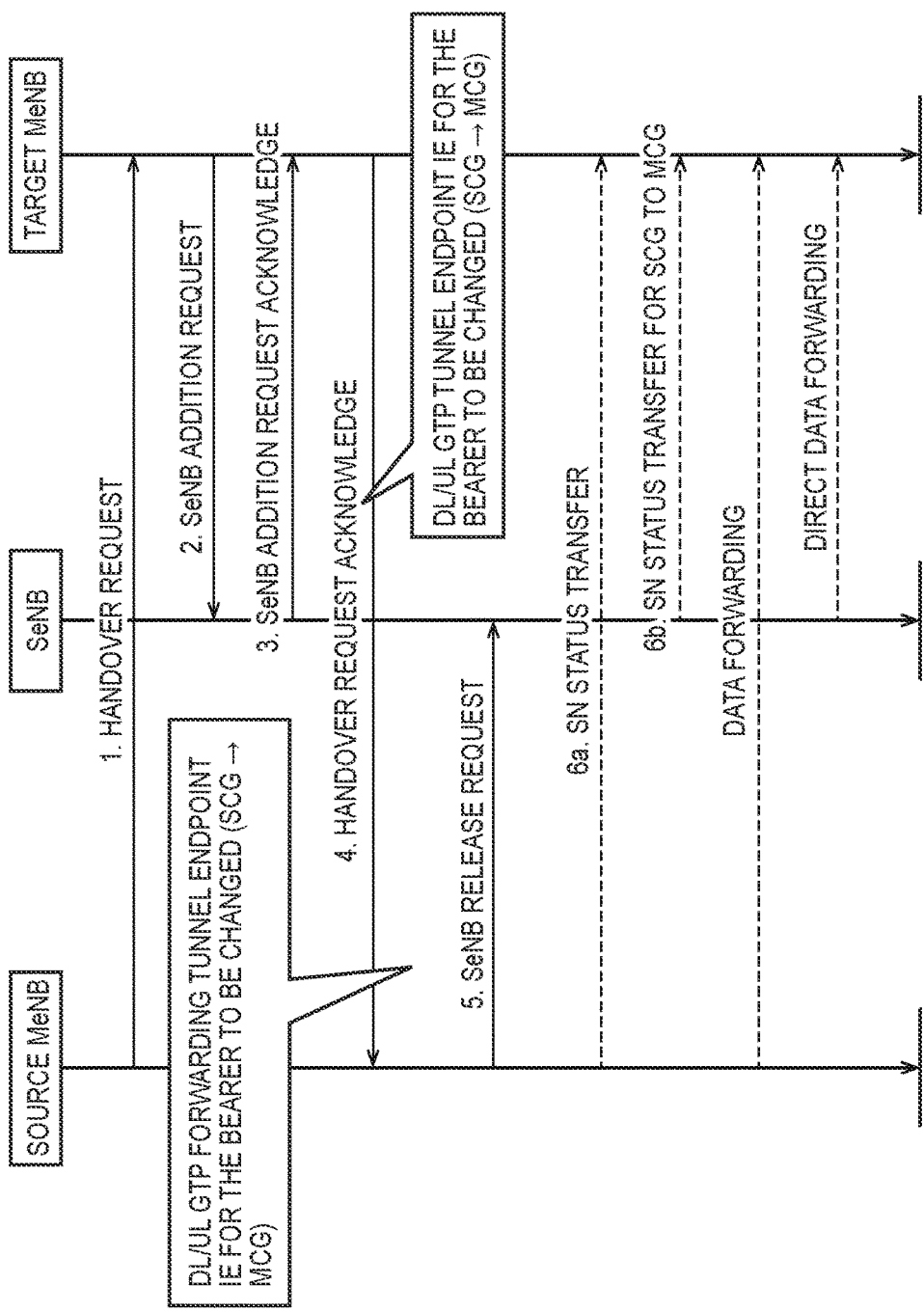
FIG. 24 is a diagram illustrating direct data transfer associated with a change in a bearer type according to an additional note (from SCG to MCG).

FIG. 24 illustrates direct data forwarding with bearer type change (SCG to MCG).

For the bearer type change from SCG to MCG, the data forwarding address of the target MeNB (i.e., GTP Tunnel Endpoint IE) should be provided to the SeNB. The target MeNB should include the data forwarding address of the corresponding SCG bearer in the HANDOVER REQUEST ACKNOWLEDGE (Step 4). In turn, the source MeNB should include the received address in the SENB RELEASE REQUEST (Step 5) as introduced. From the specification impact perspective, these messages would be adopted for forwarding the address since the GTP Tunnel Endpoint IE is already contained in the messages.

In FIG. 24, Step 1-3. Same as TR.

Step 4. The target MeNB includes own GTP Tunnel Endpoint for the SCG bearer to be changed in the HANDOVER REQUEST ACKNOWLEDGE.

Step 5. The source MeNB sends the SENB RELEASE REQUEST which includes the target MeNB's GTP Tunnel Endpoint.

Proposal 1: For the direct data forwarding from the SeNB to the target MeNB, the target MeNB's GTP Tunnel Endpoint should be delivered to the SeNB via the source MeNB with the HANDOVER REQUEST ACKNOWLEDGE and the SENB RELEASE REQUEST.

Issue of SCG to MCG Bearer Type Change

From the Perspective of the Source MeNB:

It should be decided by the target MeNB whether the bearer type change and the direct data forwarding are performed or not. However, the source MeNB cannot understand the decision. In other words, the source MeNB cannot understand whether it should include its own GTP Tunnel Endpoint or the target MeNB's GTP Tunnel Endpoint in the SENB RELEASE REQUEST. There are two possible alternatives to understand it:

ALT1. The source MeNB comprehends the RRC container and understands whether the bearer type change would be carried out or not.

ALT2. The HANDOVER REQUEST ACKNOWLEDGE includes an explicit IE to indicate if the direct data forwarding is performed or not.

Although Alt 1 has less impact on RAN3 specification, it breaks layer independency and is burdensome for the source MeNB. Therefore, it is desirable to add an explicit indicator in the HANDOVER REQUEST ACKNOWLEDGE.

Proposal 2: The HANDOVER REQUEST ACKNOWLEDGE should include additional IE to indicate if the direct data forwarding is performed or not.

From the Perspective of the SeNB:

According to the current specification, the direction of the SN STATUS TRANSFER and the data forwarding should be aligned. In other words, the SeNB needs to understand whether the direct data forwarding would be applied or not. Therefore in order to inform the SeNB of the direct data forwarding, it is desirable to add an explicit indicator in the SENB RELEASE REQUEST.

Proposal 3: The SENB RELEASE REQUEST should include additional IE to indicate if the direct data forwarding is performed or not.

(MCG to SCG Change)

FIG. 2 illustrates direct data forwarding with bearer type change (MCG to SCG).

As a preparation of the bearer type change from MCG to SCG, the SeNB should be requested to have an additional E-RAB for an establishment of new SCG bearer. It could be assumed that the target MeNB requests the additional E-RAB in the SENB ADDITION REQUEST (Step 2). Accordingly, the SeNB includes its own data forwarding address in the SENB ADDITION REQUEST ACKNOWLEDGE (Step 3). This is the same manner as Rel-12.

The difference between the indirect data forwarding and the direct data forwarding in case of the change from MCG to SCG is that the source MeNB should be informed the data forwarding address of the SeNB. This is easily achieved by including a GTP Tunnel Endpoint of the SeNB in the HANDOVER REQUEST ACKNOWLEDGE (Step 4).

Figure 25:
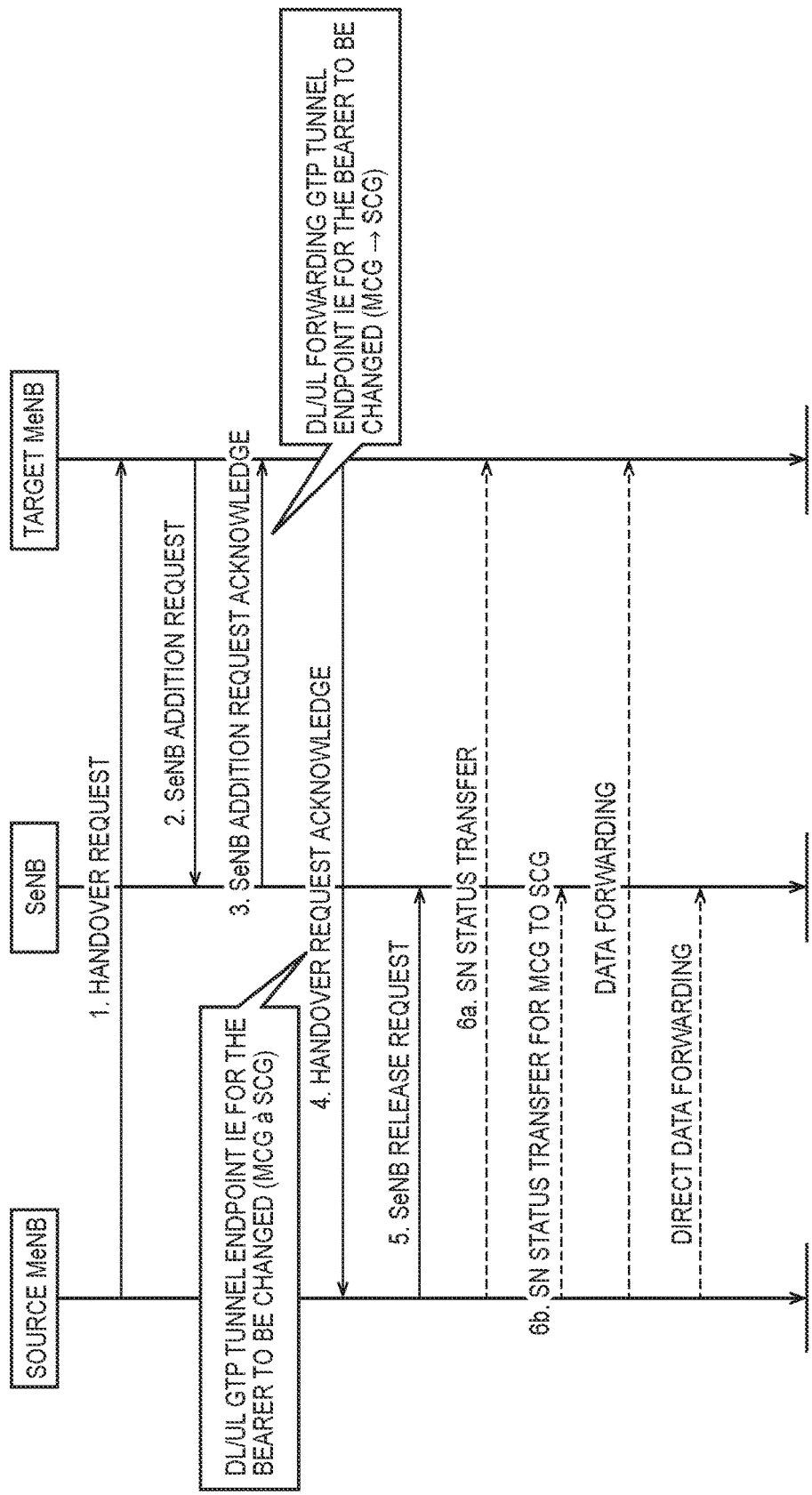
FIG. 25 is a diagram illustrating direct data transfer associated with a change in a bearer type according to an additional note (from MCG to SCG).

In FIG. 25, Same as TR.

Step 2. The target MeNB requests the additional SCG bearer in the SENB ADDITION REQUEST.

Step 3. The SeNB includes the GTP Tunnel Endpoint for the additional bearer in the SENB ADDITION REQUEST ACKNOWLEDGE.

Step 4. The target MeNB includes the SeNB's GTP Tunnel Endpoint in the HANDOVER REQUEST ACKNOWLEDGE.

Proposal 4: For the direct data forwarding from the source MeNB to the SeNB, the SeNB's GTP Tunnel Endpoint should be delivered to the source MeNB via the target MeNB with the HANDOVER REQUEST ACKNOWLEDGE.

[Additional Note 5]

Successful Operation

Figure 26:
FIG. 26 is a diagram illustrating an operation in which handover preparation according to an additional note succeeds.

FIG. 26 illustrates Handover Preparation, successful operation.

The source eNB initiates the procedure by sending the HANDOVER REQUEST message to the target eNB. When the source eNB sends the HANDOVER REQUEST message, it shall start the timer $T_{RELOCprep}$.

The allocation of resources according to the values of the Allocation and Retention Priority IE included in the E-RAB Level QoS Parameters IE shall follow the principles described for the E-RAB Setup procedure in TS 36.413.

The source eNB may include in the GUMMEI IE any GUMMEI corresponding to the source MME node.

If at least one of the requested non-GBR E-RABs is admitted to the cell indicated by the Target Cell ID IE, the target eNB shall reserve necessary resources, and send the HANDOVER REQUEST ACKNOWLEDGE message back to the source eNB. The target eNB shall include the E-RABs for which resources have been prepared at the target cell in the E-RABs Admitted List IE. The target eNB shall include the E-RABs that have not been admitted in the E-RABs Not Admitted List IE with an appropriate cause value.

At reception of the HANDOVER REQUEST message the target eNB shall:

prepare the configuration of the AS security relation between the UE and the target eNB by using the information in the UE Security Capabilities IE and the AS Security Information IE in the UE Context Information IE.

For each E-RAB for which the source eNB proposes to do forwarding of downlink data, the source eNB shall include the DL Forwarding IE within the E-RABs To be Setup Item IE of the HANDOVER REQUEST message. For each E-RAB that it has decided to admit, the target eNB may include the DL GTP Tunnel Endpoint IE within the E-RABs Admitted Item IE of the HANDOVER REQUEST ACKNOWLEDGE message to indicate that it accepts the proposed forwarding of downlink data for this bearer. This GTP tunnel endpoint may be different from the corresponding GTP TEID IE in the E-RAB To Be Switched in Downlink List IE of the PATH SWITCH REQUEST message (see TS 36.413 [4]) depending on implementation choice.

For each bearer in the E-RABs Admitted List IE, the target eNB may include the UL GTP Tunnel Endpoint IE to indicate that it requests data forwarding of uplink packets to be performed for that bearer.

Upon reception of the HANDOVER REQUEST ACKNOWLEDGE message the source eNB shall stop the timer $T_{RELOCprep}$, start the timer $TX2_{RELOCoverall}$ and terminate the Handover Preparation procedure. The source eNB is then defined to have a Prepared Handover for that X2 UE-associated signalling.

If the Handover Restriction List IE is
contained in the HANDOVER REQUEST message, the target eNB shall
store the information received in the Handover Restriction List IE in the UE context;
use this information to select a proper SCG during dual connectivity operation.

Dual Connectivity

For each E-RAB that the bearer option is modified to the SCG Bearer during the inter MeNB handover, the target MeNB sets the DL Forwarding GTP Tunnel Endpoint/UL Forwarding GTP Tunnel Endpoint IE of the SeNB received from the SENB ADDITION REQUEST ACKNOWLEDGE message to the UL GTP Tunnel Endpoint/DL GTP Tunnel Endpoint IE in the HANDOVER REQUEST ACKNOWLEDGE message, and the Direct Data Forwarding Indicator IE is set to "direct data forwarding".

Successful Operation

Figure 27:
FIG. 27 is a diagram illustrating an operation in which SeNB release of MeNB starting according to an additional note succeeds.

FIG. 27 illustrates MeNB initiated SeNB Release, successful operation.

The MeNB initiates the procedure by sending the SENB RELEASE REQUEST message. Upon reception of the SENB RELEASE REQUEST message the SeNB shall stop providing user data to the UE. The SeNB UE X2AP ID IE shall be included if it has been obtained from the SeNB. The MeNB may provide appropriate information within the Cause IE.

If the bearer context in the SeNB was configured with the SCG bearer option, for each SCG bearer for which the MeNB requests forwarding of uplink/downlink data, the MeNB includes the UL Forwarding GTP Tunnel Endpoint/ DL Forwarding GTP Tunnel Endpoint IE within the E-RABs To Be Released Item IE of the SENB RELEASE REQUEST message to indicate that the SeNB should perform data forwarding of uplink/downlink packets for that SCG bearer.

If the bearer context in the SeNB was configured with the split bearer option, for each Split bearer for which the MeNB requests forwarding of downlink data, the MeNB includes the DL Forwarding GTP Tunnel Endpoint IE within the E-RABs To Be Released Item IE of the SENB RELEASE REQUEST message to indicate that the SeNB should perform data forwarding of downlink packets for that split bearer.

For each E-RAB that the Direct Data Forwarding Indicator IE in the E-RAB Admitted Item IE of the HANDOVER REQUEST ACKNOWLEDGE message is set to "direct data forwarding", the source MeNB sets the UL GTP Tunnel Endpoint/DL GTP Tunnel Endpoint IE of the target MeNB received from the HANDOVER REQUEST ACKNOWLEDGE message to the UL Forwarding GTP Tunnel Endpoint/DL Forwarding GTP Tunnel Endpoint IE of the SENB RELEASE REQUEST message, and set the Direct Data Forwarding Indicator IE in the E-RAB To Be Released Item IE to "direct data forwarding".

(Handover Request Acknowledge)

This message is sent by the target eNB to inform the source eNB about the prepared resources at the target.

Direction: target eNB to source eNB.

TABLE 7

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | ignore |
| > E-RABs Admitted Item | | 1 . . . <maxnoofBearers> | | | EACH | ignore |
| >>E-RAB ID | M | | 9.2.23 | | — | — |
| >>UL GTP Tunnel Endpoint | O | | GTP Tunnel Endpoint 9.2.1 | Identifies the X2 transport bearer used for forwarding of UL PDUs | — | — |
| >>DL GTP Tunnel Endpoint | O | | GTP Tunnel Endpoint 9.2.1 | Identifies the X2 transport bearer. used for forwarding of DL PDUs | — | — |
| >>Direct Data Forwarding Indicator | O | | 9.2.x | | — | — |
| E-RABs Not Admitted List | O | | E-RAB List 9.2.28 | A value for E-RAB ID shall only be present once in E-RABs Admitted List IE and in E-RABs Not Admitted List IE. | YES | ignore |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | O | | 9.2.7 | | YES | ignore |

(SeNB Release Request)

This message is sent by the MeNB to the SeNB to request the release of resources.

Direction: MeNB to SeNB.

TABLE 8

| IE/Group Name | Presence | Range | IE type and reference | Semantics description | Criticality | Assigned Criticality |
|---|---|---|---|---|---|---|
| Message Type | M | | 9.2.13 | | YES | ignore |
| MeNB UE X2AP ID | M | | eNB UE X2AP ID 9.2.24 | Allocated at the MeNB | YES | reject |
| SeNB UE X2AP ID | O | | eNB UE X2AP ID 9.2.24 | Allocated at the SeNB | YES | reject |
| Cause | O | | 9.2.6 | | YES | ignore |
| E-RABs To Be Released List | | 0 . . . 1 | | | YES | ignore |
| > E-RABs To Be Released Item | | 1 . . . <maxnoofBearers> | | | EACH | ignore |
| >>CHOICE Bearer Option | M | | | | — | — |
| >>>SCG Bearer | | | | | | |
| >>>>E-RAB ID | M | | 9.2.23 | | — | — |
| >>>>UL Forwarding GTP Tunnel Endpoint | O | | GTP Tunnel Endpoint 9.2.1 | Identifies the X2 transport bearer used for forwarding of UL PDUs | — | — |
| >>>>DL Forwarding GTP Tunnel Endpoint | O | | GTP Tunnel Endpoint 9.2.1 | Identifies the X2 transport bearer. used for forwarding of DL PDUs | — | — |
| >>>>Direct Data Forwarding Indicator | O | | 9.2.x | | — | — |
| >>>Split Bearer | | | | | | |
| >>>>E-RAB ID | M | | 9.2.23 | | — | — |
| >>>>DL Forwarding GTP Tunnel Endpoint | O | | GTP Tunnel Endpoint 9.2.1 | Identifies the X2 transport bearer. used for forwarding of DL PDUs | — | — |

(Direct Data Forwarding Indicator)

The Direct Data Forwarding Indicator IE indicates that the direct data forwarding corresponding to an E-RAB is requested.

TABLE 9

| IE/Group Name | Presence | Range | IE type and reference | Semantics description |
|---|---|---|---|---|
| Direct Data Forwarding Indicator | M | | ENUMERATED (Direct Data Forwarding, . . .) | |

CROSS REFERENCE

This application claims the benefit of U.S. provisional application No. 62/145,755 filed Apr. 10, 2015, U.S. provisional application No. 62/222,877 filed Sep. 24, 2015, U.S. provisional application No. 62/251,890 filed Nov. 6, 2015, and U.S. provisional application No. 62/251,907 filed Nov. 6, 2015, the entire contents of which are incorporated herein by reference.

The invention claimed is:

1. A method of controlling a handover procedure of a user terminal from a source master base station to a target master base station, the user terminal being connected to the source master base station and a secondary base station in accordance with a dual connectivity scheme, the method comprising:

transmitting, by the source master base station, a handover request to the target master base station;

receiving, by the source master base station, a handover request response including information indicating that the secondary base station is kept, from the target master base station; and after receiving the handover request response, performing a direct data forwarding from the source master base station to the secondary base station in a case where a bearer of the user terminal is changed from an MCG (Master Cell Group) bearer to an SCG (Secondary Cell Group) bearer, wherein the MCG bearer is established via the source master base station, and the SCG bearer is established via the secondary base station, wherein the source master base station and the secondary base station are connected to the user terminal in accordance with a dual connectivity scheme, the source master base station transmits/receives user data to/from the user terminal, the direct data forwarding includes forwarding buffered data from the source master base station to the secondary base station without passing through the target master base station, the buffered data is buffered in the source master base station, the MCG is a plurality of cells belonging to a mater base station, and the SCG is a plurality of cells belonging to a secondary base station.

2. The method according to claim 1, further comprising transmitting a secondary base station release request from the source master base station to the secondary base station in response to receiving the handover request response including the information indicating that the secondary base station is kept.

3. A base station that functions as a source master base station during a handover procedure of a user terminal from the source master base station to a target master base station, the user terminal being connected to the source master base station and a secondary base station in accordance with a dual connectivity scheme, the base station comprising:
- a transmitter configured to transmit a handover request to the target master base station;
- a receiver configured to receive a handover request response including information indicating that the secondary base station is kept, from the target master base station; and
- a controller configured to perform a direct data forwarding from the source master base station to the secondary base station in a case where a bearer of the user terminal is changed from an MCG (Master Cell Group) bearer to an SCG (Secondary Cell Group) bearer after receiving the handover request response, wherein the MCG bearer is established via the source master base station, and the SCG bearer is established via the secondary base station, wherein the source master base station and the secondary base station are connected to the user terminal in accordance with a dual connectivity scheme, the source master base station transmits/receives user data to/from the user terminal, the direct data forwarding includes forwarding buffered data from the source master base station to the secondary base station without passing through the target master base station, the buffered data is buffered in the source master base station, the MCG is a plurality of cells belonging to a mater base station, and the SCG is a plurality of cells belonging to a secondary base station.

* * * * *